(12) United States Patent
Jitsukawa et al.

(10) Patent No.: US 7,958,520 B2
(45) Date of Patent: Jun. 7, 2011

(54) DISK DRIVE DEVICE

(75) Inventors: Keiji Jitsukawa, Chiba (JP); Noriyoshi Ishii, Chiba (JP); Kiyoshi Omori, Tokyo (JP); Katsunori Takahashi, Tokyo (JP); Tomoyasu Takaoka, Saitama (JP); Yuji Suzuki, Kanagawa (JP); Shigeru Tamura, Tokyo (JP); Satoshi Muto, Chiba (JP)

(73) Assignees: Sony Corporation, Tokyo (JP); Sony NEC Optiarc Inc., Tokyo (JP)

( * ) Notice: Subject to any disclaimer, the term of this patent is extended or adjusted under 35 U.S.C. 154(b) by 791 days.

(21) Appl. No.: 11/836,295

(22) Filed: Aug. 9, 2007

(65) Prior Publication Data

US 2008/0046900 A1 Feb. 21, 2008

(30) Foreign Application Priority Data

Aug. 18, 2006 (JP) ................................. 2006-223219

(51) Int. Cl.
*G11B 17/04* (2006.01)
*G11B 17/051* (2006.01)

(52) U.S. Cl. ...................................................... 720/623
(58) Field of Classification Search .................. 720/617, 720/619–623
See application file for complete search history.

(56) References Cited

U.S. PATENT DOCUMENTS

| | | | | |
|---|---|---|---|---|
| 4,470,136 A | * | 9/1984 | Takahashi et al. | 369/77.11 |
| 5,274,620 A | * | 12/1993 | Sipos | 369/30.85 |
| 7,380,251 B2 | * | 5/2008 | Fujisawa et al. | 720/616 |
| 7,496,936 B2 | * | 2/2009 | Fujimura et al. | 720/646 |
| 2005/0039200 A1 | * | 2/2005 | Fujimura | 720/622 |
| 2005/0223398 A1 | * | 10/2005 | Fujimura et al. | 720/601 |
| 2006/0026609 A1 | * | 2/2006 | Lee | 720/622 |
| 2006/0037033 A1 | * | 2/2006 | Lee | 720/622 |
| 2006/0136949 A1 | * | 6/2006 | Sato | 720/619 |
| 2007/0169135 A1 | * | 7/2007 | Omori et al. | 720/658 |
| 2007/0174857 A1 | * | 7/2007 | Lee | 720/624 |

FOREIGN PATENT DOCUMENTS

| | | | |
|---|---|---|---|
| JP | 2001056990 A | * | 2/2001 |
| JP | 2005-100595 | | 4/2005 |
| JP | 2006172542 A | * | 6/2006 |

* cited by examiner

*Primary Examiner* — William J Klimowicz
(74) *Attorney, Agent, or Firm* — Oblon, Spivak, McClelland, Maier & Neustadt, L.L.P.

(57) ABSTRACT

A disk drive device includes: a rotary arm rotatable according to loading of a disk between a draw-in position and an eject position for ejecting the disk from a housing; a drive mechanism providing driving force for the rotary arm; a link arm mechanism interconnecting the rotary arm and the drive mechanism and rotating the rotary arm from an insertion position to the eject position when ejecting the disk; and a guide cam having a guide edge on which a guide projection of the link arm mechanism slides when ejecting the disk to rotate the rotary arm in an ejecting direction via the link arm mechanism, the guide projection moving around the guide cam from insertion to ejection of the disk. Engagement between the guide projection and the guide edge is released when a force opposite to a rotation direction is applied to the rotary arm when ejecting the disk.

15 Claims, 36 Drawing Sheets

DISK DRIVE DEVICE

CROSS REFERENCES TO RELATED APPLICATIONS

The present invention contains subject matter related to Japanese Patent Application JP 2006-223219 filed in the Japanese Patent Office on Aug. 18, 2006, the entire contents of which are incorporated herein by reference.

BACKGROUND OF THE INVENTION

1. Field of the Invention

The present invention relates to a disk drive device that records and/or reproduces information signals to/from an optical disk. More specifically, the present invention relates to a disk drive device of a so-called slot-in type in which an optical disk is automatically mounted when directly inserted into the device body.

2. Description of the Related Art

As optical disks, optical disks such as a CD (Compact Disk), a DVD (Digital Versatile Disk), and a BD (Blue-ray Disk), and magneto-optical disks such as an MO (Magneto optical) and an MD (Mini Disk) are widely known in the art. Various disk drive devices adapted to handle these disks, disk cartridges, and the like have appeared on the market.

There are various types of disk drive device, such as one in which a lid or a door provided in the housing is opened, and a disk is directly mounted onto a turntable exposed from the lid or the door, one in which a disk is placed on a disk tray that is horizontally taken in and out of the housing so that the disk is automatically mounted onto a turntable inside the housing when the disk tray is drawn into the housing, and one in which a disk is directly mounted onto a turntable provided on the disk tray. However, either one of these types of disk drive device requires the operator to perform an operation of opening and closing the lid or the door, taking the disk tray in and out, or mounting the disk onto the turntable.

On the other hand, there is a disk drive device of a so-called slot-in type in which an optical disk is automatically mounted onto a turntable simply by inserting the optical disk from a disk slot provided on the front of the housing. Examples of such a slot-in type disk drive device include one that has a pair of mutually opposed guide rollers that nip the optical disk inserted from the disk slot therebetween. The pair of guide rollers are rotated in opposite directions, thereby performing a loading operation of drawing the optical disk inserted from the disk slot into the housing and an eject operation of ejecting the optical disk to the outside of the housing from the disk slot.

There is a demand for a further reduction in the size, weight, and thickness of mobile devices such as a notebook-type personal computer to which a disk drive device is mounted. Hence, there is also an increasing demand for a corresponding reduction in the size, weight, and thickness of disk drive devices. In view of such circumstances, as an example of slot-in type disk drive device, there has been put on the market a disk drive device having arranged therein a plurality of rotary arms each having at its distal end an abutting portion, which is brought into abutment with the outer peripheral portion of a disk inserted from the disk slot of the front panel, and whose proximal end is rotatably supported in position. While rotating these rotary arms within a plane parallel to the disk, the disk drive device performs a loading operation of drawing the disk into the housing and an eject operation of ejecting the disk to the outside of the housing from the disk slot (see, for example, Japanese Unexamined Patent Application Publication No. 2005-100595). Among those disk drive devices thus reduced in thickness, there have been also proposed, as examples of ultra-thin disk drive device to be mounted in a notebook-type personal computer or the like, a disk drive device with a thickness of 12.7 mm, and a disk drive device whose thickness is reduced to 9.5 mm that is equivalent to the thickness of a hard disk drive (HDD) unit.

In such a disk drive device in which a plurality of rotary arms are arranged and which performs a disk loading operation and a disk eject operation while rotating the plurality of rotary arms within a plane parallel to the disk, at the time of inserting the disk, the rotary arms are urged in the ejecting direction of the disk by an urging member such as a torsion coil spring, thereby performing insertion of the disk into the housing while applying an urging force in the disk ejecting direction. Upon inserting the disk into the housing by a predetermined amount, a drive mechanism is activated, drawing the disk further deep into the housing. At the time of ejecting the disk, the rotary arms are rotated in the ejecting direction by the drive mechanism, thereby conveying the disk to the outside of the housing.

SUMMARY OF THE INVENTION

However, during the disk ejection process, there may be a case where an obstacle that is present outside the housing hinders the ejection of a disk, or a case where the user ejects a disk by mistake and then pushes back the ejected disk at once. When, as described above, the operation of ejecting a disk from inside the housing is hindered against the rotating operation of the rotary arms by the drive mechanism, there is a fear that the drive mechanism or a link arm mechanism connecting between the drive mechanism and the rotary arms may be applied with an excessive load or be broken.

It is thus desirable to provide a disk drive device that can prevent an excessive load from being applied to a drive mechanism or link arm mechanism when, during the ejection process of a disk, the rotation of rotary arms for pushing out the disk is hindered by an obstacle that is present in the ejecting direction of the disk.

According to an embodiment of the present invention, there is provided a disk drive device including: a rotary arm supported so as to be rotatable in accordance with loading of a disk between a draw-in position and an eject position where the disk is ejected out of a housing; a drive mechanism that provides a driving force for the rotary arm; a link arm mechanism that connects the rotary arm and the drive mechanism to each other, and rotates the rotary arm from an insertion position to the eject position at the time of ejecting the disk; and a guide cam having a guide edge on which a guide projection provided in the link arm mechanism slides at the time of ejecting the disk to cause the rotary arm to rotate in an ejecting direction via the link arm mechanism, the guide projection moving around the guide cam from insertion to ejection of the disk. When a force directed opposite to a rotation direction is applied to the rotary arm at the time of ejecting the disk, engagement between the guide projection and the guide edge is released.

With a disk drive device according to an embodiment of the present invention, when a force acting in a direction opposite to the rotation direction of the rotary arm is exerted due to, for example, collision of a disk against an obstacle during ejection of the disk, the engagement between the guide edge and the guide projection sliding on the guide edge is released. Accordingly, in the disk drive device, the guide projection no longer slides on the guide edge, and hence the movement of the link arm mechanism is no longer regulated by the guide cam. Therefore, in the disk drive device, even when the disk collides against an obstacle and the rotation of the rotary arm is restricted, it is possible to prevent an excessive load from being applied to the guide projection or guide cam that rotates the rotary arm or to the drive motor of the drive mechanism, or to prevent an excessive load from being applied due to the rotary arm or disk being nipped between the drive mechanism and the obstacle.

BRIEF DESCRIPTION OF THE DRAWINGS

FIGS. 14A and 14B are perspective view showing a loading cam plate, of which FIG. 14A shows the front side and FIG. 14B shows the back side;

FIGS. 23A and 23B are views showing a guide cam, of which FIG. 23A is a perspective of a cam portion as seen from the top side of a main chassis and FIG. 23B is a perspective view of the cam portion and an outer wall portion as seen from the back side of the main chassis;

FIGS. 26A to 26F are sectional views showing a guide edge of a cam portion, and a guide projection that slides on the guide edge, of which FIG. 26A is a view showing a case in which an inclined surface is formed in the guide edge, FIG. 26B is a view showing a case in which an inclined surface is formed in the guide projection, FIG. 26C is a view showing a case in which an inclined surface is formed in each of the guide edge and the guide projection, FIG. 26D is a view showing a case in which a ball is arranged at the distal end of the guide projection, FIG. 26E is a view showing a case in which a ball is arranged at the distal end of the guide projection so as to be freely raised and lowered, and FIG. 26F is a view showing a case in which a stopper piece is arranged within the cam portion so as to be freely raised and lowered;

FIGS. 34A to 34C are sectional views each showing the positional relation between a guide pin and a guide hole, of which FIG. 34A shows the positional relation in a chucking release position, FIG. 34B shows the positional relation in a disk mounting position, and FIG. 34C shows the positional relation in a recording/reproducing position.

DESCRIPTION OF THE PREFERRED EMBODIMENTS

Figure 1:
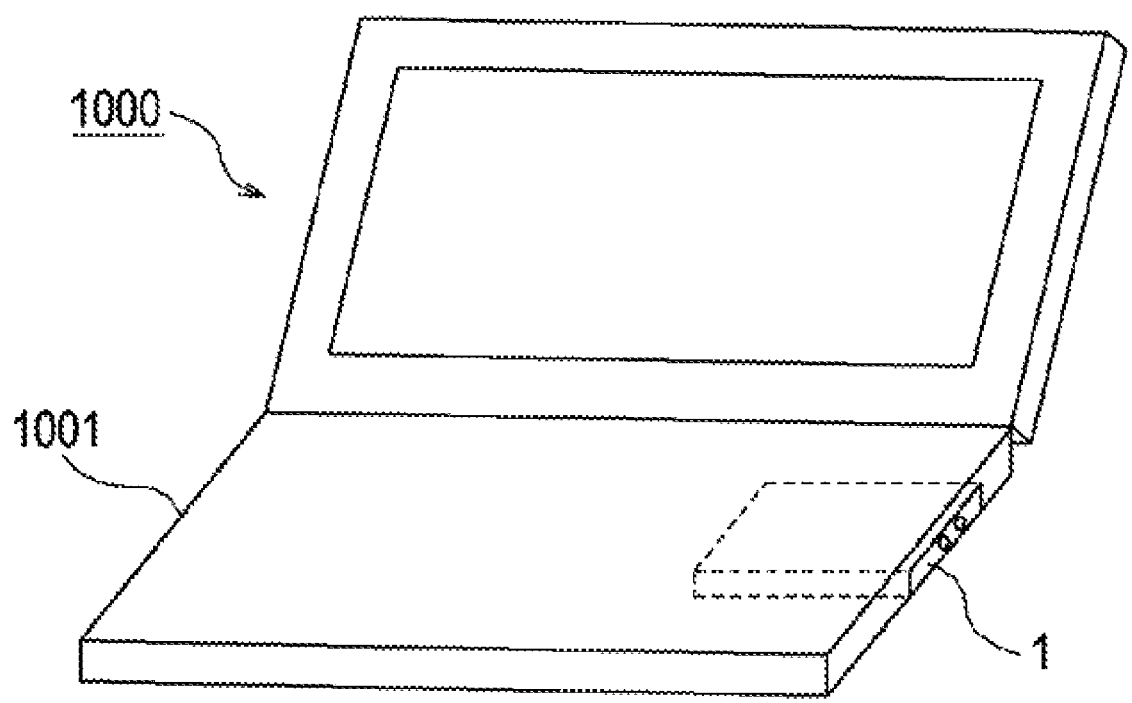
FIG. 1 is an exterior perspective view showing electronic equipment incorporating a disk drive device according to an embodiment of the present invention.
Figure 2:
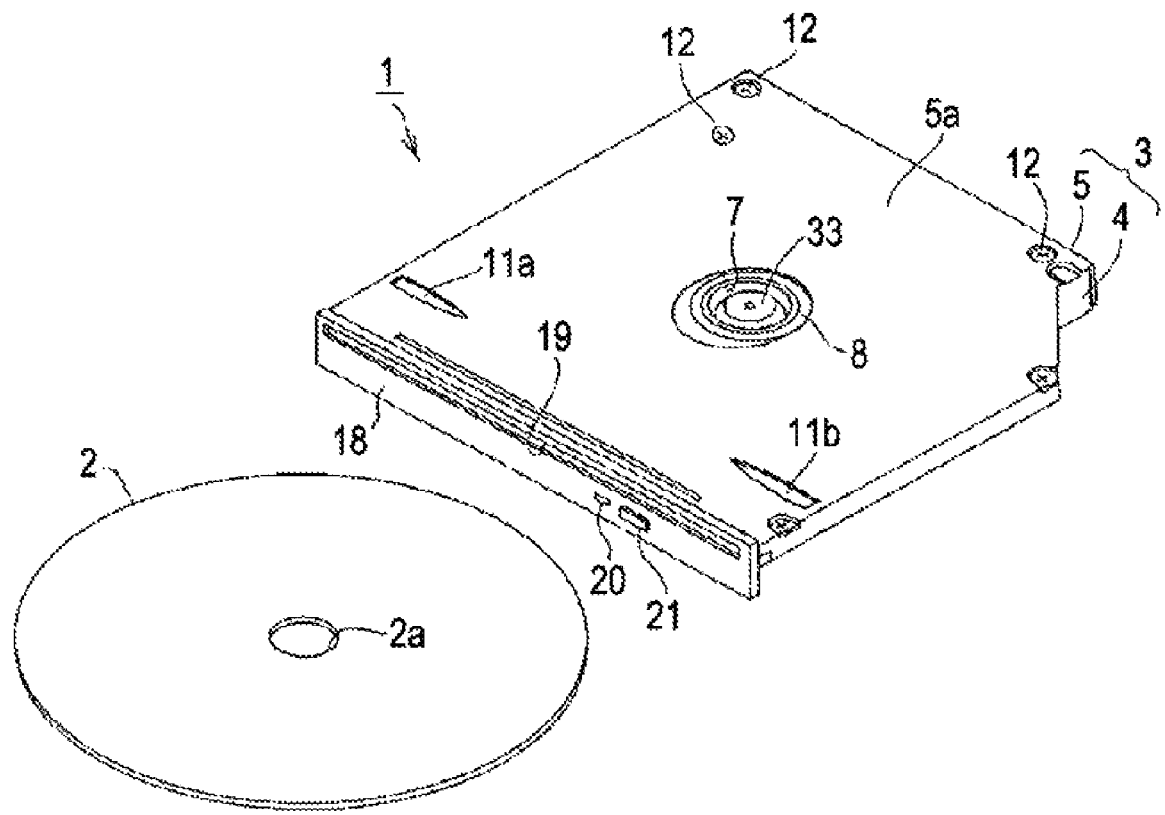
FIG. 2 is an exterior perspective view showing a disk drive device according to an embodiment of the present invention.

A disk drive device according to an embodiment of the present invention will be described in detail below with reference to the drawings. For example, as shown in FIG. 1, the disk drive device 1 is a slot-in type disk drive device 1 mounted in an apparatus body 1001 of a notebook type personal computer 1000. As shown in FIG. 2, the structure of the disk drive device 1 is such that the entire device is reduced in thickness to about 12.7 mm, for example. The disk drive device 1 enables recording/reproduction of information signals to/from an optical disk 2 such as a CD (Compact Disk), a DVD (Digital Versatile Disk), and a BD (Blue-ray Disc).

Figure 3:
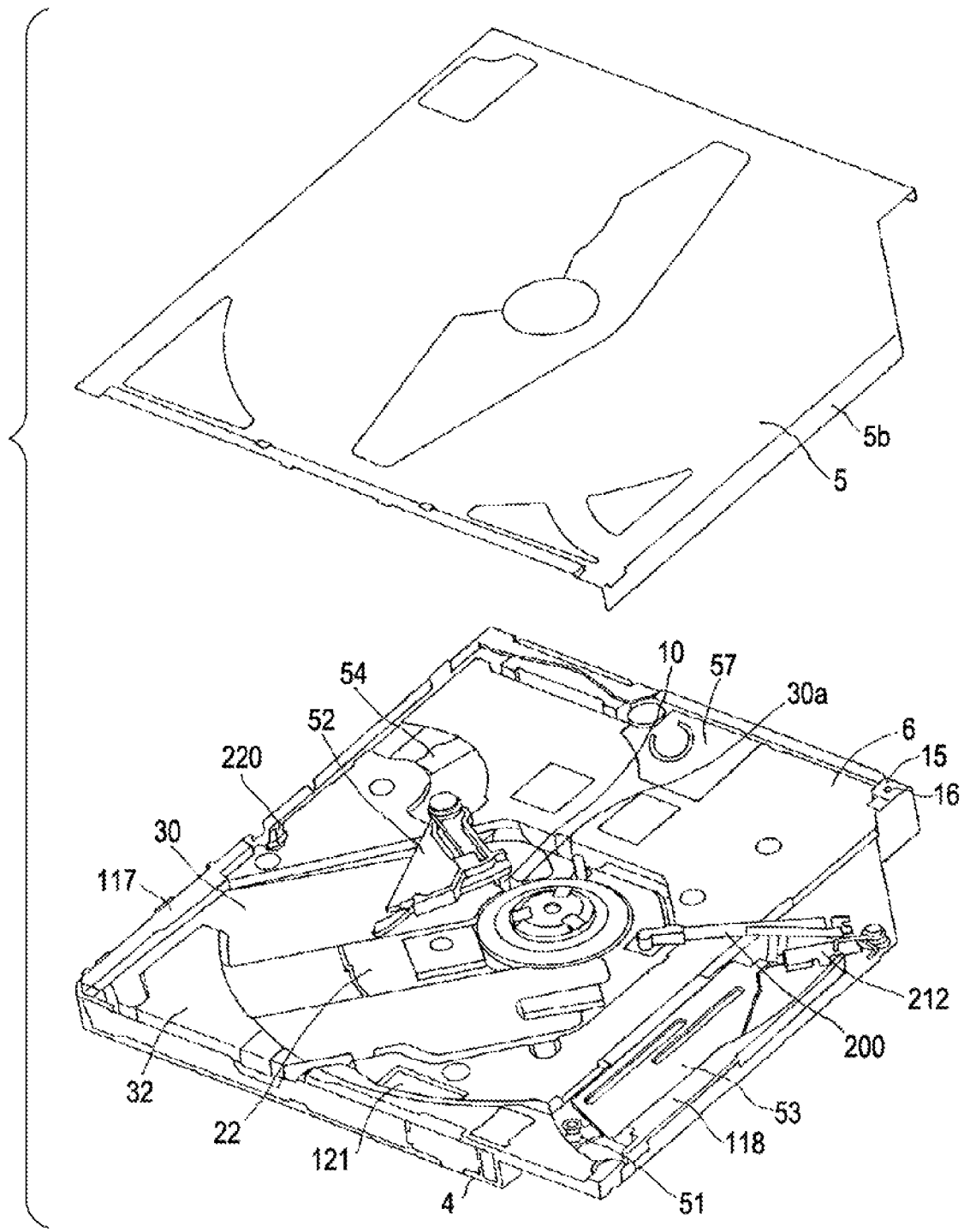
FIG. 3 is an exterior perspective view showing the interior of a disk drive device according to an embodiment of the present invention.
Figure 4:
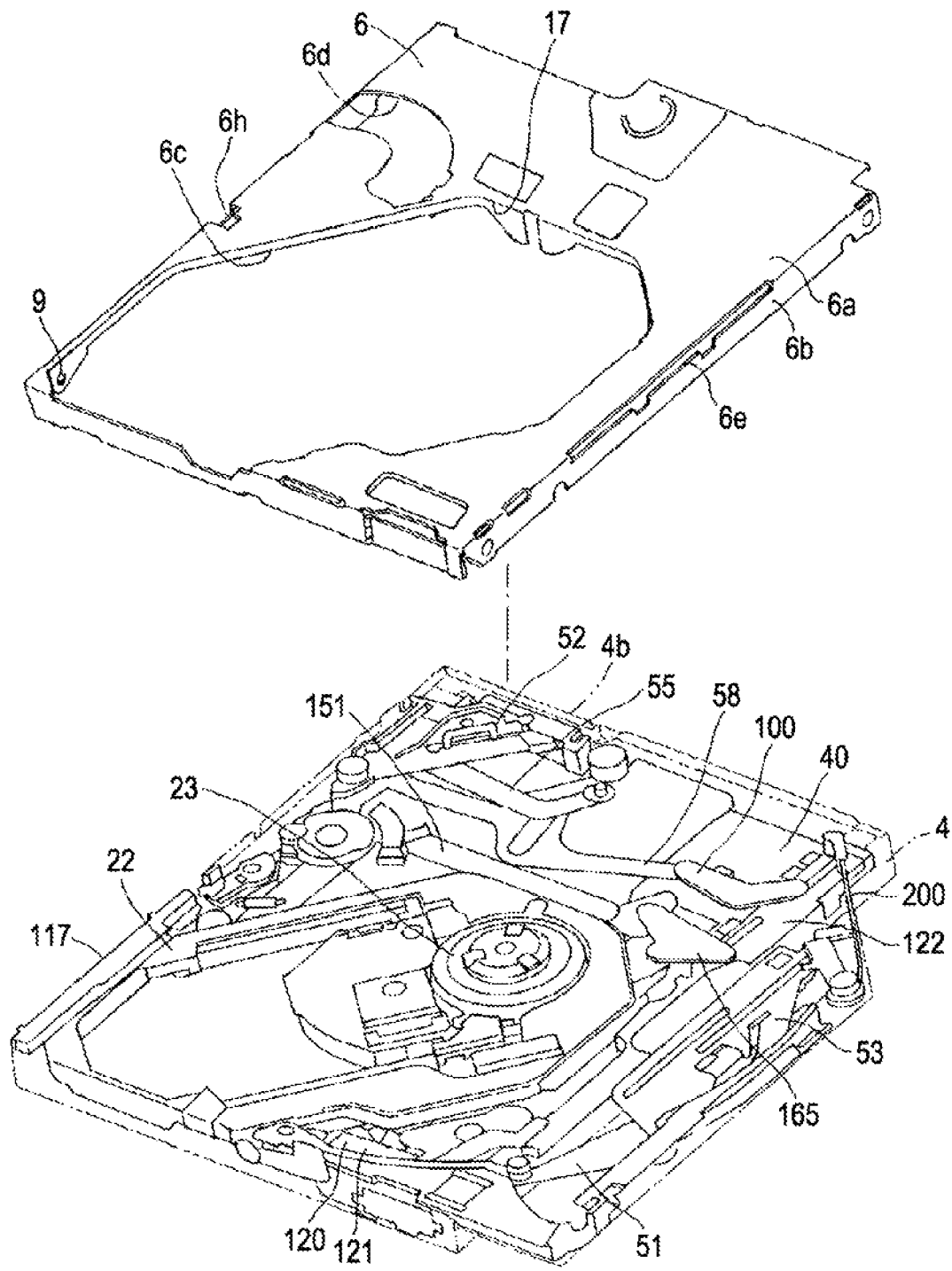
FIG. 4 is a perspective view showing a disk drive device with a main chassis removed.
Figure 5:
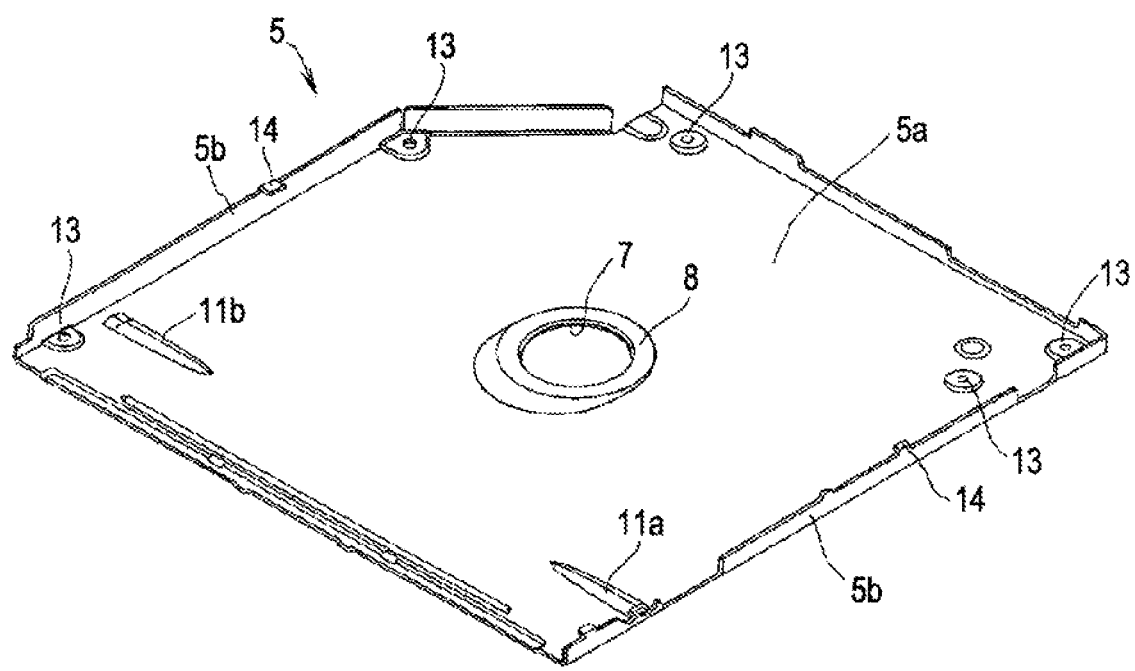
FIG. 5 is an exterior perspective view showing a top cover.

First, the specific configuration of the disk drive device 1 will be described. As shown in FIGS. 3 to 5, the disk drive device 1 includes a housing 3 that serves as the outer case of the apparatus body. The housing 3 includes a substantially flat box-shaped bottom case 4 that serves as a lower housing, and a top cover 5 that is a top plate covering the top opening of bottom case 4. Inside the housing 3, there is attached a main chassis 6 with a base unit 22 described later exposed at the top. The main chassis 6 covers a drive mechanism 120 that provides a driving force for disk conveyance, and a disk conveying mechanism 50 to which the driving force of the drive mechanism 120 is transmitted.

As shown in FIGS. 2 and 5, the top cover 5 has a top plate portion 5a, which is formed from a relatively thin metal sheet and closes the top opening of the bottom case 4, and a pair of side plate portions 5b formed by slightly bending the periphery of the top plate portion 5a along both side surfaces of the bottom case 4. A generally circular opening 7 is formed at substantially the center of the top plate portion 5a. An engaging projection 33a of a turntable 23a, which is to be engaged with a center hole 2a of the optical disk 2 at the time of a chucking operation described later, is exposed to the outside through the opening 7. In the periphery of the opening 7 of the top plate portion 5a, there is formed an abutting projection 8 that projects somewhat toward the inner side of the housing 3 so as to abut the periphery of the center hole 2a of the optical disk 2 held on the turntable 23a.

A pair of guide protrusions 11a and 11b are formed at the front side of the top plate portion 5a so as to bulge toward the interior of the housing 3. The guide protrusions 11a and 11b guide the optical disk 2 inserted from a disk slot 19 described later while regulating the movement of the optical disk 2 in the height direction. The guide projections 11a and 11b are located at substantially symmetrical positions with respect to the center line extending along the insertion direction of the optical disk 2 passing through the opening 7. Each of the guide projections 11a and 11b is raised so as to draw an arc in the insertion direction of the optical disk 2, and is substantially shaped like a part of a cone that is raised along a direction substantially perpendicular to the insertion direction of the optical disk 2 in such a way that the arc of the cone continuously decreases in diameter from the outer side toward the inner side. That is, each of the pair of guide projections 11a and 11b has a shape that would be obtained by axially dividing a cone and directing the respective peaks thereof to the inner side. Each of the pair of guide projections 11a and 11b becomes progressively lower and narrower as it extends from the outer side to the inner side.

The pair of guide projections 11a and 11b shaped as described above can smoothly guide the optical disk 2 inserted from the disk slot 19 toward the interior of the housing 3 while correcting lateral displacement of the optical disk 2. Further, the provision of the guide projections 11a and 11b shaped as described above can enhance the rigidity of the top plate portion 5a of the top cover 5. It should be noted that machining for reducing frictional resistance against the optical disk 2 is performed on the inner principal surface of the top plate portion 5a.

The bottom case 4 is made of a sheet metal formed in the shape of a substantially flat box. The bottom case 4 includes a generally rectangular bottom portion, and a deck portion 4a formed in one side portion thereof. The deck portion 4a is raised higher than the above-mentioned bottom portion and protrudes outward. A loading arm 51 for drawing the optical disk 2 into the housing 3 which will be described later, a deck arm 200 for preventing erroneous insertion of a small-diameter optical disk 101 and performing centering with respect to the optical disk 2 of a large diameter, and a regulating arm 212 for controlling the urging force of the deck arm 200 are rotatably supported on the deck portion 4a.

A circuit board 40 is attached to the bottom portion of the bottom case 4 with screws or the like. Electronic parts constituting a drive control circuit, such as an IC chip, connectors for electrical connection of various parts, detection switches for detecting the operations of various parts, and the like are arranged on the circuit board 40. In a part of the outer peripheral wall of the bottom case 4, there is provided a connector opening 4b through which a connector mounted on the circuit board 40 is exposed to the outside.

The top cover 5 is attached to the bottom case 4 with screws. More specifically, as shown in FIG. 5, in the outer peripheral edge portion of the top plate portion 5a of the top cover 5, there are formed a plurality of through-holes 13 through which screws 12 pass. The side plate portions 5a on the opposite sides have on their inner side a plurality of guide pieces 14 that are bent at substantially right angles. On the other hand, there are formed on the outer peripheral edge portion of the bottom case 4 a plurality of fixing pieces 15 that are bent inwards at substantially right angles. Formed in each of the fixing pieces 15 is a screw hole 16 corresponding to each of the through-holes 13 in the top cover 5. There are formed on the opposite side portions of the bottom case 4 a plurality of guide slits, of which detailed description is omitted, for preventing detachment of the plurality of guide pieces 14 of the top cover 5.

When attaching the top cover 5 to the bottom case 4, in a state with the plurality of guide pieces 14 of the top cover 5 engaged in the plurality of guide slits of the bottom case 4, the top cover 5 is slid from the front side to the rear side. This causes the top plate portion 5a of the top cover 5 to close the top opening of the bottom case 4. Then, in this state, the screws 12 are brought into threaded engagement with the screw holes 16 of the bottom case 4 through the plurality of through-holes 13 of the top cover 5. The housing 3 shown in FIG. 2 is constructed in the manner as described above.

As shown in FIG. 2, a generally rectangular flat-shaped front panel 18 is attached on the front of the housing 3. The front panel 18 includes the disk slot 19 of a rectangular shape permitting horizontal loading and unloading of the optical disk 2. That is, the optical disk 2 can be inserted into the housing 3 through the disk slot 19 or can be ejected to the outside of the housing 3 through the disk slot 19. A panel curtain (not shown) is formed in either edge portion of the disk insertion slot 19 extending orthogonal to the longitudinal direction. The panel curtain is made of non-woven fabric or the like cut into an elongated shape. The panel curtain is glued onto the back side of the front panel 18 with an adhesive or the like to prevent intrusion of dust or the like into the housing 3. Also, the panel curtain comes into sliding contact with the disk surface as the optical disk 2 is loaded and unloaded, thereby making it possible to remove dust or the like deposited on the optical disk 2.

Further, on the front of the front panel 18, there are provided an indicator portion 20 which illuminates to indicate that the optical disk 2 is being accessed, and an eject button 21 which is to be pressed when ejecting the optical disk 2.

It should be noted that near one side of the bottom case 4 where the deck portion 4a is provided, a pair of guide protrusions 124 for causing a slider 122 of the drive mechanism 120 described later to slide along the one side are provided so as to be spaced apart from each other along the one side (see FIG. 9).

As shown in FIGS. 3 and 4, the main chassis 6 is fixed with screws to the bottom portion of the bottom case 4. The main chassis 6 is arranged above the circuit board 40 so as to vertically divide the inside of the bottom case 4 at substantially the same height as the deck portion 4a. Accordingly, the portion of the housing 3 located on the top cover 5 side with respect to the main chassis 6 is defined as a disk conveyance area where the loading arm 51, an eject arm 52, and the deck arm 200 are exposed so as to be rotatable, and the potion of the housing 3 located on the bottom case 4 side with respect to the main chassis 6 is defined as an area where the drive mechanism 120 including a drive motor 121 and the slider 122, and first and second link arms 54 and 55, an operating arm 58, and a guide cam 57 of the disk conveying mechanism 50 which transmits the driving force of the drive motor 121 to the ejector arm 52 are disposed.

The main chassis 6 is made of a substantially flat-shaped sheet metal. The main chassis 6 has an upper surface 6a that covers the portion of the bottom case 4 from the rear portion side to the one side portion where the deck portion 4a is formed, and a pair of side plate portions 6b formed by bending the periphery of the upper surface 6a along the opposite sides of the bottom case 4. The main chassis 6 has in the upper surface 6a a base opening 6c and an eject-arm opening 6d through which the base unit 22 and the eject arm 52 of the disk conveying mechanism 50 are exposed onto the conveyance area of the optical disk 2, respectively. Further, the main chassis 6 has, in the side plate portion 6b on the side where the deck portion 4a is provided, a side-plate opening 6e through which a loading cam plate 53 connected to the slider 122 slid by the drive motor 121 is inserted.

In the upper surface 6a of the main chassis 6, the eject arm 52 of the disk conveying mechanism 50 for conveying the optical disk 2 between the inside and outside of the housing 3, the operating arm 58 that transmits the driving force of the drive mechanism 120 to operate the eject arm 52, and the guide cam 57 that guides the movement of the second link arm 55 are attached on the bottom case 4 side. Further, in the upper surface 6a, a side edge adjacent to the base unit 22 and opposed to the disk slot 19 serves as an edge portion 17 along which a pickup portion 90 and a second pickup portion 250 provided in the eject arm 52 described later slide.

The main chassis 6 has a locking portion 98 formed in a side wall near a corner portion located on the rear side of the housing 3 where the guide cam 57 is attached and on the other side where the eject arm 52 and the first and second link arms 54 and 55 are provided. A tension coil spring 58 for urging the eject arm 52 in the ejecting direction of the optical disk 2 via the second link arm 55 is locked to the locking portion 98.

Figure 9:
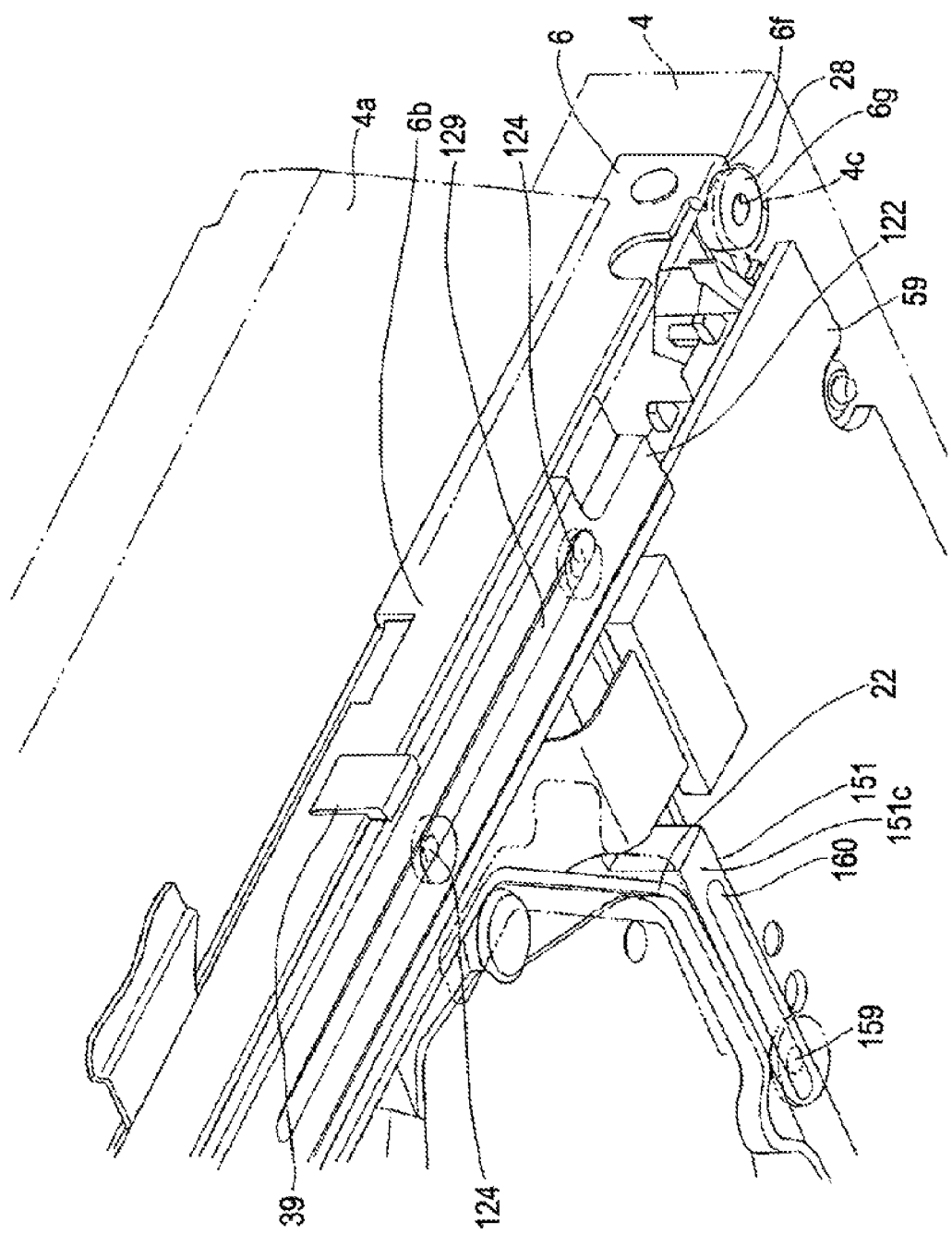
FIG. 9 is a perspective view showing another example of disk drive device.

It should be noted that the main chassis 6 has a plurality of guide pieces 6f provided in the side plate portion 6b on either side of the main chassis 6, and a through-hole 6g for fixing the main chassis 6 to the bottom case 4 is provided in each of the guide pieces 6f (see FIG. 9). On the other hand, the bottom case 4 has a screw hole 4c formed at a position corresponding to the through-hole 6g of the guide piece 6f. The main chassis 6 is fixed to the bottom case 4 through threaded engagement of a screw with the screw hole 4c and the through-hole.

Further, the main chassis 6 has a centering-guide opening 6h formed near the eject-arm opening 6d. A guide piece 221 of a centering guide 220 described later projects through the centering-guide opening 6h.

Figure 6:
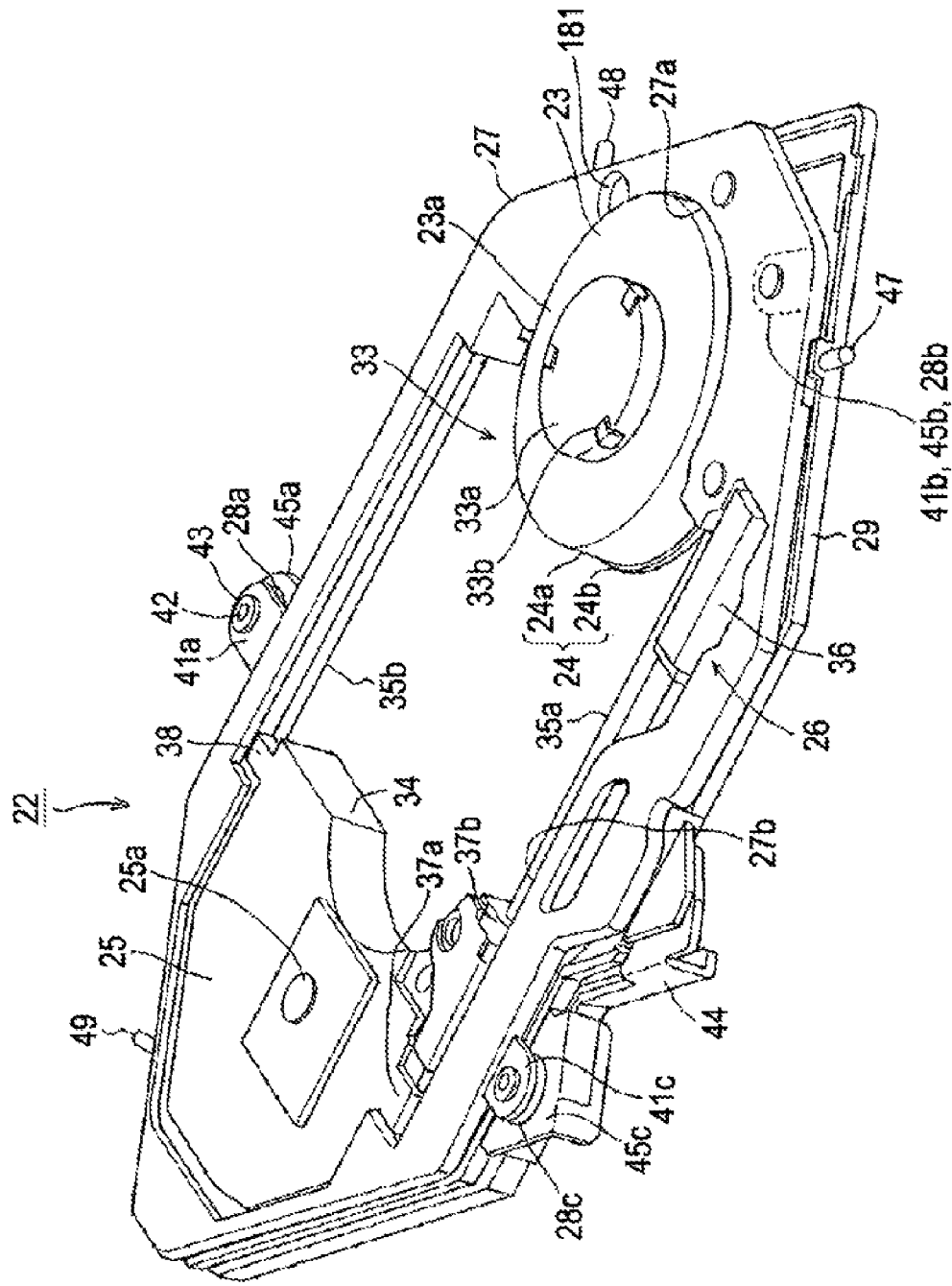
FIG. 6 is a perspective view showing a base unit.

In the disk drive device 1, the base unit 22 constituting the drive body is provided at the bottom portion of the bottom case 4. As shown in FIG. 6, the base unit 22 has a base chassis 27 made of a substantially rectangular frame member. The base chassis 27 is supported on a sub-chassis 29 via a plurality of dampers 28a to 28c. With the base chassis 27 disposed on the bottom case 4 via the sub-chassis 29, one longitudinal end side of the base unit 22 is located substantially at the center of the housing 3. The base unit 22 includes a disk mounting portion 23 on which the optical disk 2 inserted into the housing 3 through the disk slot 19 is mounted, and a disk rotating drive mechanism 24 that rotationally drives the optical disk 2 mounted on the disk mounting portion 23. Further, the base unit 22 includes an optical pickup 25 that writes or reads signals to or from the optical disk 2 rotationally driven by the disk rotating drive mechanism 24, and a pickup feed mechanism 26 that conveys the optical pickup 25 in the longitudinal direction to feed the optical pickup 25 in the radial direction of the optical disk 2. The components are mounted integrally on the base chassis 27. With the base chassis 27 supported on the sub-chassis 29, the base unit 22 is raised and lowered relative to the optical disk 2 by a base elevating mechanism 150 described later together with the sub-chassis 29.

The base unit 22 is exposed on the disk conveyance area through the base opening 6c of the main chassis 6 such that the disk mounting portion 23 is located substantially at the center of the bottom portion of the bottom case 4. The base unit 22 can be raised and lowered by the base elevating mechanism 150 described later. In the initial state, the base unit 22 is located below the optical disk 2 inserted into the housing 3 from the disk slot 19. As the optical disk 2 is loaded, the base unit 22 is raised to rotatably engage with the optical disk 2. After a recording/reproduction operation, the base unit 22 is lowered by the base elevating mechanism 150, so the base unit 22 is released from engagement with the optical disk 2 and retracted from the conveyance area of the optical disk 2.

The base chassis 27 is formed by punching a sheet metal in a predetermined shape and slightly bending the periphery of the sheet metal downward. In a principal surface of the base chassis 27, a table opening 27a of a substantially semicircular shape through which the turntable 23a of the disk mounting portion 23 described later is exposed upward, and a pickup opening 27b of a substantially rectangular shape through which an object lens 25a of the optical pickup 25 described later is exposed upward are continuously formed. It should be noted that as shown in FIG. 3, a decorative laminate 30 having openings corresponding to the openings 27a and 27b is attached to the top portion of the base chassis 27.

The base chassis 27 has a guide plate 32 formed at an end opposite to the disk mounting portion 23. The guide plate 32 prevents the optical disk 2 and the base chassis 27 from contacting each other, and guides the optical disk 2 to a support portion 88 of the eject arm 52. A fiber sheet (not shown) is glued to the guide plate 32. This prevents the signal recording surface of the optical disk 2 from being scratched when the optical disk 2 is brought into sliding contact with the guide plate 32.

In the base chassis 27, connecting pieces 41a and 41b connected to the sub-chassis 29 via the dampers 28a and 28b are provided so as to protrude from opposite longitudinal sides of the base chassis 27. Bored in each of the connecting pieces 41a and 41b is an insertion hole 43 which is formed continuous to each of connecting pieces 45a and 45b formed in the sub-chassis 29 and through which a stepped screw 42 is inserted.

The disk mounting portion 23 has the turntable 23a that is driven to rotate by the disk rotating drive mechanism 24. A chucking mechanism 33 for mounting the optical disk 2 is provided at the center of the turntable 23a. The chucking mechanism 33 has the engaging projection 33a that is engaged in the center hole 2a of the optical disk 2, and a plurality of engaging pawls 33b for locking engagement with the periphery of the center hole 2a of the optical disk 2 engaged with the engaging projection 33a. The chucking mechanism 33 holds the optical disk 2 on the turntable 23a.

The disk rotating drive mechanism 24 has a flat-shaped spindle motor 24a that rotationally drives the optical disk 2 integrally with the turntable 23a. The spindle motor 24a is attached to the lower surface of the base chassis 27 with a screw via a support plate 24b in such a way that the turntable 23a provided on the top portion slightly projects from the table opening 27a of the base chassis 27.

The optical pickup 25 has an optical block. The optical block condenses a light beam emitted from a semiconductor laser serving as a light source by using the object lens 25a and radiates the light beam to the signal recording surface of the optical disk 2, and detects a return light beam reflected by the signal recording surface of the optical disk 2 by a photodetector made of a light receiving element or the like. The optical pickup 25 writes or reads signals to or from the optical disk 2.

The optical pickup 25 has an object-lens driving mechanism such as a biaxial actuator that drives the object lens 25a so as to be displaced in an optical axis direction (focusing direction) and a direction orthogonal to the recording track of the optical disk 2 (tracking direction). On the basis of a detection signal from the optical disk 2 detected by the above-described photodetector, the optical pickup 25 performs drive control such as focus servo for focusing the object lens 25a on the signal recording surface of the optical disk 2 and tracking servo for causing the spot of a light beam condensed by the object lens 25a to follow the recording track while displacing the object lens 25a in the focusing direction and the tracking direction by the biaxial actuator. It should be noted that as the object lens driving mechanism, there may be used a triaxial actuator which makes it possible to perform, in addition to the focusing control and the tracking control described above, adjustment of the tilt (skew) of the object lens 25a with respect to the signal recording surface of the optical disk 2 so that the light beam condensed by the object lens 25a is vertically radiated onto the signal recording surface of the optical disk 2.

The pickup feeding mechanism 26 has a pickup base 34 on which the optical pickup 25 is mounted, a pair of guide shafts 35a and 35b that support the pickup base 34 so as to be slidable in the radial direction of the optical disk 2, and a displacement drive mechanism 36 that drives the pickup base 34 supported by the pair of guide shafts 35a and 35b so as to be displaced in the radial direction of the optical disk 2.

In the pickup base 34, a pair of guide pieces 37a and 37b, and a guide piece 38 are formed so as to project from opposite sides of the pickup base 34. The pair of guide pieces 37a and 37b each have a guide hole through which the guide shaft 35a as one of the pair of guide shafts 35a and 35b is inserted. The guide piece 38 has a guide groove that nips the other guide shaft 35b. The pickup base 34 is thus slidably supported by the pair of guide shafts 35a and 35b.

The pair of guide shafts 35a and 35b are arranged on the lower surface of the base chassis 27 so as to be parallel to the radial direction of the optical disk 2. The pair of guide shafts 35a and 35b guide the pickup base 34, on which the optical pickup 25 is exposed through the pickup opening 27b of the base chassis 27, between the inner and outer peripheries of the optical disk 2.

The displacement drive mechanism 36 converts the rotational drive of the drive motor 31 attached to the base chassis 27 into a linear drive via a gear and a rack (not shown), and drives the pickup base 34 so as to be displaced in a direction along the pair of guide shafts 35a and 35b, that is, along the radial direction of the optical disk 2. For example, a stepping motor including a lead screw is used as the displacement drive mechanism 36.

Next, description will be given of the sub-chassis 29 that supports the above-mentioned base chassis 27 via the dampers 28. The sub-chassis 29 is raised and lowered in accordance with the conveyance of the optical disk 2 by the base elevating mechanism 150 described later, thereby bringing the base chassis 27 closer to or away from the optical disk 2. The sub-chassis 29 has a shape substantially identical to the outer shape of the base chassis 27, and is made of a substantially rectangular frame member that is slightly larger than the base chassis 27. The sub-chassis 29 is connected to the base chassis 27 to constitute the base unit 22 together with the base chassis 27. The sub-chassis 29 is provided along a side portion where the guide shaft 35a is provided. A reinforcing chassis 44 for reinforcing the sub-chassis 29 is integrally attached to the sub-chassis 29. In the sub-chassis 29, the connecting pieces 45a and 45b to which the dampers 28a and 28b are attached and which are connected to the base chassis 27 are formed. The connecting piece 45a is provided on one longitudinal side surface and at a position corresponding to the connecting piece 41a of the base chassis 27. The connecting piece 45b is provided on the other longitudinal side surface and at an end on the disk mounting portion 23 side corresponding to the connecting piece 41b of the base chassis 27.

Figure 7:
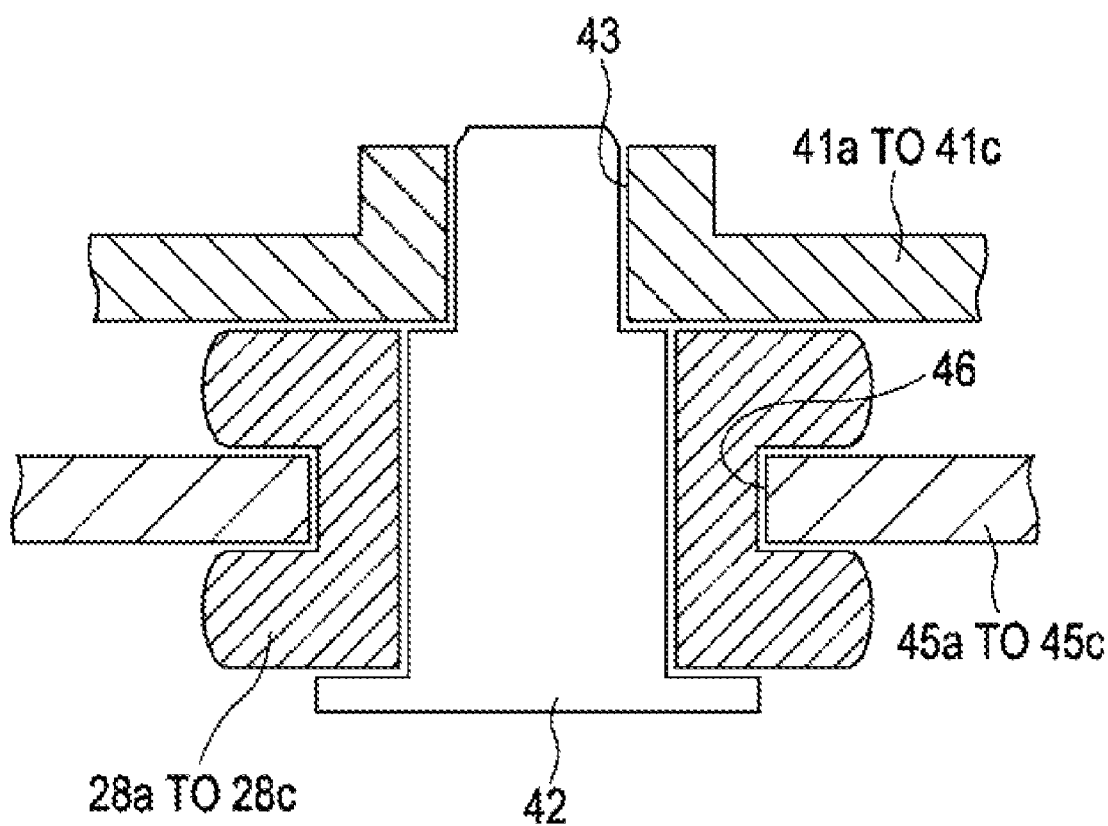
FIG. 7 is a sectional view showing the connection part between a base chassis and a sub-chassis.

It should be noted that at an end of the other longitudinal side surface opposite to the disk mounting portion 23, no connecting piece is provided in the sub-chassis 29, and a connecting piece 45c is provided in the reinforcing chassis 44 fixed to the sub-chassis 29 in association with a connecting piece 41c of the base chassis 27. As shown in FIG. 7, an insertion hole 46 formed continuous to each of the insertion holes 43 of the respective connecting pieces 41a to 41c of the base chassis 27 is bored in each of the connecting pieces 45a to 45c. The dampers 28a to 28c are attached to the connecting pieces 45a to 45c, respectively. The connecting pieces 45a to 45c are connected to the connecting pieces 41a to 41c of the base chassis 27 via the dampers 28a to 28c. The stepped screw 42 is inserted through each of the insertion holes 43 and 46.

As shown in FIG. 6, the sub-chassis 29 has a first support shaft 47, a second support shaft 48, and a third support shaft 49. The first support shaft 47 is located on the disk mounting portion 23 side of the side surface opposed to the slider 122 described later, and is engaged with a first cam slit 130 of the slider 122 to be supported therein. The second support shaft 48 is located on the disk mounting portion 23 side of the side surface opposed to a sub-slider 151, and is engaged with a second cam slit 170 of the sub-slider 151 to be supported therein. The third support shaft 49 is located at the front side of the side surface opposite to the side surface opposed to the slider 122, and is rotatably supported in a shaft hole 9 (see FIG. 4) provided in the side plate portion 6b of the main chassis 6.

Therefore, as the first support shaft 47 slides in the first cam slit 130 and the second support shaft 48 slides in the second cam slit 170 in conjunction with the sliding movements of the slider 122 and sub-slider 151, the disk mounting portion 23 side of the sub-chassis 29 is rotated about the third support shaft 49, thus making it possible to raise and lower the base chassis 27.

As shown in FIG. 3, provided upright on the bottom portion of the bottom case 4 is a support pin 10 for preventing the eject arm 52 described later from flexing downward when the eject arm 52 is rotated near the disk mounting portion 23. The support pin 10 is provided to prevent the optical disk 2 from being scratched as the optical disk 2 comes into collision against the disk mounting portion 23 due to downward flexure of the eject arm 52. The support pin 10 is located near the disk mounting portion 23 of the base unit 22. The support pin 10 projects upward from the bottom portion of the bottom case 4, and is inserted through an insertion hole 30a bored in the decorative laminate 30 to be exposed onto the disk conveyance area.

Figure 8:
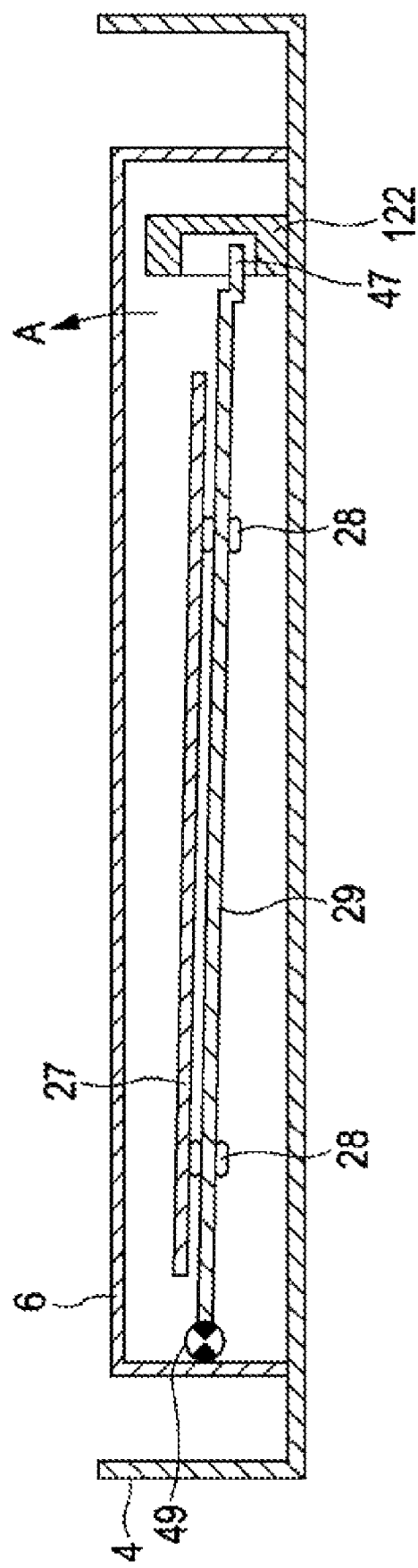
FIG. 8 is a view showing a support structure using a damper between a base chassis and a sub-chassis in a base unit.

As shown in the schematic view of FIG. 8, the base unit 22 constructed as described above is raised and lowered in the arrow A direction and in a direction opposite to the arrow A direction. At this time, the base chassis 27 is supported only by the sub-chassis 29 via the respective dampers 28. This means that vibrations from the outside are all transmitted via the sub-chassis 29 attached with the dampers 28, thus providing enhanced resistance against impact. An excess weight including the respective dampers 28 is not applied to the base chassis 27. In other words, since the total weight of the base chassis 27 as an object to which impact is transmitted is light because the dampers are not provided, a further improvement is achieved in terms of impact resistance.

It should be noted that in the disk drive device 1, when fixing the main chassis 6 to the bottom case 4, the main chassis 6 may be fixed via the dampers. Specifically, as shown in FIG. 9, the dampers 28 are provided between the respective guide pieces 6f and the screw holes 4c of the bottom case 4 to fix the main chassis 6 with stepped screws.

Figure 10:
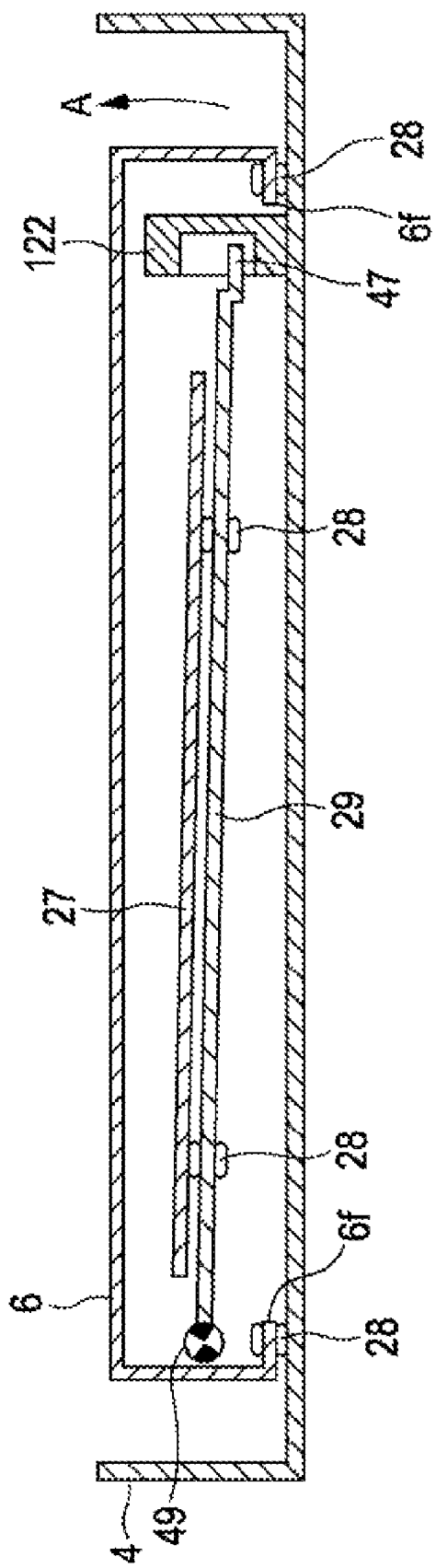
FIG. 10 is a sectional view showing another example of disk drive device.

As shown in the schematic view of FIG. 10, in the base unit 22 fixed in this way, the sub-chassis 29 is supported by the main chassis 6, and the main chassis 6 is fixed to the bottom case 4 via the dampers 28. At this time, the base chassis 27 is supported solely by the sub-chassis 29 via the dampers 28a to 28c, and the sub-chassis 29 is supported by the main chassis 6, so the main chassis 6 is fixed to the bottom case 4 via the dampers 28. This means that vibrations from the outside are transmitted via the main chassis 6 attached with the dampers 28 and the sub-chassis 29 attached with the dampers 28a to 28c. Since the vibrations are thus transmitted via the dampers arranged at two stages, a further improvement is achieved in terms of resistance against impact. Further, as shown in FIG. 9, a buffer material 39 may be further provided between the substantially intermediate portion of the side plate portion 6b of the main chassis 6 and the bottom case 4. The buffer material 39 is formed of an elastic member such as a thin rubber piece in order to block the path through which impact is transmitted as the side plate portion 6b and the bottom case 4 are brought into direct contact with each other due to the amplitude of vibration caused by impact. An adhesive layer is formed on one side of the buffer material 39. This adhesive layer is glued to the side plate portion 6b of the main chassis 6.

Consequently, even when the clearance between the bottom case 4 and the main chassis 6 is narrowed, and the main chassis 6 is connected to the interior of the bottom case 4 via the dampers 28, it is possible to prevent a situation where the side plate portion 6b of the main chassis 6 comes into contact with the bottom case 4, and disturbance is transmitted to the main chassis 6 and the base chassis 22 via the contact portion.

The disk drive device 1 includes the disk conveying mechanism 50 that performs conveyance of the optical disk 2 between a draw-in position (FIG. 15) where the optical disk 2 is inserted from the disk slot 19 and started to be drawn into the housing 3, a centering position (FIG. 16) where the optical disk 2 is aligned with the turntable 23a of the disk mounting portion 23 and mounted thereon, and a stop position (FIG. 18) where the optical disk 2 is ejected from the disk slot 19 after a recording/reproducing operation is finished.

The disk conveying mechanism 50 has the loading arm 51 and the eject arm 52, which are allowed to swing within a plane parallel to the principal surface of the optical disk 2 as support members to be moved between the upper surface 6a of the main chassis 6 and the principal surface opposed to the disk mounting portion 23 of the top plate portion 5a, the loading cam plate 53 that transmits the driving force from the drive mechanism 120 described later to the loading arm 51, the first link arm 54 that is engaged with the eject arm 52 and rotates the eject arm 52 in a direction for ejecting the optical disk 2, the second link arm 55 connected to the first link arm 54, a tension coil spring 56 suspended between the first and the second link arms 54 and 55, the guide cam 57 with which a guide projection 113 of the second link arm 55 is engaged and which guides the second link arm 55, and the operating arm 58 that is connected to the second link arm 55 and the drive mechanism 120 to thereby operate the first link arm 54 to move in a direction in which the eject arm 52 inserts or ejects the optical disk 2.

In the disk conveying mechanism 50, when the optical disk 2 is inserted from the disk slot 19 to the draw-in position and the ejector arm 52 is thus rotated to a predetermined position, the optical disk 2 is automatically drawn in to the disk mounting portion 23 by the loading arm 51, and the eject arm 52 is rotated to the front side of the housing 3, thereby ejecting the optical disk 2. Specifically, during the period of time after insertion of the optical disk 2 until the eject arm 52 is rotated to a predetermined position to start a drawing-in operation, a rotation support member 71 of the eject arm 52 is rotated in the arrow $b_1$ direction, and an engaging protrusion 116 provided in the second link arm 55 is guided by a cam groove 108 formed in the operating arm 58, causing movement in the arrow $b_1$ direction while restricting free rotation of the first link arm 54 connected to an engaging hole 80 of the rotation support member 71, so the tension coil spring 56 suspended between the second link arm 55 and the locking portion 98 of the main chassis 6 expands. Thus, the eject arm 52 is rotated in the insertion direction while being urged in the ejecting direction by the tension coil spring 56.

In the disk conveying mechanism 50, during the drawing-in operation of the optical disk 2, the second link arm 55 is moved to the locking portion 98 side together with the operating arm 58, causing the expanded tension coil spring 56 to contract. The urging force exerted in the ejecting direction of the eject arm 52 thus decreases.

In the disk conveying mechanism 50, when ejecting the optical disk 2, the guide projection 113 of the second link arm 55 is guided by the guide cam 57, so the expansion of the tension coil spring 56 is suppressed, and the eject arm 52 is rotated in the arrow $b_2$ direction as the ejecting direction in accordance with the operation of the operating arm 58. That is, in a state with hardly any urging force being exerted by the tension coil spring 56, the eject arm 52 is rotated through the operation of the operating arm 58, thus ejecting the optical disk 2.

Accordingly, during the insertion process in which the optical disk 2 is inserted to the draw-in position by the user, an urging force in the ejecting direction can be exerted as the tension coil spring 56 is expanded. Thus, it is possible to prevent a situation where, when the insertion of the optical disk 2 by the user is discontinued, the optical disk 2 is left only halfway inserted into the housing 3. During the draw-in process of the optical disk 2 by the loading arm 51, the urging force in the ejecting direction exerted on the eject arm 52 can be reduced due to contraction of the tension coil spring 56, thus permitting a smooth drawing-in operation. Further, during the ejection process of the optical disk 2, the second link arm 55 and the locking portion 98 of the main chassis 6 are brought closer to each other and the contracted state of the tension coil spring 56 is maintained, so the urging force in the ejecting direction applied to the eject arm 52 by the tension coil spring 56 does not act. Thus, the eject arm 52 is rotated in accordance with the operation of the operating arm 58 applied with the driving force from the drive mechanism 120, thereby allowing the optical disk 2 to be stably ejected to a predetermined stop position where the center hole 2a of the optical disk 2 is ejected to the outside of the housing 3, without relying on the elastic force.

The respective components of the disk conveying mechanism 50 will now be described in detail.

Figure 12:
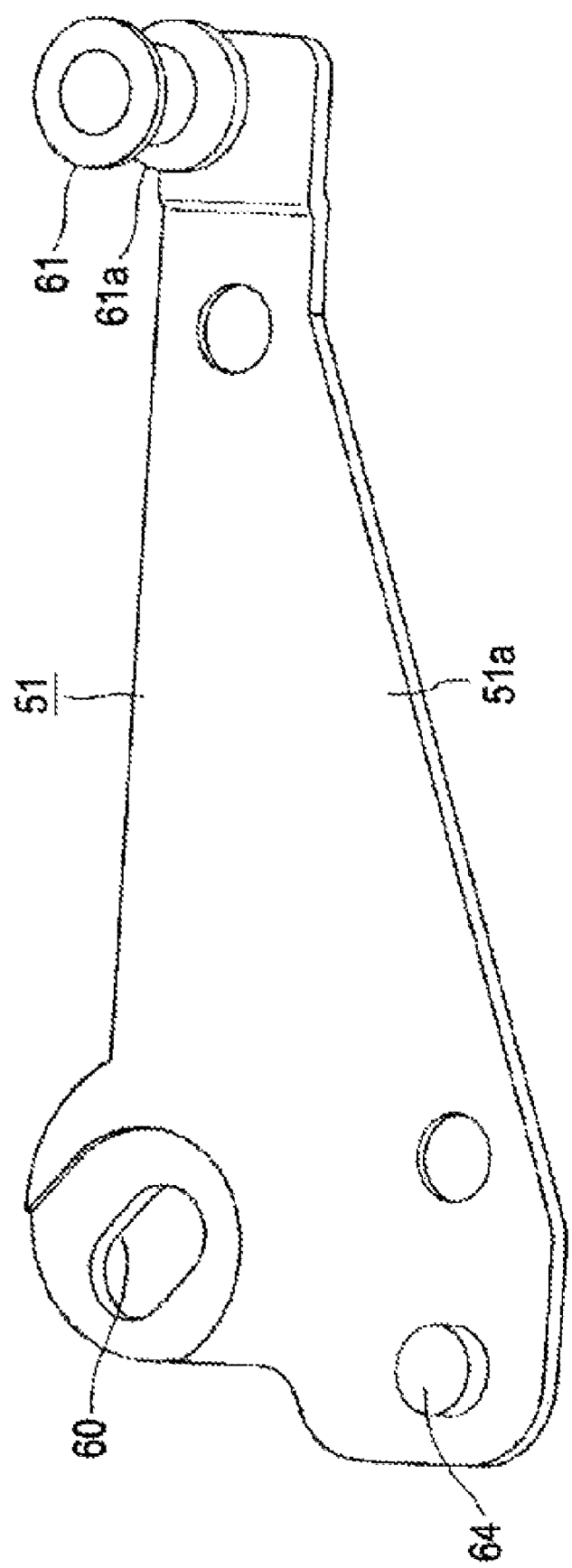
FIG. 12 is a perspective view showing a loading arm.
Figure 13:
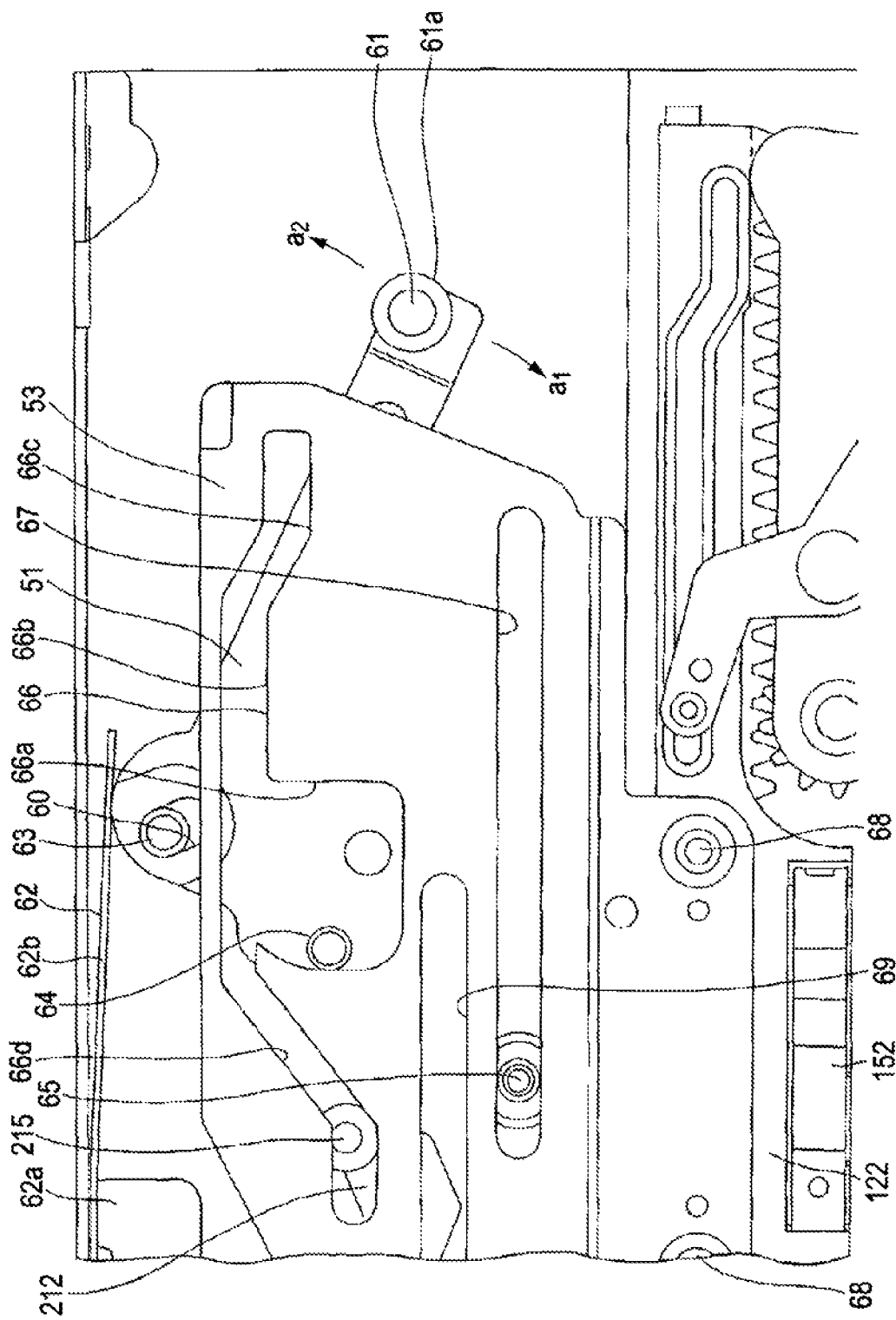
FIG. 13 is a plan view showing a loading arm.

The loading arm 51 draws the optical disk 2 onto the disk mounting portion 23. The proximal end of the loading arm 51 is rotatably supported on the deck portion 4a of the bottom case 4 so as to be located on the disk slot 19 side with respect to the disk mounting portion 23. The distal end of the loading arm 51 is rotatable in the arrow $a_1$ direction and the arrow $a_2$ direction in FIG. 11. Specifically, as shown in FIGS. 12 and 13, the loading arm 51 includes an arm body 51a made of a flat-shaped sheet metal. An insertion hole 60 is bored at one end of the arm body 51a. The insertion hole 60 is engaged with a substantially cylindrical rotation support member 63 provided so as to protrude from the deck portion 4a, whereby the loading arm 51 is supported so as to be rotatable on the deck portion 4a about the rotation support member 63 in the arrow $a_1$ direction in FIG. 13 for loading the optical disk and in the arrow $a_2$ direction in FIG. 13 for ejecting the optical disk.

The insertion hole 60 is formed as an elongated hole. The loading arm 51 is thus rotated in the arrow $a_1$ direction and arrow $a_2$ direction in the drawing while moving along the insertion hole 60. Accordingly, as will be described in detail later, during the insertion, drawing-in, and ejection processes of the optical disk 2, the loading arm 51 absorbs a difference in rotation timing that develops between it and the eject arm 52 in accordance with the stroke of the slider 122, thus enabling smooth insertion and ejection of the optical disk 2.

The loading arm 51 has an upwardly projecting abutting portion 61 provided at the distal end of the arm body 51. The abutting portion 61 is brought into contact with the outer peripheral portion of the optical disk 2 inserted from the disk slot 19. A small-diameter rotary roller 61a is rotatably attached to the abutting portion 61. The abutting portion 61 is made of resin softer than the optical disk 2. The central portion of the abutting portion 61, which is brought into abutment with the outer periphery of the optical disk 2 inserted from the disk inserting and ejecting opening 19, curves inward. The abutting portion 61 is enlarged in diameter at both ends, forming a substantially drum-shaped flange portion for regulating the movement of the optical disk 2 in the height direction.

The portion of the loading arm 51 near the insertion hole 60 is pressed against a leaf spring 62 from the side. Thus, due to the urging force of the leaf spring 62, the loading arm 51 is constantly urged so as to rotate about the insertion hole 60 in the arrow $a_1$ direction in FIG. 13 for urging the optical disk 2 from the disk slot 19 side to the disk mounting portion 23 side. The leaf spring 62 urging the loading arm 51 includes a base portion 62a fixed onto the deck portion 4a, and an arm portion 62b extended from one end of the base portion 62a to urge the locking arm 51.

Further, the loading arm 51 has an engaging projection 64 that is inserted through and engaged with a first cam groove 66 of the loading cam plate 53 described later. As the engaging projection 64 moves along the first cam groove 66 of the loading cam plate 53, the loading arm 51 is rotated while regulating the urging force of the leaf spring 62.

The loading cam plate 53 is made of a flat-shaped sheet metal. The loading cam plate 53 is engaged with the slider 122 of the drive mechanism 120 described later to move back and forth on the deck portion 4a as the slider 122 moves, thereby rotating the loading arm 51 and the regulating arm 212 that regulates the urging force of the deck arm 200 described later.

The loading cam plate 53 is overlapped on the loading arm 51 and the regulating arm 212 rotatably supported on the deck portion 4a and, at the same time, the engaging projection 64 of the loading arm 51 and a rotation guide portion 215 of the regulating arm 212 are inserted through the loading cam plate 53. Consequently, the loading cam plate 53 regulates the rotations of the loading arm 51 and regulating arm 212 in accordance with insertion and ejection of the optical disk 2.

Figure 14A:
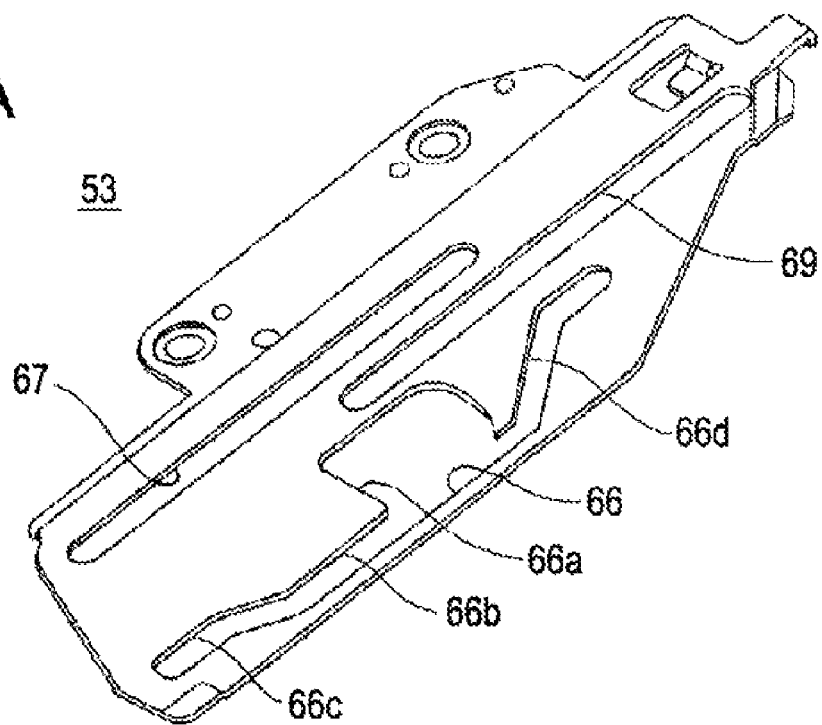
Figure 14B:
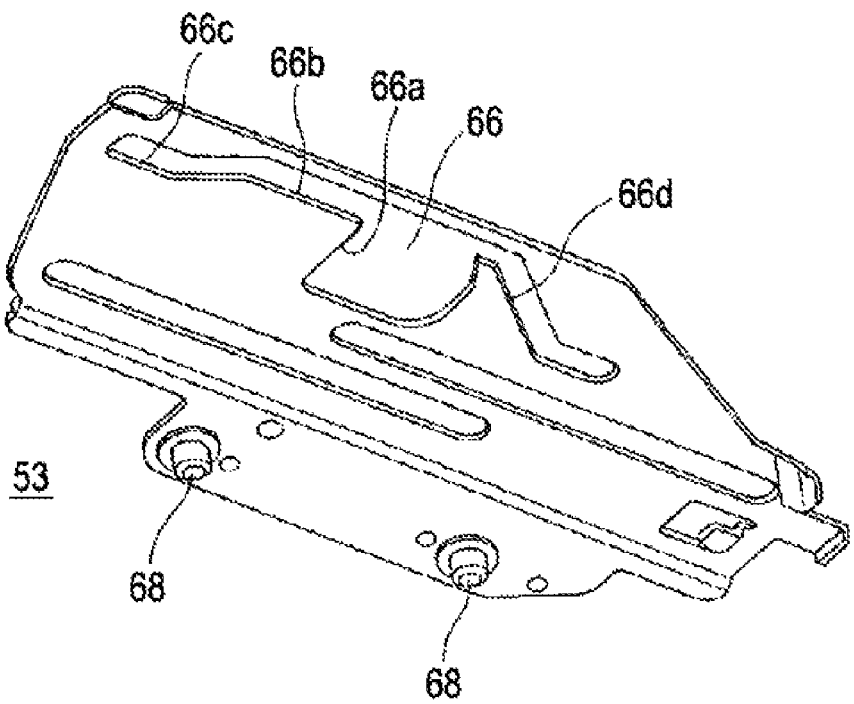

As shown in FIGS. 14A and 14B, the loading cam plate 53 includes the first cam groove 66 through which the engaging projection 64 provided so as to project from the loading arm 51 is inserted, a second cam groove 67 through which a guide projection 65 provided so as to project from the deck portion 4a is inserted, a pair of engaging protrusions 68 that engage with the slider 122, and a third cam groove 69 through which a rotation support pin 217 that rotatably supports the regulating arm 212 onto the deck portion 4a is inserted.

As the engaging projection 64 is slid in the first cam groove 66, the first cam groove 66 restricts the rotation of the loading arm 51 urged in the loading direction of the optical disk 2 by the leaf spring 62. As the rotation guide portion 215 is slid in the engaging projection 64, the engaging projection 64 causes the regulating arm 212 to rotate to thereby control the urging force of a coil spring 203 locked to the deck arm 200.

Figure 11:
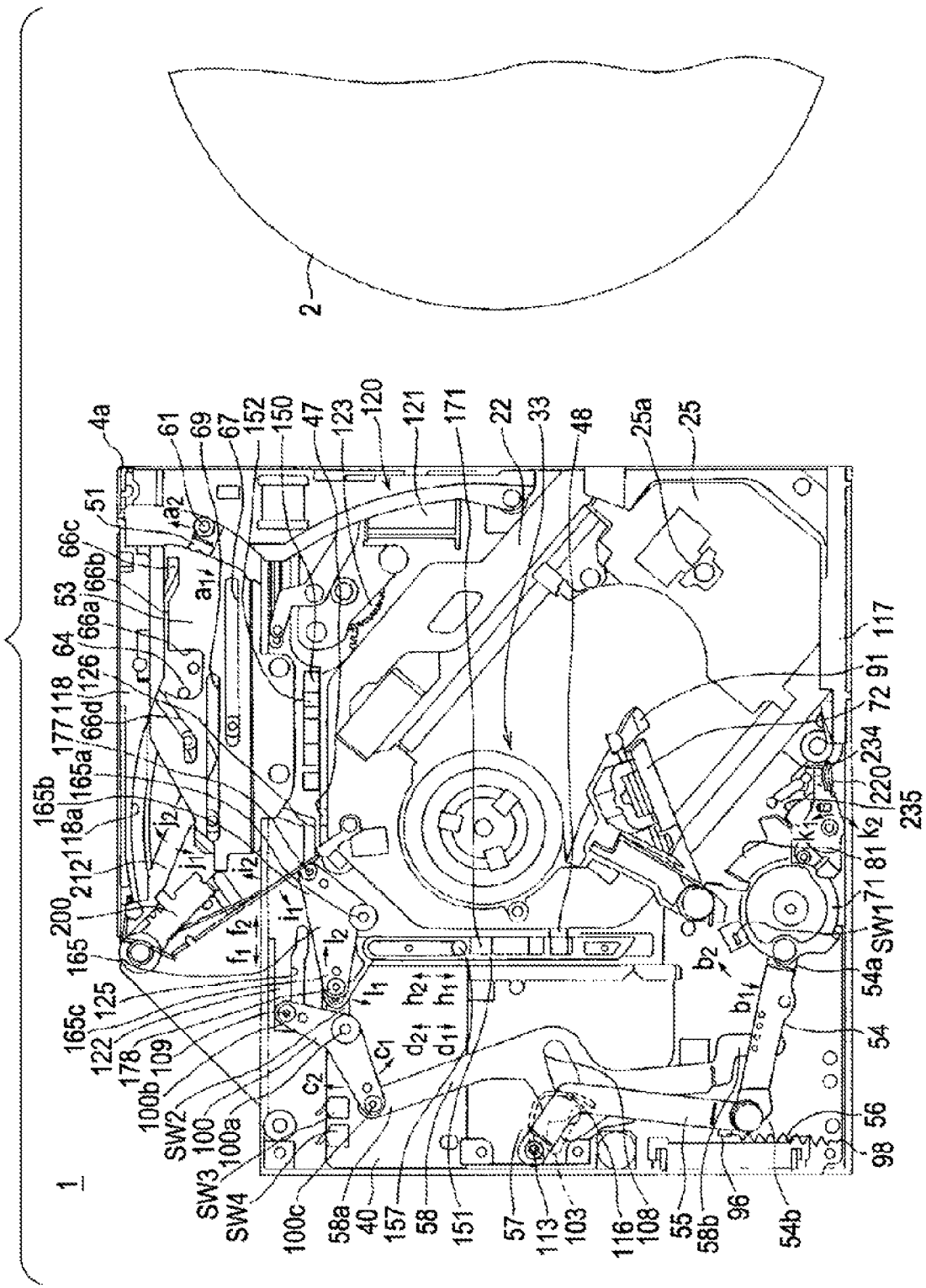
FIG. 11 is a plan view showing a disk drive device that is waiting on standby for the insertion of an optical disk.

As shown in FIGS. 11 and 13, the first cam groove 66 includes a first guide portion 66a that regulates the engaging projection 64 to rotate the loading arm 51 in the arrow $a_1$ direction in FIG. 11 which is the drawing-in direction of the optical disk 2, a second guide portion 66b that is formed adjacent and continuous to the first guide portion 66a and regulates the rotation position of the loading arm 51 to support the optical disk 2 at the centering position, a third guide portion 66c that is formed continuous to the second guide portion 66b and guides the engaging projection 64 such that the loading arm 51 rotates in the arrow $a_2$ direction in FIG. 11 in which the loading arm 51 separates away from the outer periphery of the optical disk 2 mounted on the disk mounting portion 23, and a fourth guide portion 66d that is provided on the side opposite to the second guide portion 66b across the first guide portion 66a and guides the rotation guide portion 215 to rotate the regulating arm 212.

The first guide portion 66a is formed in a direction substantially orthogonal to the moving direction of the loading cam plate 53. As the loading cam plate 53 is moved in the arrow $f_1$ direction to the rear side within the housing 3, the first guide portion 66a is brought into abutment with the engaging projection 64 from the front side, causing the loading arm 51 to rotate in the arrow $a_1$ direction in FIG. 11. The second guide portion 66b is formed substantially in parallel to the moving direction of the loading cam plate 53, and regulates the rotation of the loading arm 51 rotated in the arrow $a_1$ direction for drawing in the optical disk 2 by the first guide portion 66a, thereby performing centering on the optical disk 2. The third guide portion 66c is bent toward the inner side of the housing 3 from the second guide portion 66b. The third guide portion 66c guides the engaging projection 64 to separate the loading arm 51 from the side surface of the optical disk 2 mounted on the disk mounting portion 23, thereby allowing the optical disk 2 to rotate. The fourth guide portion 66d guides the rotation guide portion 215 of the regulating arm 212. The fourth guide portion 66d rotates the regulating arm 212 in accordance with the sliding movement of the loading cam plate, thereby controlling the urging force applied by the deck arm 200 described later.

Figure 15:
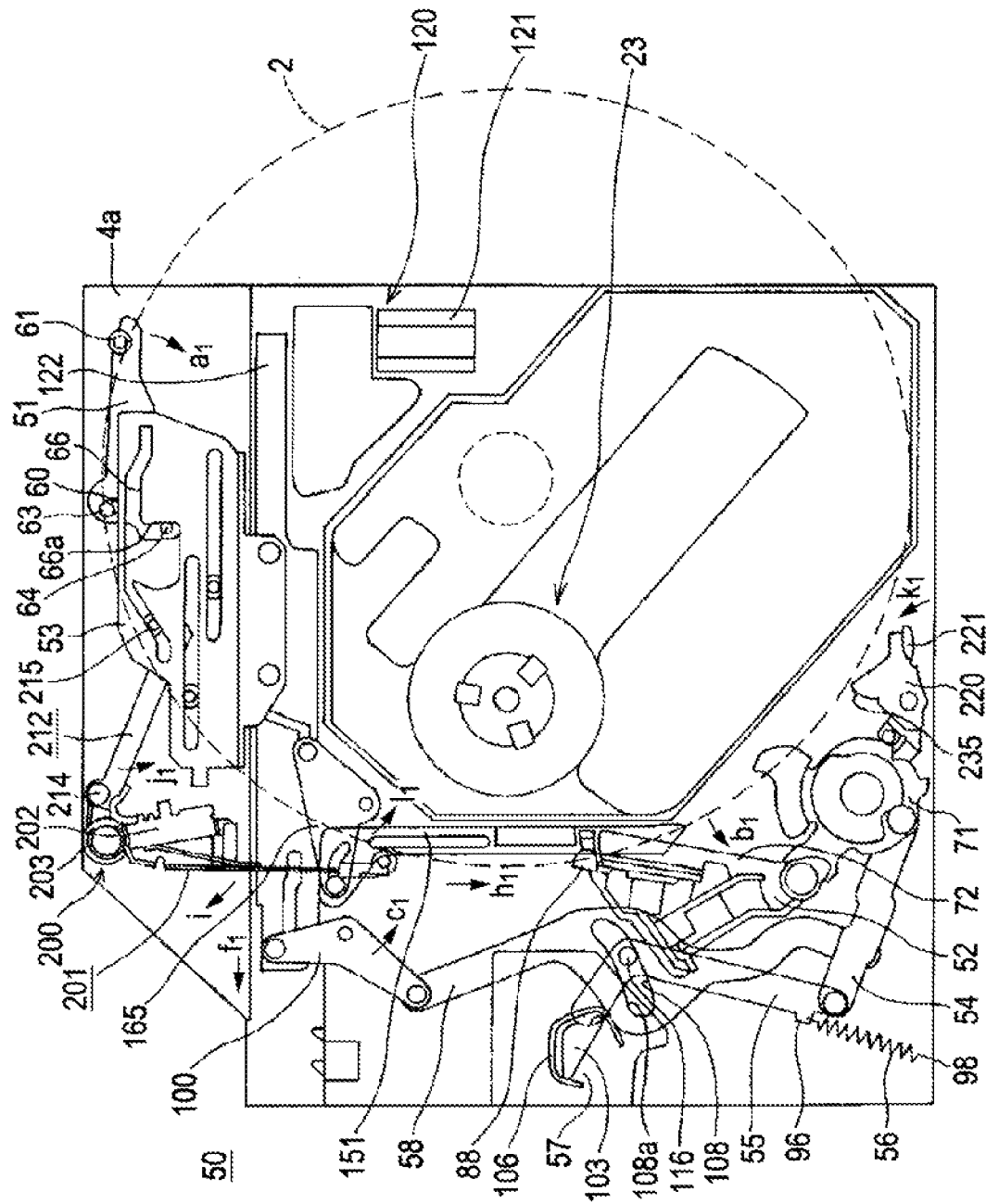
FIG. 15 is a plan view showing a disk drive device as it draws in an optical disk.

During standby for the insertion of the optical disk 2, as shown in FIG. 11, the first guide portion 66a of the first cam groove 66 and the engaging projection 64 are separated away from each other, and the engaging projection 64 of the loading arm 51 urged so as to rotate in the arrow $a_1$ direction by the leaf spring 62 is in abutment with a side surface opposed to the first guide portion 66a. The loading cam plate 53 thus restricts the rotation of the loading arm 51 in the arrow $a_1$ direction, thus performing positioning of the loading arm 51 in the standby state for the insertion of the optical disk 2. When the optical disk 2 is inserted into the housing 3 and the loading cam plate 53 is moved to the rear side of the housing 3 by the slider 122, as shown in FIG. 15, the engaging projection 64 is brought into abutment with the first guide portion 66a of the first cam groove 66, causing the loading arm 51 to rotate in the arrow $a_1$ direction in FIG. 15 that is the drawing-in direction of the optical disk 2.

Figure 16:
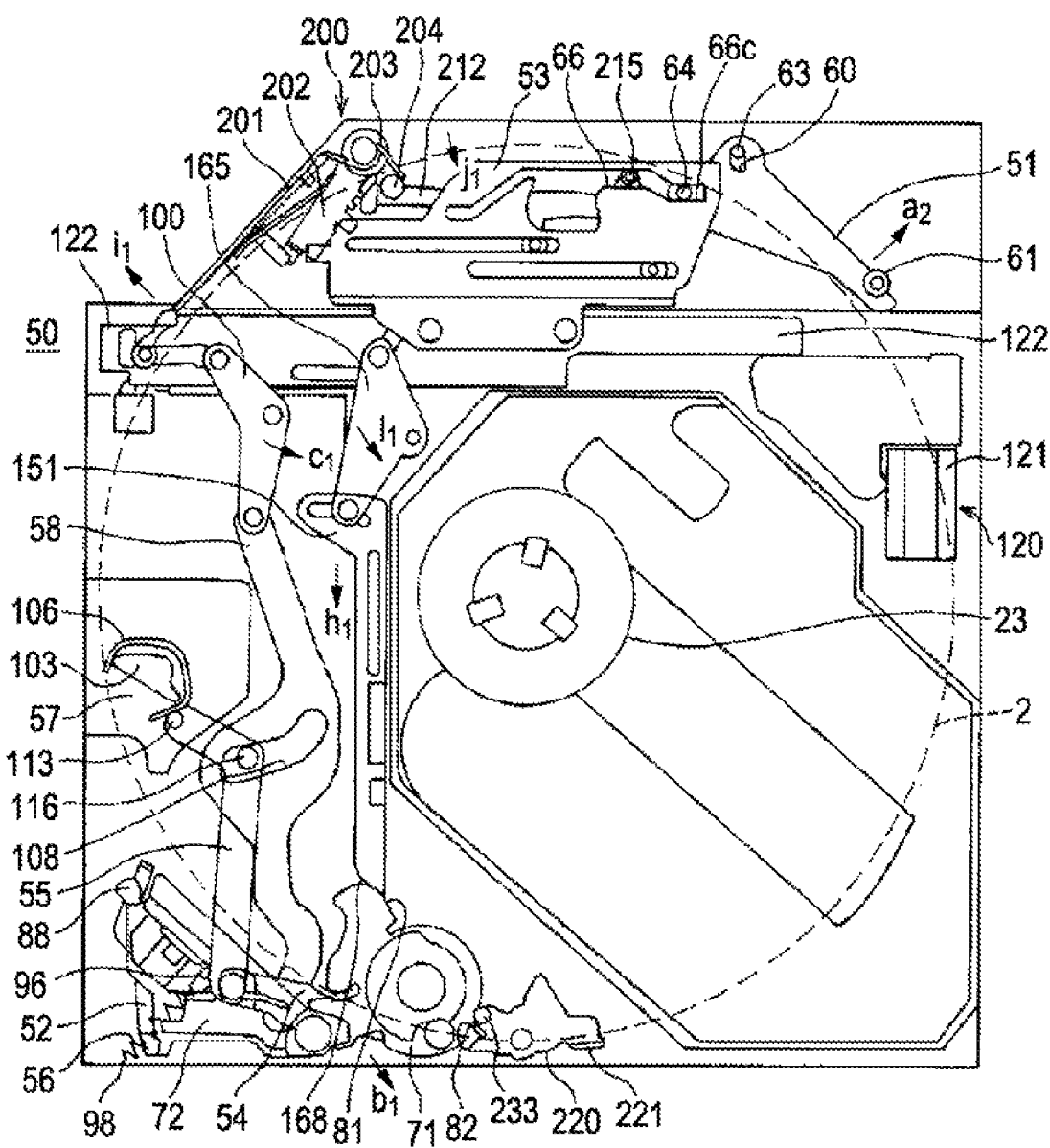
FIG. 16 is a plan view showing a disk drive device on which an optical disk is chucked to perform a recording/reproduction operation.

In the first cam groove 66, when the center hole 2a of the optical disk 2 is conveyed to a position on the turntable 23a of the disk mounting portion 23, the engaging projection 64 enters the second guide portion 66b. Since the relative angle between the engaging projection 64 and the insertion hole 60 does not change in the second guide portion 66b, in the loading arm 51, the abutting portion 61 is no longer rotated in the arrow $a_1$ direction, thus supporting the optical disc 2 at the centering position. Thereafter, when chucking of the optical disk 2 is finished, as shown in FIG. 16, the engaging projection 64 is guided by the third guide portion 66c in the first cam groove 66, causing the loading arm 51 to rotate in the arrow $a_2$ direction in FIG. 16 for separating the loading arm 51 from the optical disk 2.

In the first cam groove 66, when the loading cam plate 53 is moved to the rear side of the housing 3, the rotation guide portion 215 of the regulating arm 212 is rocked as it is guided by the fourth guide portion 66d, thus moving a spring locking portion 214 to which the other end 203b of the coil spring 203 that rotationally urges the deck arm 200 is locked, thereby preventing the urging force of the coil spring 203 from increasing as the optical disk 2 is inserted into the housing 3.

In the first cam groove 66, when ejecting the optical disk 2, as the slider 122 is moved in the arrow $f_2$ direction that is a direction toward the front side and the loading cam plate 53 is moved in the same direction, the engaging projection 64 moves from the third guide portion 66c to the second guide portion 66b. This causes the loading arm 51 to rotate in the arrow $a_1$ direction that is the loading direction of the optical disk 2, thus brining the abutting portion 61 into abutment with the side surface of the optical disk 2 from the front side.

Figure 17:
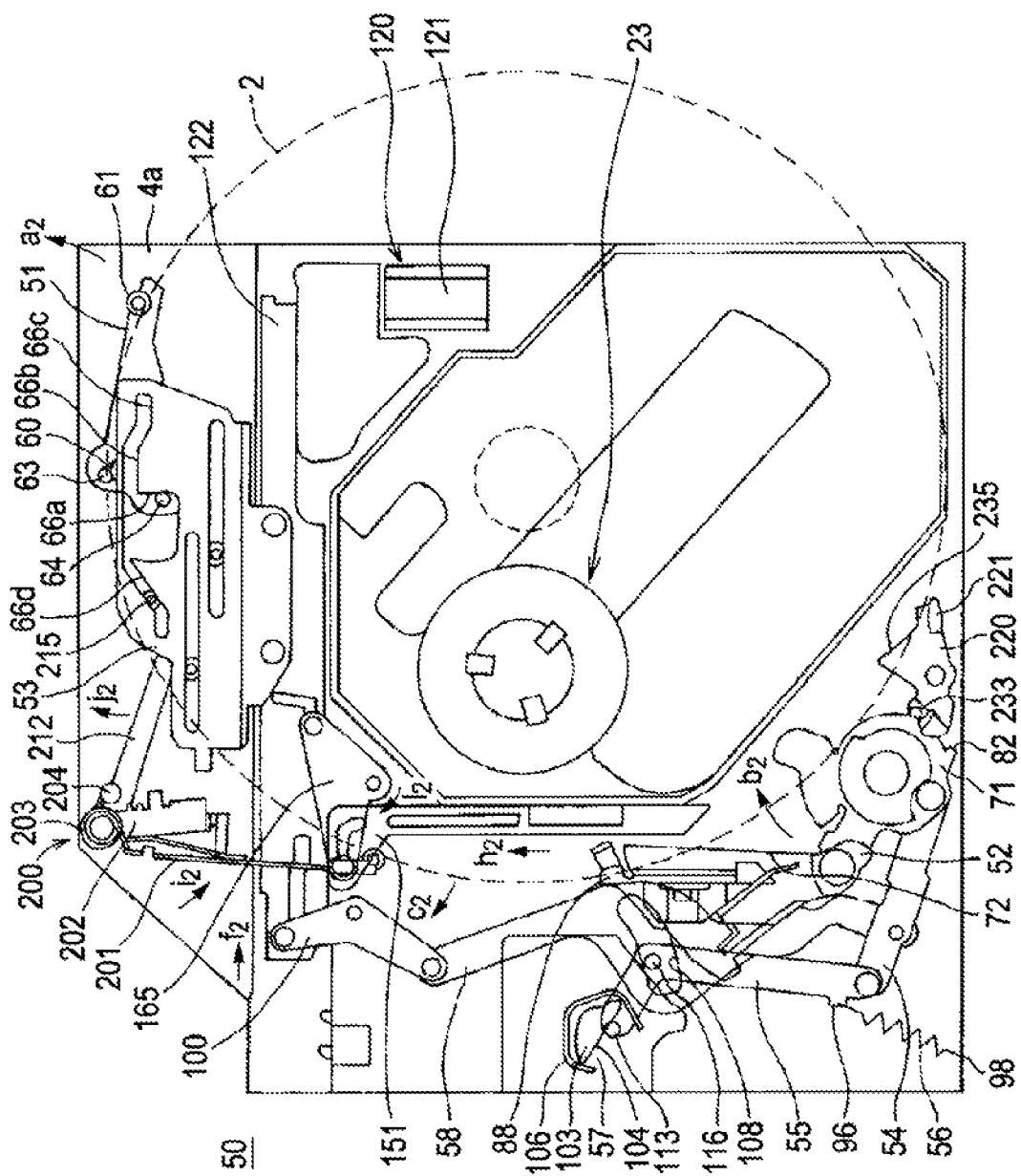
FIG. 17 is a plan view showing a disk drive device as its ejects an optical disk.

When the loading cam plate 53 is further moved in the arrow $f_2$ direction, and the engaging projection 64 is moved from the second guide portion 66b to the first guide portion 66a, as shown in FIG. 17, the abutting portion 61 of the loading arm 51 can rotate in the arrow $a_2$ direction as the first guide portion 66a is moved in the arrow $f_2$ direction. Further, the eject arm 52 is applied with the driving force of the drive mechanism 120 to be thus rotated in the arrow $b_2$ direction for ejecting the optical disk 2. Accordingly, the loading arm 51 is rotated in the arrow $a_2$ direction as it is pressed by the optical disk 2 being conveyed in the ejecting direction.

At this time, the loading arm 51 is rotated while being urged by the leaf spring 62 in the arrow $a_1$ direction that is the insertion direction of the optical disk 2. Accordingly, when ejecting the optical disk 2, the disk conveying mechanism 50 pushes out the optical disk 2 to a predetermined stop position while nipping the optical disk 2 with the loading arm 51 and the eject arm 52. The loading arm 51 can thus prevent sudden pop-out of the optical disk 2.

When the ejection of the optical disk 2 is finished, as shown in FIG. 11, the engaging projection 64 of the loading arm 51 is locked to the side surface opposed to the first guide portion 66a of the first cam groove 66 of the loading cam plate 53. Thus, the loading arm 51 has its rotation in the arrow $a_1$ direction restricted, and waits on standby for the insertion of the optical disk 2.

The second cam groove 67 is inserted through the guide projection 65 provided so as to project from the deck portion 4a to thereby guide the movement of the loading cam plate 53. The second cam groove 67 is a linear cam groove extending parallel to the moving direction of the slider 122. As the guide projection 65 slides following the movement of the slider 122, the second cam groove 67 guides the loading cam plate 53 in the moving direction of the slider 122.

The pair of engaging protrusions 68 that engage with the slider 122 are formed on one side surface of the loading cam late 53 so as to be spaced apart from each other. The engaging protrusions 68 are provided so as to protrude downward, and are extended toward the bottom side of the bottom case 4 to be engaged with engaging recesses 127 of the slider 122 disposed along the side surface of the bottom case 4. The loading cam plate 53 and the slider 122 are thus integrated together, and the loading cam plate 53 is also slid in accordance with the movement of the slider 122.

It should be noted that the other side surface of the loading cam plate 53 opposite to the one side surface where the engaging protrusions 68 are formed is slidably inserted through a clearance provided between a right guide wall 118 and the deck portion 4a, thereby preventing lifting of the loading cam plate 53 from the deck portion 4a.

The third cam groove 69 is inserted onto the rotation support pin 217 that is provided upright on the deck portion 4a and rotatably supports the regulating arm 212 onto the deck portion 4a. Like the second cam groove 67 mentioned above, the third cam groove 69 is also a linear cam groove extending parallel to the moving direction of the slider 122. As it is slid by the rotation support pin 217 in accordance with the movement of the slider 122, the third cam groove 69 guides the loading cam plate 53 in the moving direction of the slider 122.

The eject arm 52 that ejects the optical disk 2 from the disk mounting portion 23 to the outside of the disk slot 19 is disposed on the side surface that is opposite to the side surface where the loading arm 51 is formed, and on the rear side of the housing 3 with respect to the disk mounting portion 23. The eject arm 52 is rotated, while being operated by the first and the second link arms 54 and 55 and the operating arm 58 described later, in the arrow $b_1$ direction in FIG. 11 for conveying the optical disk 2 to the disk mounting portion 23 side and in the arrow $b_2$ direction in FIG. 11 for ejecting the optical disk 2 to the disk slot 19 side. Accordingly, the eject arm 52 is rotated between a home position (FIG. 11) where the eject arm 52 waits on standby for the insertion of the optical disk 2, a mounting position (FIG. 16) where the optical disk 2 is mounted onto the turntable 23a, and an eject position (FIG. 18) where the optical disk 2 is ejected from the housing 3.

Figure 19:
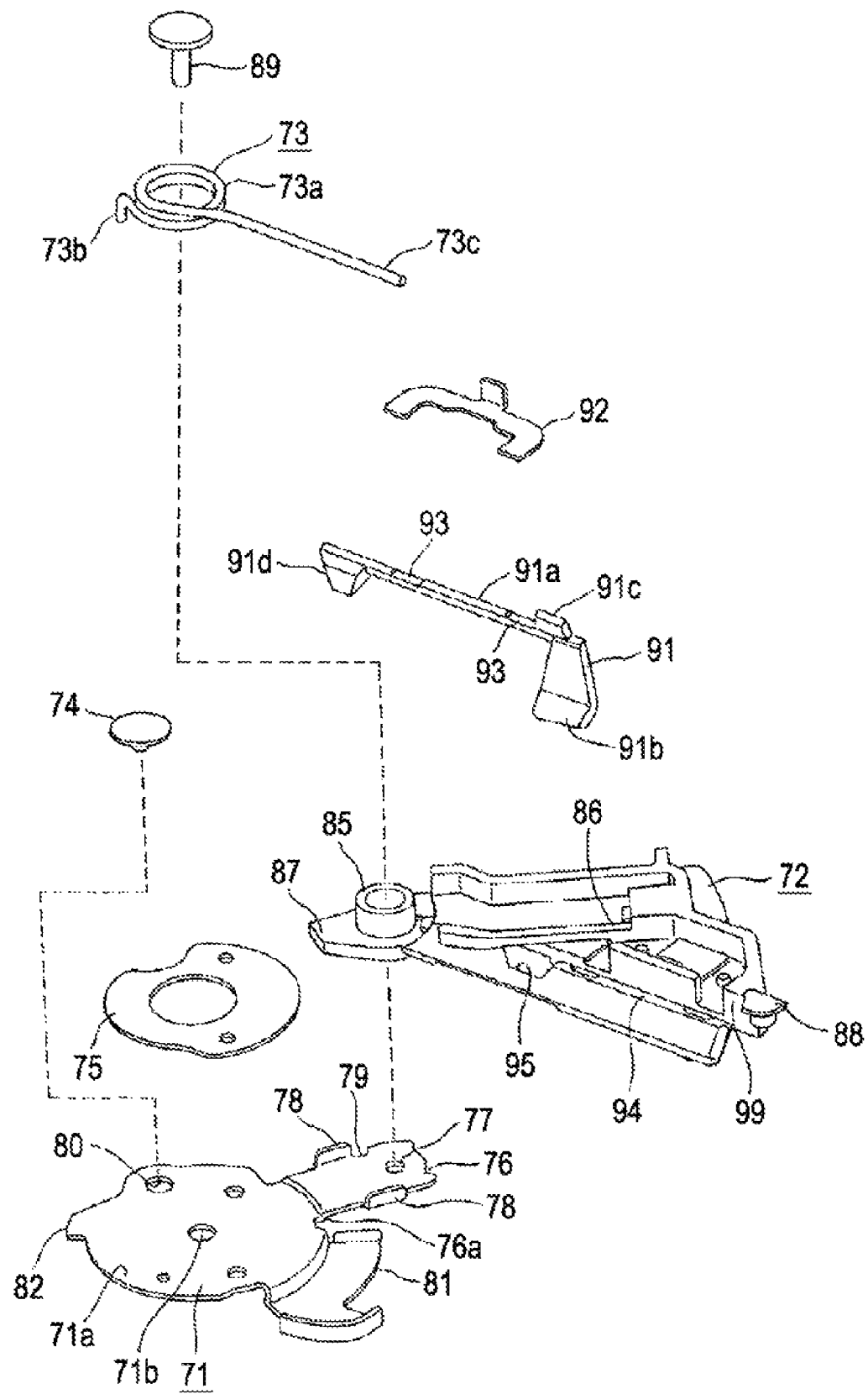
FIG. 19 is an exploded perspective view showing an eject arm.
Figure 20:
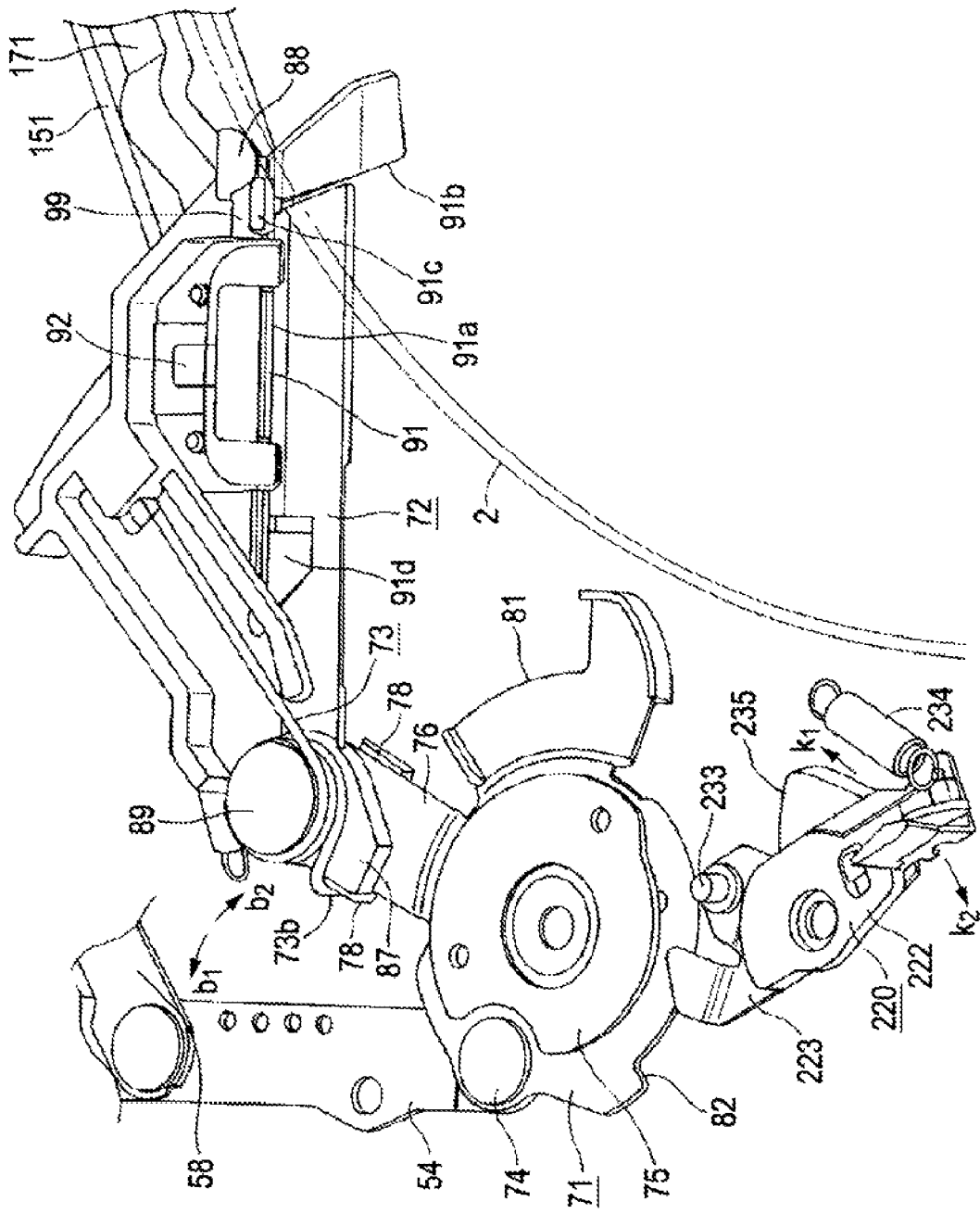
FIG. 20 is a perspective view showing an eject arm.

As shown in FIGS. 19 and 20, the eject arm 52 includes the rotation support member 71 rotatably supported on the main chassis 6, a push-out arm 72 that is rotatably engaged with the rotation support member 71 and pushes out the optical disk 2, a coil spring 73 that urges the push-out arm 72 in the ejecting direction of the optical disk 2.

The rotation support member 71 is made of a substantially circular sheet metal and rotatably attached to the upper surface 6a of the main chassis 6 from the side opposite to the disk conveyance area of the upper surface 6a. An attachment opening 71b for attaching the rotation support member 71 to the main chassis 6 is bored at substantially the center of a principal surface 71a of the rotation support member 71. A spacer 75 is arranged between the rotation support member 71 and the main chassis 6, and the rotation support member 71 is rotatably attached to the main chassis 6 via the spacer 75.

The rotation support member 71 has an engaging piece 76 with which the push-out arm 72 and the coil spring 73 are engaged. The engaging piece 76 is bent from the distal end of an upright wall 76a provided upright on the principal surface 71a. The engaging piece 76 is thus provided above the principal surface 71a and projected to the upper surface 6a side from the eject-arm opening 6d of the main chassis 6. The engaging piece 76 includes an opening 77 that is continuous to an engaging projection 85 of the push-out arm 72 and rotatably caulked together with the engaging projection 85 by means of a caulking shaft 89, a pair of rotation regulating walls 78 that abut a side portion of the push-out arm 72 to regulate the rotation range of the push-out arm 72, and a locking recess 79 into which one arm 73b of the coil spring 73 is locked. The rotation regulating walls 78 are formed so as to rise from the left and right sides of the engaging piece 76. When a regulating projection 87 formed in the push-out arm 72 is disposed between the rotation regulating walls 78, the rotation regulating walls 78 regulate the rotation range of the push-out arm 72.

In the rotation support member 71, an engaging hole 80 with which the first link arm 54 described later is rotatably engaged is formed in the principal surface 71a. The engaging hole 80 is communicated with an insertion hole formed at one end 54a of the first link arm 54, and is rotatably connected to the first link arm 54 with a screw 74.

The rotation support member 71 has a bent piece 81 formed so as to extend from one side portion of the principal surface 71a. The bent piece 81 is bent downward from the principal surface 71a to serve as an abutting piece that is abutted against the sub-slider 151 of the base elevating mechanism 150 described later. When the optical disk 2 is inserted and thus the bent piece 81 is rotated in the arrow $b_1$ direction in FIG. 11 for conveying the optical disk 3 to the disk mounting portion 23 side, the bent piece 81 turns on a first switch SW1 mounted on the circuit board 40. Accordingly, the disk drive device 1 can detect that the eject arm 52 pressed by the optical disk 2 has been rotated to the rear side of the housing 3, thus making it possible to detect the timing for driving the drive mechanism 120.

Figure 21:
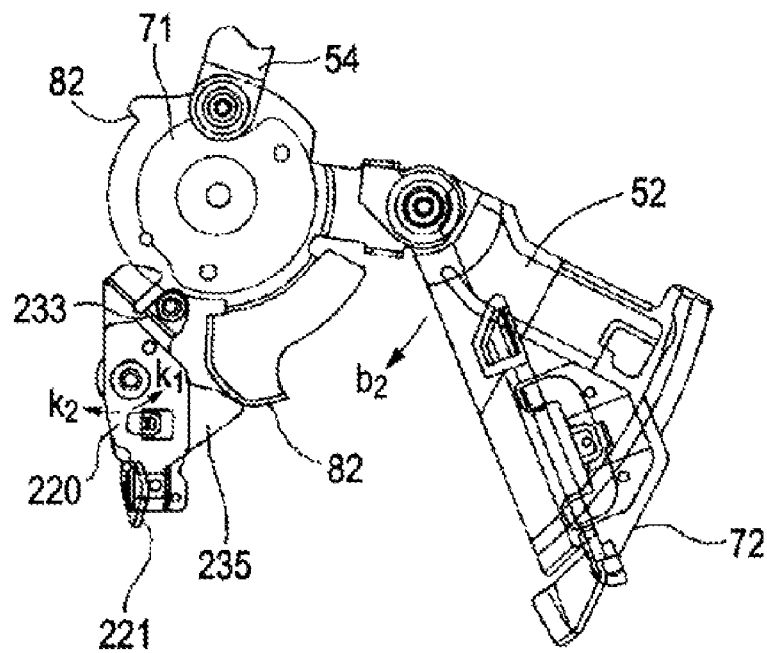
FIG. 21 is a plan view showing a state in which an eject arm is rotated and returned to a home position by a position regulating member.
Figure 22:
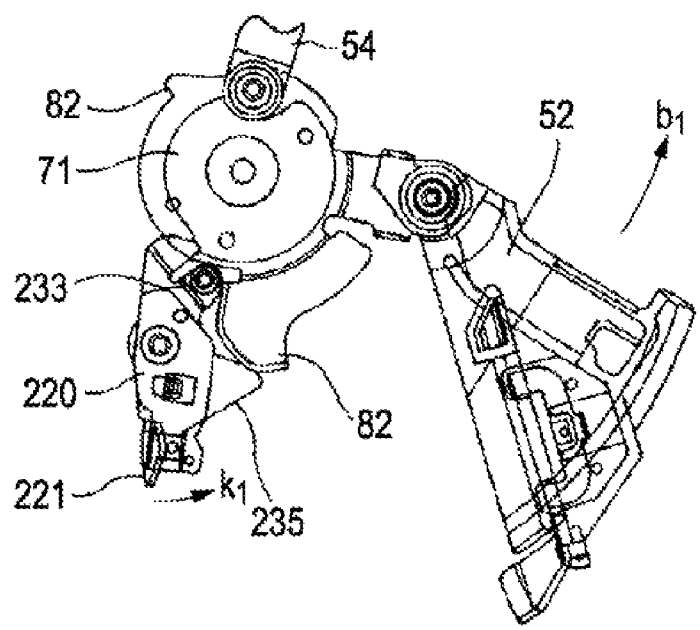
FIG. 22 is a plan view showing an eject arm that has been rotated to an eject position to bring a rotation support member into abutment with a position regulating member of a centering guide.

As shown in FIGS. 21 and 22, during the ejection process of the optical disc 2 by the eject arm 52, the bent piece 81 is in abutment with a position regulating member 235 that rotates and returns the eject arm 52, which has been rotated to the eject position for ejecting the optical disk 2 from the disk slot 19, to the home position.

The position regulating member 235 is formed in a guide plate 222 of the centering guide 220 described later. The centering guide 220 is rotatably attached to the upper surface 6a of the main chassis 6. As the guide piece 221 of the centering guide 220 is projected through the centering-guide opening 6h of the upper surface 6a onto the disk conveyance area, centering is performed on the optical disk 2. The centering guide 220 is constantly urged by a tension coil spring 234 so as to rotate in the arrow $k_1$ direction in FIG. 29 for locking the guide piece 221 into the centering-guide opening 6h. This causes the position regulating member 235 formed in the guide plate 222 to be held at a position where the position regulating member 235 is in abutment with the bent piece 81 formed in the rotation support member 71 of the eject arm 52 that has been rotated to the eject position.

During the ejection process of the optical disk 2, when the eject arm 52 is rotated in the arrow $b_2$ direction and moved from the mounting position to the eject position via the home position, as shown in FIG. 22, the position regulating member 235 is brought into abutment with the bent piece 81 of the rotation support member 71. At this time, the centering guide 220 having the position regulating member 235 formed therein is urged by the tension coil spring 234 so as to rotate in the arrow $k_1$ direction substantially opposite to the arrow $b_2$ direction that is the rotating direction of the eject arm 52, and the guide piece 221 is locked into the centering-guide opening 6h to thereby perform positioning. Therefore, as shown in FIG. 21, the position regulating member 235 urges the bent piece 81 in the arrow $b_1$ direction, thereby rotating and returning the eject arm 52 that has been rotated to the eject position to the home position where the eject arm 52 waits on standby for the insertion of the optical disk 2.

As will be described later, the eject position of the optical disk 2 is a position at which the push-out arm 72 that has been rotated beyond the most front side of the housing 3 arrives after being further rotated in the arrow $b_2$ direction. If, with the push-out arm 72 located at this eject position, the insertion of the optical disk 2 is waited for again, there is a fear that the push-out arm 72 that has been pushed to the front side in the insertion direction of the optical disk 2 is not rotated in the arrow $b_1$ direction for conveying the optical disk 2 to the disk mounting portion 23 but is further rotated in the arrow $b_2$ direction.

On the other hand, if the eject arm 52 is designed so as to be rotated to the home position during the ejecting process of the optical disk 2, there is a fear that due to such factors as a variation in the accuracy of such parts as the eject arm 52, the first and second link arms 54 and 55, and the guide cam 57 or age deterioration thereof, the eject arm 52 may not be rotated to the home position, so the optical disk 2 is ejected only by a small amount and not conveyed to the stop position where the center hole 2a becomes exposed through the disk slot 19.

Further, if the rotation range of the eject arm 52 is regulated through locking engagement with the main chassis 6, there is a fear that when an error develops due to such factors as a variation in parts accuracy or assembly accuracy or age deterioration, the eject arm 52 may not be fully rotated to the eject position of the optical disk 2 or may be rotated to a point where an excessive load is applied to the main chassis 6.

Accordingly, the eject arm 52 is adapted to be rotated further in the arrow $b_2$ direction beyond the most front side of the housing 3 up to the eject position during the ejection process of the optical disk 2, thereby conveying the optical disk 2 to a predetermined stop position with reliability. Further, as the rotation support member 71 of the eject arm 52 that has been rotated to the eject position is brought into abutment with the position regulating member 235, the eject arm 52 can be rotated and returned to the home position where the eject arm 52 waits on standby for the insertion of the optical disk 2 again and can be reliably rotated in the arrow $b_1$ direction.

The rotation support member 71 further includes a rotary piece 82 for rotating the centering guide 220 described later so as to separate away from the side surface of the optical disk 2 conveyed to the disk mounting portion 23. When the optical disk 2 is conveyed to the centering position where the optical disk 2 can be mounted onto the disk mounting portion 23, the rotary piece 82 is brought into abutment with a cam shaft 233 of the centering guide 220 due to the rotation of the rotation support member 71, thereby rotating the centering guide 220 so as to separate away from the optical disk 2. The optical disk 2 thus becomes rotatable.

The push-out arm 72 that is rotatably engaged with the engaging piece 76 is a resin-molded member formed in a substantially triangular shape. The push-out arm 72 has the engaging projection 85 onto which the opening 77 of the engaging piece 76 is inserted for engagement, a locking wall 86 to which the other arm 73c of the coil spring 73 is locked, and the support portion 88 that supports the side surface on the insertion-end side of the optical disk 2. The engaging projection 85 is a hollow cylinder formed at one vertex of the substantially triangular shape. The hollow portion thereof is communicated with the opening 77 bored in the engaging piece 76 of the rotation support member 71, and is inserted through a winding portion 73a of the coil spring 73 to be caulked together with the engaging piece 76 with the caulking shaft 89. The push-out arm 72 thus becomes rotatable on the engaging piece 76 about the engaging projection 85.

In the coil spring 73 that is brought into engagement with the engaging piece 76 together with the push-out arm 72 by the caulking shaft 89, the engaging projection 85 is inserted through the winding portion 73a, the one arm 73b is locked into the locking recess 79 formed in the engaging piece 76, and the other arm 73c is locked to the locking wall 86 formed in the push-out arm 72. The push-out arm 72 rotatably supported on the engaging piece 76 is thus rotated so as to rotate in the ejecting direction of the optical disk 2 about the engaging projection 85.

The push-out arm 72 has the regulating projection 87 formed near the engaging projection 85. The regulating projection 87 determines the rotation range of the push-out arm 72 on the engaging piece 76. The regulating projection 87 is located between the rotation regulating walls 78 provided upright on the engaging piece 76, and is reciprocated between the rotation regulating walls 78 as the push-out arm 72 is rotated on the engaging piece 76. Therefore, the rotation of the push-out arm 72 is restricted as the regulating projection 87 is brought into abutment with one of the rotation regulating walls 78, thereby determining the rotation range of the push-out arm 72 on the engaging piece 76.

The above-described push-out arm 72 is rotatably engaged with the rotation support member 71, and is urged by the coil spring 73 with a predetermined spring force so as to rotate to the disk slot 19 side. Therefore, while the eject arm 52 is being rotated in the arrow $b_2$ direction in FIG. 17, in which the optical disk 2 is ejected to the outside of the housing 3, by the first link arm 54 and the operating arm 58 applied with the driving force of the drive mechanism 120 described later, if, for example, an obstacle is present in the conveyance area of the optical disk 2, the push-out arm 72 is rotated in the arrow $b_1$ direction about the opening 77 of the rotation support member 71 against the urging force of the coil spring 73. This prevents a situation where the driving force that rotates the eject arm 52 in the arrow $b_2$ direction and the force exerted in the direction opposite to the direction of the driving force act against each other. Therefore, no excessive load is applied to a motor or the like of the drive mechanism 120 that drives the first link arm 54 and the operating arm 58 so as to rotate the eject arm 52 in the arrow $b_2$ direction in FIG. 17. Further, the optical disk 2 is nipped by means of the urging force acting in the direction opposite to the urging force in the ejecting direction of the optical disk 2 exerted by the eject arm 52. Thus, it is possible to prevent breakage of the optical disk 2.

As shown in FIGS. 19 and 20, the push-out arm 72 has at the distal end thereof the pickup portion 90 that prevents the optical disk 2 from sinking to the bottom case 4 side. The pickup portion 90 has a pickup arm 91 that supports the optical disk 2 from below, and a pressing member 92 that presses the pickup arm 91 so as to allow catching of the optical disk 2.

The pickup arm 91 has a bar-like shaft portion 91a, a support piece 91b that is provided on one end side of the shaft portion 91a and supports the optical disk 2, an abutting piece 91c provided upright near the support piece 91b and against which the outer peripheral surface of the optical disk 2 inserted into the housing 3 is abutted, and a sliding piece 91d that is provided at the other end of the shaft portion 91a and is slid on the upper surface 6a of the main chassis 6 as the eject arm 52 rotates, thereby rotating the shaft portion 91a in a direction for raising the support piece 91b.

The shaft portion 91a is formed in a substantially cylindrical shape. The shaft portion 91a has the support piece 91b and the abutting piece 91c provided so as to project on one end side, and the sliding piece 91d provided so as to project on the other end side. The shaft portion 91a is rotatably supported by a bearing portion 94 formed in the push-out arm 72. The support piece 91b supports the outer peripheral portion on the insertion-end side of the optical disk 2 that has been inserted while being inclined to the bottom case 4 side, thereby preventing collision against the optical pickup 25 or the like and returning the optical disk 2 to the proper conveyance area. The support piece 91b is formed substantially in the shape of a rectangular plate, becomes thinner toward the distal end side in the longitudinal direction, and includes an inclined surface. When abutted against the outer peripheral surface of the optical disk 2, the abutting piece 91c is supported by a support wall 99 provided upright on the push-out arm 72, thus restricting the rotation of the shaft portion 91a. Further, the abutting piece 91c is provided upright so as to extend from the shaft portion 91a in a direction substantially orthogonal to the extending direction of the support piece 91b. When the abutting piece 91c is supported by the support wall 99, the support piece 91b is rotated onto the proper conveyance area for the optical disk 2. The sliding piece 91d is provided so as to project from the shaft portion 91a, so the sliding piece 91d is exposed to the lower surface side of the push-out arm 72 through an opening 95 bored in the push-out arm 72. As it slides on the upper surface of the main chassis 6, the sliding piece 91d causes the support piece 91b to be rotated to and held in the proper conveyance area for the optical disk 2.

Further, the shaft portion 91a includes pressed portions 93 pressed by the pressing member 92. The pressed portions 93 are portions to be pressed by the pressing member 92 which is formed by flattening the shaft portion 91a into the shape of a flat plate with a substantially D-shaped cross section. The pressing member 92 that presses the pressed portions 93 is a leaf spring member formed substantially in a C shape. When mounted on the push-out arm 72, the pressing member 92 constantly urges the shaft portion 91a to rotate such that the support piece 91b of the pickup arm 91 tilts downward. Since the pressing member 92 presses the flat portions of the pressed portions 93 formed so as to have a substantially D-shaped cross section, the pickup arm 91 can be reliably urged to rotate so that the support piece 91b of the pickup arm 91 faces downward. Further, the sliding piece 91d of the pickup arm 91 is thus projected to the lower surface side of the push-out arm 72 through the opening 95 formed in the push-out arm 72, and can be brought into abutment with the edge portion 17 of the main chassis 6 as the push-out arm 72 is rotated to the rear side of the housing 3.

In the above-described pickup arm 91, since the eject arm 52 is rotated to the front side of the housing 3 in a state with the eject arm 52 waiting on standby for the insertion of the optical disk 2, the sliding piece 91d is separated away from the edge portion 17 of the main chassis 6, and the shaft portion 91a is urged by the pressing member 92, causing the support piece 91b to be tilted downward. Then, when the optical disk 2 is inserted, the outer peripheral surface of the optical disk 2 is abutted against the abutting piece 91c, so the shaft portion 91a is rotated against the urging force of the pressing member 92, causing the support shaft 91b to be raised to the top cover 5 side. The pickup arm 91 is thus rotated to the rear side of the housing 3 with the support piece 91b supporting the lower surface side of the optical disk 2. Thereafter, when the push-out arm 72 rotates on the upper surface of the main chassis 6, the sliding piece 91d of the pickup arm 91 exposed through the opening 93 downward of the push-out arm 72 is brought into sliding contact with the upper surface 6a from the edge portion 17 of the main chassis 6, so the support piece 91b is held in a state where it is raised to the top cover 5 side. Accordingly, even when the push-out arm 72 is separated away from the optical disk 2 after the optical disk 2 is conveyed to the disk mounting portion 23, the support piece 91b is not rotated to the bottom case 4 side by the urging force of the pressing member 92 so as to slide on the upper surface of the main chassis 6.

When the optical disk 2 is inserted with its insertion end tilted to the bottom case 4 side, the outer peripheral surface on the insertion end side of the optical disk 2 is supported by the support piece 91b rotated to the bottom case 4 side in the insertion standby state. It is thus possible to prevent the optical disk 2 from coming into collision against other components disposed on the bottom case 4 side, such as the turntable 23a and the optical pickup 25.

As the optical disk 2 is inserted in the tilted state, the eject arm 52 and the push-out arm 72 are rotated in the arrow $b_1$ direction. Therefore, in the pickup arm 91, as the sliding piece 91d is brought into sliding contact with the edge portion 17 of the main chassis 6, the shaft portion 91a is rotated against the urging force of the pressing member 92, so the support piece 91b is rotated to the top cover 5 side. It should be noted that the rotation range of the support piece 91b is regulated by the abutting piece 91c provided in the shaft portion 91a being supported by the support wall 99 provided upright on the push-out arm 72. Further, when the support piece 91c is rotated, the outer peripheral portion of the optical disk 2 is abutted against the abutting piece 91c. The optical disk 2 inserted while being tilted to the bottom case 4 side can be thus returned to the proper conveyance area by the pickup arm 91.

It should be noted that the push-out arm 72 has the support portion 88 provided so as to project near the support piece 91b of the pickup arm 91. The support portion 88 nips the outer peripheral portion of the optical disk 2 together with the support piece 91b. The support portion 88 is extended in the same direction as the above-mentioned support piece 91b from the distal end of an upright wall provided upright on the principal surface of the push-out arm 72. With the side surface on the insertion-end side of the optical disk 2 received by the abutting piece 91c and the upright wall of the support portion 88, and the insertion-end side of the optical disk 2 nipped by the support portion 88 and the support piece 91b, the push-out arm 72 is rotated to the rear side of the housing 3 at the time of insertion and drawing-in, and pushes out the optical disk 2 to the front side of the housing 3 at the time of ejection.

It should be noted that the distance between the support portion 88 and the support piece 91b that has been rotated onto the proper conveyance area is set slightly larger than the thickness of the optical disk 2. Accordingly, as the eject arm 52 rotates in the arrow $b_1$ direction and arrow $b_2$ direction, the eject arm 52 can prevent tilting of the optical disk 2 by the support portion 88 and the support piece 91b, smoothly release the optical disk 2, and nip the optical disk 2 at the time of ejection.

Next, description will be given of the first link arm 54 that is rotatably engaged with the rotation support member 71 of the eject arm 52. The first link arm 54 is operated by the operating arm 58 described later to rotate the eject arm 52 in the arrow $b_1$ direction or arrow $b_2$ direction in FIG. 11 that is the insertion direction or ejection direction of the optical disk 2. The first link arm 54 is made of a metal plate formed in a substantially rectangular shape. One longitudinal end 54a thereof is rotatably engaged with the engaging hole 80 of the above-mentioned rotation support member 71, and the other longitudinal end 54b is rotatably engaged with the second link arm 55, with the other end 58b of the operating arm 58 attached to the substantially longitudinally intermediate portion.

The second link arm 55 rotatably engaged with the other end 54b of the first link arm 54 is made of an elongated sheet metal. In the second link arm 55, the guide projection 113 guided by the guide cam 57 is provided so as to project from one end 55a, and an engaging hole rotatably engaged with the other end 54b of the first link arm 54 is formed at the other end 55b. Further, the second link arm 55 had a locking portion 96 formed at the other end 55b. One end of the tension coil spring 56 suspended between the locking portion 98 of the main chassis 6 and the second link arm 55 is locked to the locking portion 96.

The tension coil spring 56 locked to the locking portion 96 formed at the other end 55b of the second link arm 55 urges the eject arm 52 via the second link arm 55 and the first link arm 54 so as to rotate in the arrow $b_2$ direction in FIG. 11 that is the ejecting direction of the optical disk 2, thereby applying an urging force acting in the ejecting direction to the eject arm 52 at the time of insertion of the optical disk 2.

The second link arm 55 has formed therein the engaging projection 116 that is engaged with the cam groove 108 formed in the operating arm 58. As the engaging projection 116 is engaged with the cam groove 108, the rotation of the second link arm 55 is restricted, and the locking portion 96 and the locking portion 98 of the main chassis 6 are brought closer to or away from each other. The second link arm 55 thus exerts on the eject arm 52 an urging force acting in the ejecting direction at the time of insertion of the optical disk 2.

That is, when the optical disk 2 is inserted and the eject arm 52 is rotated in the arrow $b_1$ direction, the one end 54a of the first link arm 54 connected to the rotation support member 71 is also similarly rotated in the arrow $b_1$ direction. At this time, since the operating arm 58 connected to the substantially intermediate portion of the first link arm 54 is held in the arrow $d_2$ direction, the other end 54b side of the first link arm 54 is moved about the connecting portion with the operating arm 58 to the front side of the housing 3.

The second link arm 55 connected to the other end 54b is moved to the front side of the housing 3 by the other end 54b of the first link arm 54. Since the locking portion 96 for locking engagement with the tension coil spring 56 is thus separated away from the locking portion 98 of the main chassis 6, the second link arm 55 is urged to the rear side of the housing 3 by the tension coil spring 56. Since the engaging projection 116 is brought into abutment with a cam edge 108a of the cam groove 108 of the operating arm 58 at this time, the rotation of the second link arm 55 to the rear side is restricted. Then, the second link arm 55 is moved to the front side of the housing 3 by the first link arm 54 whose other end 54b is moved to the front side of the housing 3 as the eject arm 52 is rotated in the arrow $b_1$ direction.

In this way, as the second link arm 55 is moved to the front side of the housing 3 by the first link arm 54 while having its rotation to the rear side restricted by the cam groove 108 of the operating arm 58, the locking portion 96 is separated away from the locking portion 98 of the main chassis 6. Accordingly, the tension coil spring 56 locked to the locking portion 96 of the second link arm 55 is expanded as the eject arm 52 is rotated in the arrow $b_1$ direction, thus generating an urging force. This urging force acts in the arrow $b_2$ direction that is opposite to the arrow $b_1$ direction as the rotation direction, with respect to the rotation support member 71 of the eject arm 52 to which the second link arm 55 is connected via the first link arm 54. The eject arm 52 is thus rotated while urging the optical disk 2 in the ejecting direction.

Accordingly, in the disk drive device 1, when the user inserts the optical disk 2, the insertion of the optical disk 2 can be performed while applying an urging force acting in the arrow $b_2$ direction opposite to the insertion direction by the eject arm 52. Therefore, even if the insertion of the optical disk 2 is stopped halfway by the user, the optical disk 2 can be pushed back to the outside through the disk slot 19, thereby making it possible to prevent the optical disk 2 from being left in some halfway position within the housing 3.

It should be noted that when the optical disk 2 has been inserted into the housing 3 to a certain extent, the drive mechanism 120 described later is driven, and a drawing-in operation of the optical disk 2 by the loading arm 51 is performed. At the same time, the first link arm 54 and the second link arm 55 are moved by the operating arm 58 applied with the driving force of the drive motor 121, bringing the locking portion 96 of the second link arm 55 and the locking portion 98 of the main chassis 6 closer to each other. The tension coil spring 56 thus contracts, so the urging force in the arrow $b_2$ direction no longer acts on the eject arm 52. At the time of ejection of the optical disk 2, since the second link arm 55 is guided by the guide cam 57 such that the locking portion 96 and the locking portion 98 of the main chassis 6 are not brought away from each other, the tension coil spring 56 does not expand, and no urging force in the ejecting direction is exerted on the eject arm 52 and the optical disk 2. The eject arm 52 can be thus rotated to a predetermined eject position by the driving force of the drive mechanism 120 to convey the optical disk 2.

It should be noted that as the engaging projection 116 is engaged with the cam groove 108, at the time of ejection of the optical disk 2, the second link arm 55 can convey the optical disk 2 to a predetermined stop position where the optical disk 2 is ejected from the disk slot 19. That is, when, during ejection of the optical disk 2, the panel curtain provided to the disk slot 19 of the front panel 18 comes into sliding contact with the optical disk 2 and a load is applied, the rotation support member 71 of the eject arm 52 and the first link arm 54 are urged in the arrow $b_1$ direction. At this time, if the second link arm 55 and the operating arm 58 are not engaged with each other by the engaging projection 116, even when the operating arm 58 is moved in the arrow $d_2$ direction in accordance with the sliding movement of the slider 122 in the arrow $f_2$ direction, the first link arm 54 only rotates in the arrow $d_2$ direction about the engaging hole 80 with respect to the rotation support member 71, and thus the eject arm 52 cannot be rotated in the arrow $b_2$ direction. Also, the second link arm 55 only rotates with respect to the first link arm 54.

On the other hand, when the second link arm 55 and the operating arm 58 are engaged with each other by the engaging projection 116, the engaging projection 116 is brought into abutment with the side wall of the cam groove 108 in accordance with the movement of the operating arm 58 in the arrow $d_2$ direction, making it impossible for the second link arm 55 to freely rotate with respect to the first link arm 54. That is, the first link arm 54 has its rotation in the arrow $d_2$ direction restricted by the engaging projection 116 of the second link arm 55 being brought into abutment with the side wall of the cam groove 108. Therefore, during ejection of the optical disk 2, even when the eject arm 52 is urged in the arrow $b_1$ direction, as the operating arm 58 is moved in the arrow $d_2$ direction, the first link arm 54 is moved in the arrow $d_2$ direction against the urging force acting in the arrow $b_1$ direction, causing the eject arm 52 to rotate in the arrow $b_2$ direction. Accordingly, rotation of the eject arm 52 in the arrow $b_2$ direction corresponding to an amount of slide of the slider 122 in the arrow $f_2$ direction is realized, so the eject arm 52 can be reliably rotated to the eject position to push out the optical disk 2 to a predetermined stop position.

The guide cam 57 that guides the movement of the guide projection 113 of the second link arm 55 guides the movement of the second link arm 55 during the ejection process of the optical disk 2, thereby preventing the expansion of the tension coil spring 56 to suppress an urging force in the ejecting direction that is exerted on the eject arm 52. Further, the guide cam 57 guides the guiding projection 113 of the second link arm 55, and rotates the eject arm 52 from the mounting position to the eject position via the home position where the eject arm 52 waits on standby for the insertion of the optical disk 2.

Figure 23A:
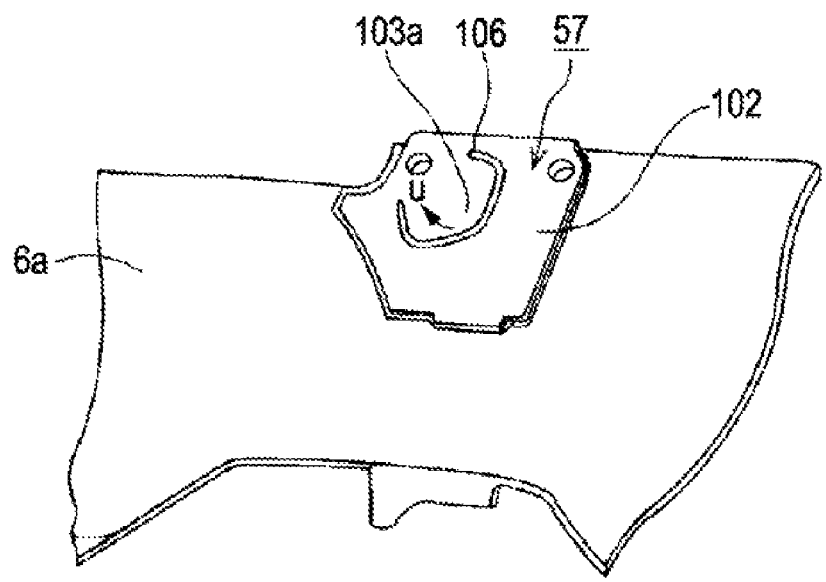
Figure 23B:
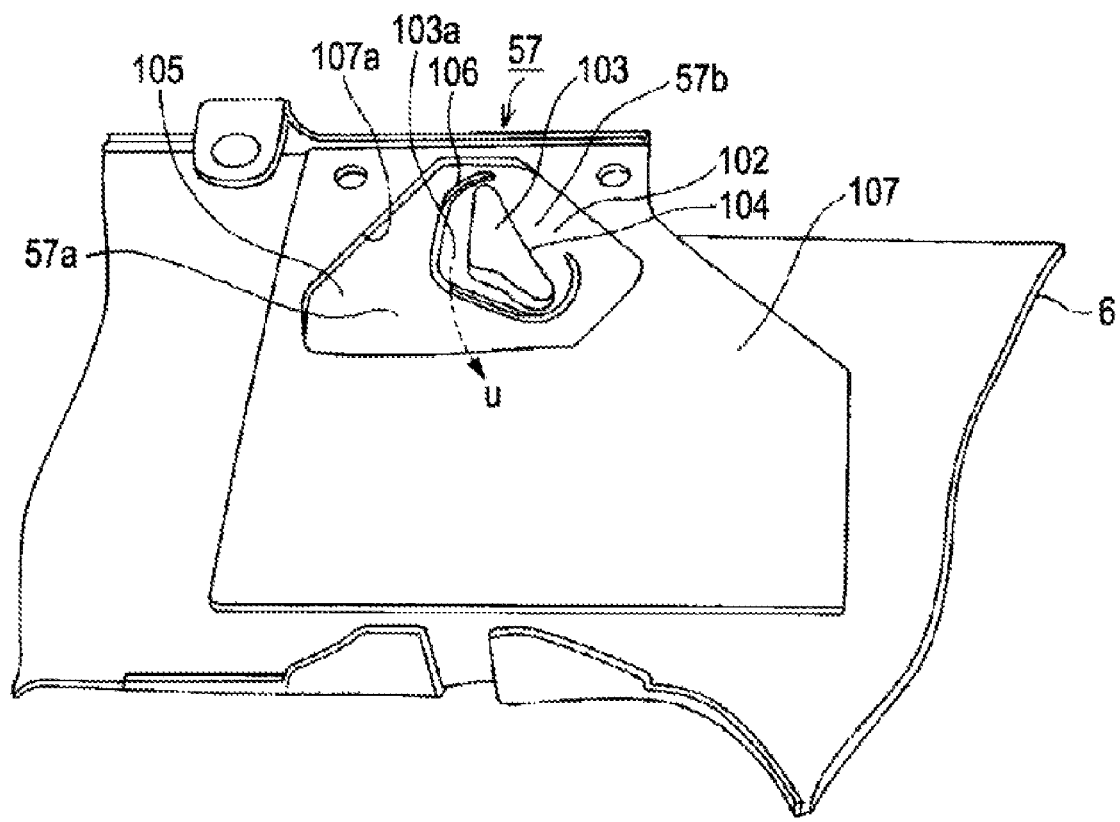

As shown in FIGS. 23A and 23B, the guide cam 57 has a cam portion 103 which is provided so as to project from the surface of the main chassis 6 on the bottom case 4 side and around which the guide projection 113 moves, and an outer wall portion 105 that is disposed on the surface of the main chassis 6 on the bottom case 4 side so as to surround the cam portion 103 and defines the movable range of the guide projection 113.

The cam portion 103 is formed on a flat-shaped attaching plate 102. By screwing the attaching plate 102 onto the upper surface 6a of the main chassis 6, the cam portion 103 is projected toward the back side of the main chassis 6. In the outer wall portion 105, an opening 107a is formed in a flat-shaped support plate 107. Since the support plate 107 is screwed onto the back of the main chassis 6, the cam portion 103 is positioned inside the opening 107a, and the side surface of the opening 107a defines the movable range of the guide projection 113. Further, in the guide cam 57, the area on the left side of the cam portion 103 surrounded by the outer wall portion 105 and on the front side of the housing 3 in FIG. 23B serves as a loading area 57a where the guide projection 113 is moved when the optical disk 2 is inserted and drawn in, and the area on the right side of the cam portion 103 surrounded by the outer wall portion 105 in FIG. 23B serves as an unloading area 57b where the guide projection 113 is moved when the optical disk 2 is ejected.

In the cam portion 103, a guide edge 104 that guides the movement of the guide projection 113 is formed in the side face facing the unloading area 57b of the guide cam 57. When abutted against the guide projection 113 of the second link arm 55 moved in the arrow $d_2$ direction by the operating arm 58, the guide edge 104 restricts free rotation of the second link arm 55 and first link arm 54, and moves the eject arm 52 in the arrow $b_2$ direction in accordance with the movement of the operating arm 58 in the arrow $d_2$ direction. That is, when, during the ejection process of the optical disk 2, the operating arm 58 is moved in the arrow $d_2$ direction in accordance with the operation of the drive mechanism 120, the first and second link arms 54 and 55 connected to the operating arm 58 are also moved in the same direction. The guide projection 113 of the second link arm 55 is brought into abutment with the guide edge 104 of the cam portion 103 at this time, thereby restricting the movement of the first link arm 54 on the rotation support member 71. Therefore, while the guide projection 113 of the second link arm 55 is sliding along the guide edge 104 of the cam portion 103, the rotation support member 71 of the eject arm 52 is rotated in the arrow $b_2$ direction in accordance with the amount of movement of the first link arm 54 in the arrow $d_2$ direction by the operating arm 58, thereby performing ejection of the optical disk 2.

During the ejection process of the optical disk 2, the second link arm 55 is moved in the arrow $d_2$ direction by the operating arm 58, and as the guide projection 113 is moved to the rear side of the housing 3 along the guide edge 104 of the cam portion 103, the second link arm 55 rotates the eject arm 52 beyond the home position, where the eject arm 52 waits on standby for the insertion of the optical disk 2, to the eject position where the optical disk 2 is projected by a predetermined amount from the disk slot 19. It should be noted that the eject arm 52 that has been rotated to the eject position is rotated and returned to the home position by the position regulating member 235 described later. When the eject arm 52 is rotated to the eject position, the guide projection 113 of the second link arm 55 is guided from the unloading area 57b to the loading area 57a of the guide cam 57.

It should be noted that as the second link arm 55 is moved along the cam portion 103 by the operating arm 58, the tension coil spring 58 is expanded slightly. However, the resulting urging force is small and does not cause the eject arm 52 to rotate, and since the eject arm 52 is rotated in accordance with the movement of the operating arm 58, such an urging force of the tension coil spring 58 does not affect the rotation of the eject arm 52. Therefore, since the urging force of the tension coil spring 56 does not act during the ejection process of the optical disk 2, the disk conveying mechanism 50 can rotate the eject arm 52 to a predetermined eject position to stably convey the optical disk 2 to a predetermined stop position, irrespective of an error in the accuracy of the optical disk 2 or age deterioration of the tension coil spring 56 and the like.

In the outer wall portion 105 disposed so as to surround the outer periphery of the cam portion 103, the cam portion 103 is located inside the opening 107a of the support plate 107, thus defining the loading area 57a and the unloading area 57b around the cam portion 103.

Figure 24:
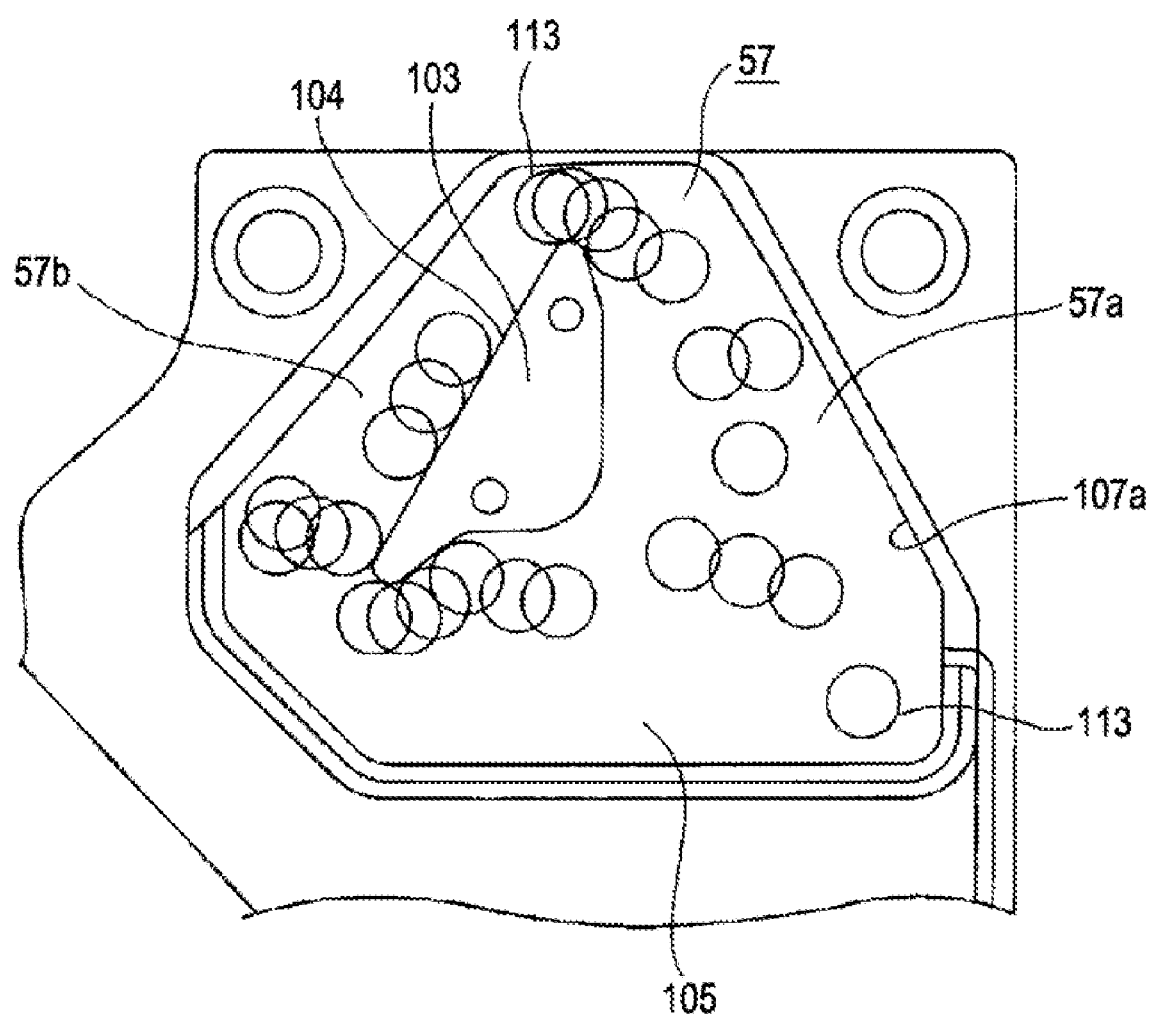
FIG. 24 is a plan view showing the movement path of a guide projection in a guide cam.

The loading area 57a and the unloading area 57b defined by the outer wall portion 105 are areas where the guide projection 113 of the second link arm 55 moves during the insertion and ejection processes of the optical disk 2. As shown in FIG. 24, the loading area 57a is formed larger than the unloading area 57b. Specifically, the loading area 57a secures a movable range in which the guide projection 113 of the second link arm 55 can move when the optical disk 2 is inserted into the housing 3.

Figure 25:
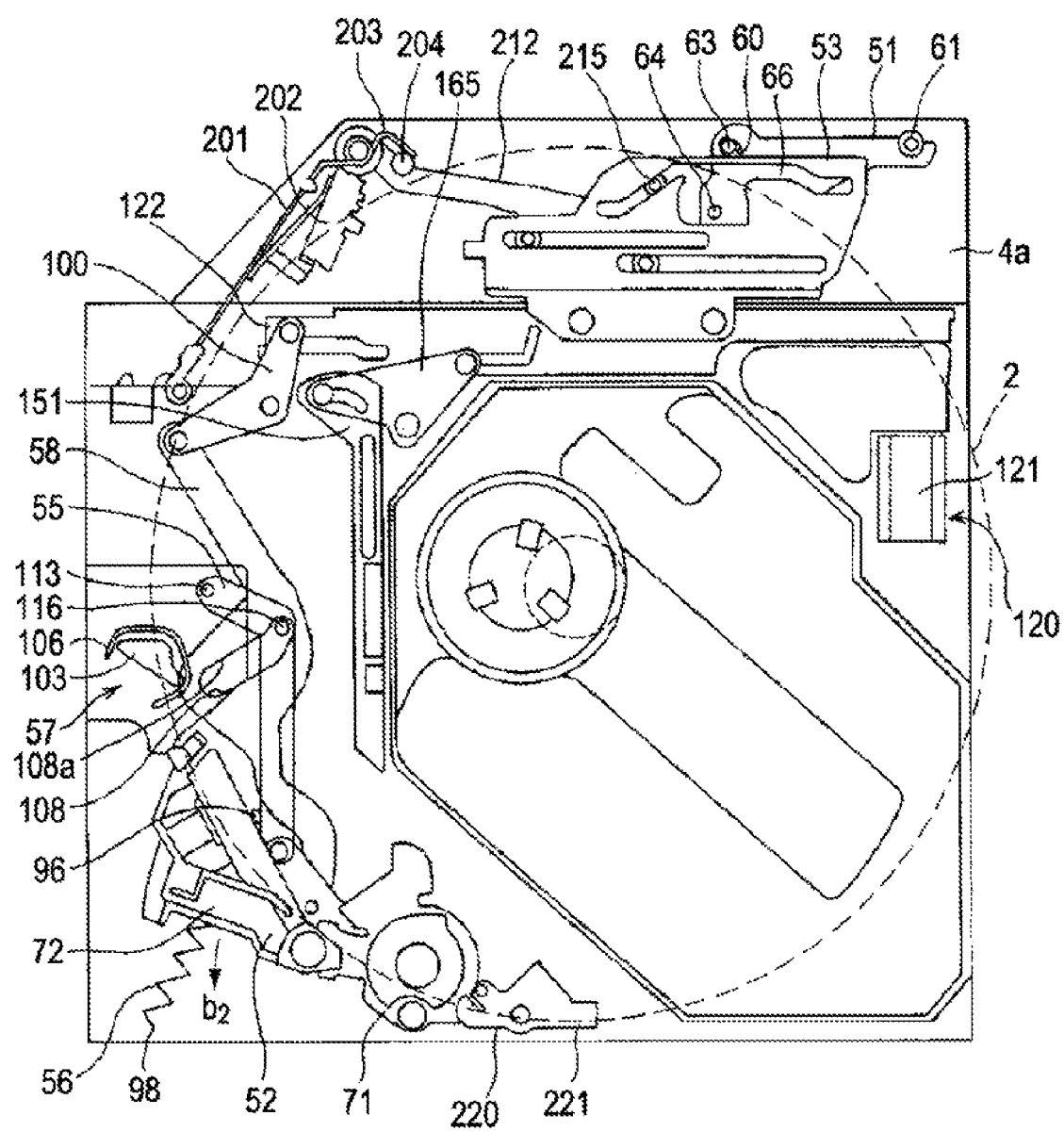
FIG. 25 is a plan view showing the movable range of a guide projection at the time of an irregular operation of an optical disk.

That is, when the optical disk 2 is inserted and the eject arm 52 is rotated by a predetermined amount in the arrow $b_1$ direction as will be described later, the drive mechanism 120 is activated and the drawing-in operation of the optical disk 2 by the loading arm 51 is started, and the operating arm 58 is moved in the arrow $d_1$ direction, thereby causing the eject arm 52 and the first and second link arms 54 and 55 to move. However, as shown in FIG. 25, depending on the user, there may be a case where the user inserts the optical disk 2 deep into the housing 3 even through the main power of the disk drive device 1 has not been turned on, or a case where, even when the main power has been turned on, the user inserts the optical disk 2 deep into the housing 3 by himself/herself without waiting for the drawing-in operation by the loading arm 51.

In the event of such an irregular operation, the first link arm 54 is moved to the front side of the housing 3 with its one end 54a side moved in the arrow $b_1$ direction by the rotation support member 71 of the eject arm 52 which is rotated in the arrow $b_1$ direction, and the other end 54b on the opposite side is moved in the arrow $b_2$ direction about the connecting point with the operating arm 58. Further, the second link arm 55 connected to the other end 54b of the first link arm 54 is also moved along the cam groove 108 of the operating arm 58 to the front side of the housing 3 while being moved in the arrow $b_2$ direction.

Therefore, the guide projection 113 provided at the one end 55a of the second link arm 55 moves in the loading area 57a. The movement area of the guide projection 113 can vary when the optical disk 2 is pushed in without the main power of the disk drive device 1 turned on, or in accordance with how the operating arm 58 is moved by the disk conveying mechanism 50. Accordingly, as shown in FIGS. 25 and 24, in the outer wall portion 105, the loading area 57a is formed so as to secure the maximum movable range in which the guide projection 113 is assumed to be movable in the event of such an irregular operation.

Thus, even when the guide projection 113 is moved off the normal route in the loading area 57a due to an irregular operation, since no other component is present in the movable area of the guide projection 113, and the guide projection 113 does not come into collision against the outer wall portion 105, the guide projection 113 can be rotated without coming into interference with any other member. Therefore, in the disk conveying mechanism 50, even when the eject arm 52 is forcibly rotated due to the forced insertion of the disk by the user, breakage or the like of the second link arm 55 or the guide cam 57 can be prevented. It should be noted that in the operating arm 58, in order to prevent the operating arm 58 from coming into interference with the connecting portion between the first link arm 54 and the second link arm 55 upon the forced insertion of the optical disk 2 when the power is off, the other end 58b side is formed so as to be curved somewhat to the front side of the housing 3.

Figure 26A:
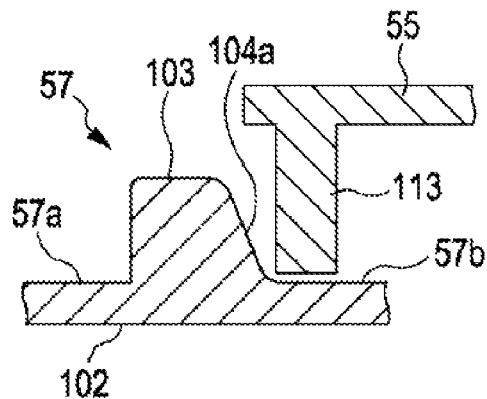

As shown in FIG. 26A, in the guide cam 57, an inclined surface 104a is formed in the guide edge 104. When, during ejection of the optical disk 2, an obstacle is present in the ejecting direction of the optical disk 2, and the rotation of the eject arm 52 in the arrow $b_2$ direction is hindered due to collision between the optical disk 2 and this obstacle, the inclined surface 104a causes the guide projection 113 urged against the guide edge 104 to jump over the cam portion 103 so as to move from the unloading area 57b to the loading area 57a.

Further, as shown in FIGS. 23A and 23B, the guide cam 57 has a slit 106 formed around the cam potion 103. The cam portion 103 is cantilevered with the unloading area 57b side as a support, and the area where the cam portion 103 is provided serves as a flexible portion 103a having flexibility with the unloading area 57b side as a support. When there is an obstacle in the ejecting direction of the optical disk 2 and thus the rotation of the eject arm 52 in the arrow $b_2$ direction is hindered, the flexible portion 103a causes the cam portion 103 whose guide edge 104 is urged against the guide projection 113 to flex to the distal end side (arrow u direction in FIGS. 23A and 23B) of the guide projection 113.

The operation in the case where rotation of the eject arm 52 is hindered by an obstacle during the ejection process of the optical disk 2 will be described later in detail.

The operating arm 58 that is connected to the first link arm 54 and the drive mechanism 120 and operates the eject arm 52 is made of an elongated metal plate. One longitudinal end 58a of the operating arm 58 is engaged with a third link arm 100 connected to the slider 122 of the drive mechanism 120. The other end 58b thereof is engaged with the first link arm 54. The operating arm 58 has the cam groove 108 formed at longitudinally the center thereof. The engaging projection 116 formed in the second link arm 55 is inserted through the cam groove 108.

As described above, the cam groove 108 regulates the rotation of the first and second link arms 54 and 55 so as to impart an urging force in the ejection direction to the eject arm 52 at the time of insertion of the optical disk 2. The cam groove 108 is formed in the shape of an elongate hole so as to allow the engaging projection 116 to move as the second link arm 55 moves around the guide cam 57. The cam groove 108 is formed so as to extend in a direction substantially orthogonal to the arrow $d_1$ direction and the arrow $d_2$ direction in FIG. 11 in which the operating arm 58 is moved. Consequently, the operating arm 58 can restrict the rotation of the second link arm 55 due to the abutment of the engaging projection 116 with the side wall of the cam groove 108, thus making it possible to restrict the rotation of the first link arm 54 in the arrow $d_2$ direction.

As the slider 122 is slid, the operating arm 58 is moved in the arrow $d_1$ direction and the arrow $d_2$ direction in FIG. 11, which are substantially left and right directions, via the third link arm 100 to thereby rotate the first link arm 54 and the eject arm 52. Specifically, when the operating arm 58 is moved in the arrow $d_1$ direction in FIG. 11 by the third link arm 100, the operating arm 58 presses the first link arm 54 in the same direction, thereby rotating the eject arm 52 in the arrow $b_1$ direction in FIG. 11 that is the insertion direction of the optical disk 2. When the operating arm 58 is moved in the arrow $d_2$ direction in FIG. 11 by the third link arm 100, the first link arm 54 is moved in the same direction, thereby causing the eject arm 52 to rotate in the arrow $b_2$ direction in FIG. 11 that is the ejecting direction of the optical disk 2.

The third link arm 100 rotatably engaged with the one end 58a of the operating arm 58 is made of a metal plate of a substantially V shape. Since its bent portion 100a is rotatably attached to the main chassis 6, the third link arm 100 is supported so as to rotate freely in the arrow $c_1$ direction and the arrow $c_2$ direction in FIG. 11. An engaging projection 109 formed at one end 100b extended from the bent portion 100a is engaged with the slider 122. The other end 100c is rotatably engaged with the operating arm 58. Accordingly, when the slider 122 is applied with the driving force of the drive motor 121 of the drive mechanism 120 to be conveyed in the arrow $f_1$ direction in FIG. 11, the third link arm 100 is guided by a first guide groove 125 formed in the slider 122 and rotated in the arrow $c_1$ direction in FIG. 11, thereby moving the operating arm 58 in the $d_1$ direction in FIG. 11. When the slider 122 is conveyed in the arrow $f_2$ direction in FIG. 11, the third link arm 100 is guided by the first guide groove 125 and rotated in the arrow $c_2$ direction in FIG. 11, thereby moving the operating arm 58 in the arrow $d_2$ direction in FIG. 11.

Left and right guide walls 117 and 118 disposed on both the left and right sides of the disk conveyance area guide the insertion and ejection of the optical disk 2 as the side portion of the optical disk 2 is slid on the left and right guide walls 117 and 118. The guide walls 117 and 118 are formed of synthetic resin or the like softer than the optical disk 2. The right guide wall 118 is disposed on the deck portion 4a, and the left guide wall 117 is disposed on the main chassis 6. Both the guide walls 117 and 118 are fixed in place with screws, an adhesive tape, or the like.

In the left and the right guide walls 117 and 118, side walls 117a and 118a are provided upright. The side walls 117a and 118a are provided at positions spaced apart by a predetermined clearance from the side surface of the optical disk 2 conveyed to the centering position, and do not come into contact with the side portion of the optical disk 2 that is being rotationally driven.

Next, operations from insertion to ejection of the optical disk 2 by the disk conveying mechanism 50 constructed as described above will be described. The conveyance state of the optical disk 2 is monitored by detecting the depression states of first to fourth switches SW1 to SW4 mounted on the circuit board 40. As shown in FIG. 11, the first switch SW is disposed in the rotation area of the rotation support member 71 of the eject arm 52. The first switch SW1 is switched between H and L when depressed by the bent piece 81 formed in the rotation support member 71 in accordance with the rotation of the eject arm 52. As shown in FIG. 11, the second to fourth switches SW2 to SW4 are arrayed on the movement area of the slider 122. The second to fourth switches SW2 to SW4 are sequentially switched between H and L as the slider 122 is slid in the arrow $f_1$ direction or the arrow $f_2$ direction.

The disk drive device 1 monitors the depression states and depression times of the first to fourth switches SW1 to SW4 to detect the conveyance state of the optical disk 2, and drives the drive motor 121, the spindle motor 24a, the displacement drive mechanism 36 that moves the optical pickup 25, and the like.

As shown in FIG. 11, prior to the insertion of the optical disk 2, the slider 122 is slid in the arrow $f_2$ direction toward the disk slot 19 side. Accordingly, in the loading arm 51, the engaging projection 64 is locked to the side surface opposed to the first guide portion 66s formed in the first cam groove 66 of the loading cam plate 53, and the abutting portion 61 is rotated to and held at a position retracted from the conveyance area of the optical disk 2. The third link arm 100 engaged with the slider 122 is rotated in the arrow $c_2$ direction in FIG. 11. The eject arm 52 rotated by the operating arm 58 and the first link arm 54 are thus rotated in the arrow $b_2$ direction in FIG. 11 to be positioned at the home position. Since the slider 122 is slid in the arrow $f_2$ direction, the sub-slider 151 is slid in the arrow $h_2$ direction in the drawing. The sub-chassis 29 constituting the base unit 22 is thus lowered to the bottom case 4 side, and the turntable 23a or the like is retracted from the conveyance area of the optical disk 2.

Figure 18:
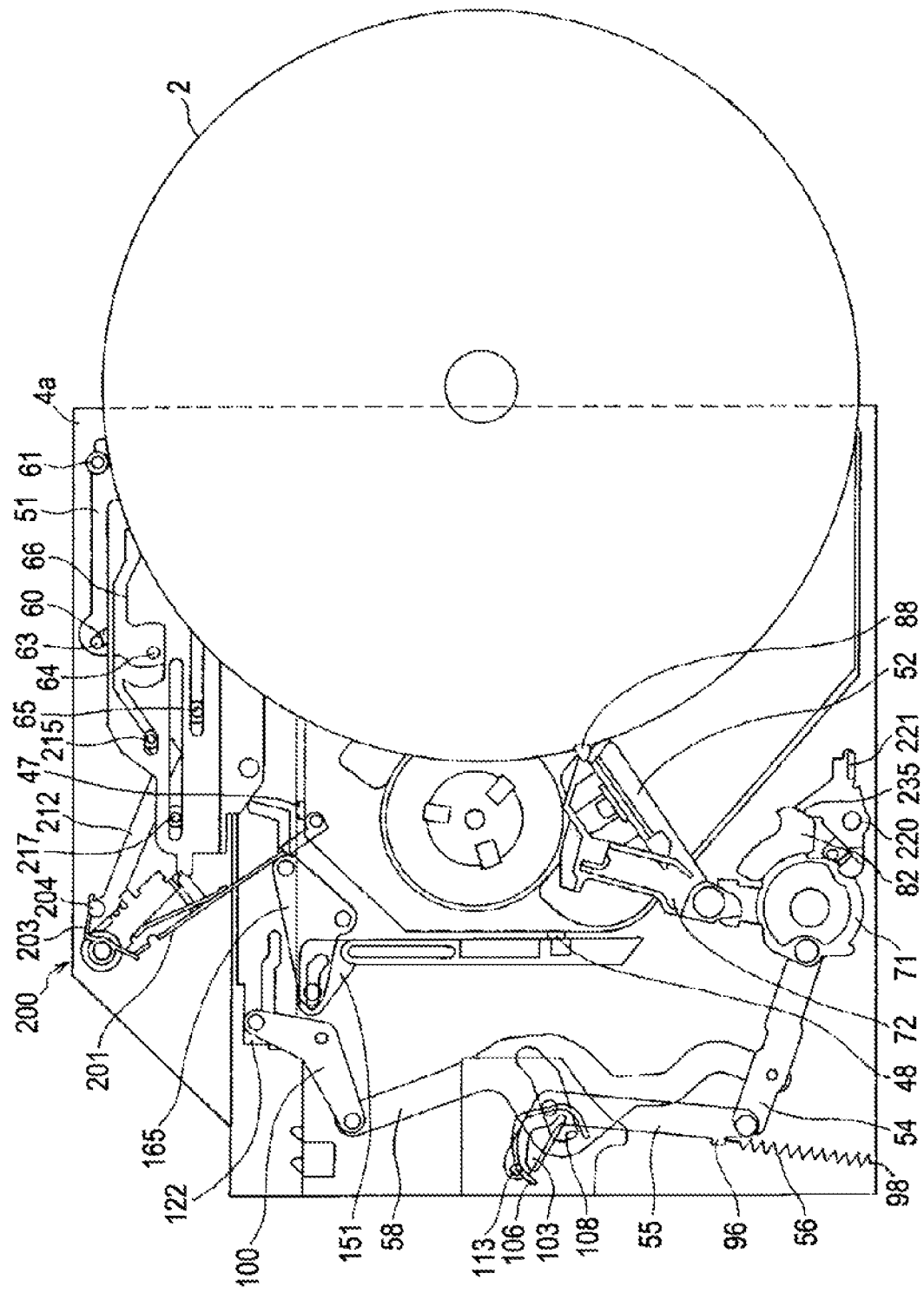
FIG. 18 is a plan view showing a disk drive device with an eject arm in a home position where the eject arm waits on standby for the insertion of an optical disk.

When the optical disk 2 is inserted from the disk slot 19 by the user, the support portion 88 of the eject arm 52 is pressed against the insertion end face of the optical disk 2, and the eject arm 52 is rotated in the arrow $b_1$ direction in FIG. 18. At this time, in the eject arm 52, since the rotation support member 71 is rotated in the arrow $b_1$ direction about the attachment opening 71b, the one end 54a of the first link arm 54 engaged with the rotation support member 71 is also moved in the same direction. Further, since the intermediate portion of the first link arm 54 is connected to the operating arm 58 that is being stopped in the arrow $d_2$ direction, the first link arm 54 moves in the arrow $d_2$ direction with the other end 54b moving to the front side of the housing 3 about this connecting portion. On the other hand, in the second link arm 55 engaged with the other end 54b of the first link arm 54, as the first link arm 54 is moved in the arrow $b_1$ direction, the guide projection 113 located in the loading area 57a of the guide cam 57 is moved toward the front side of the housing 3. Since the locking portion 96 of the tension coil spring 56 is thus separated away from the locking portion 98 provided in the main chassis 6, the tension coil spring 56 expands, thus urging the first link arm 54 so as to rotate to the rear side of the housing 3 about the other end 55b connected to the first link arm 54.

At this time, since the engaging projection 116 is brought into abutment with the cam edge 108a of the cam groove 108 of the operating arm 58, the rotation of the second link arm 55 to the rear side of the housing 3 is restricted. Then, as the second link arm 55 is moved to the front side of the housing 3 by the first link arm 54 while having its rotation to the rear side restricted, the urging force exerted as the tension coil spring 56, which is expanded as the eject arm 52 is rotated in the arrow $b_1$ direction, tries to contract acts on the first link arm 54 so as to pull the other end 54b that has been moved to the arrow $d_2$ direction back to the arrow $d_1$ direction. The one end 54a of the first link arm 54 connected to the rotation support member 71 is thus urged in the arrow $d_2$ direction about the connecting portion with the operating arm 58. Accordingly, the rotation support member 71 connected to the one end 54a of the first link arm 54 is urged in the arrow $b_2$ direction opposite to the arrow $b_1$ direction that is the rotation direction, so the eject arm 52 is rotated while urging the optical disk 2 in the ejecting direction.

This means that the optical disk 2 is inserted against the urging force in the ejecting direction exerted on the eject arm 52. Thus, even when the insertion of the optical disk 2 is stopped halfway by the user, the optical disk 2 is ejected to the outside of the housing 3, thus making it possible to prevent the optical disk 2 from being left in some halfway position within the housing 3.

When the optical disk 2 is inserted by the user against this urging force, and the eject arm 52 is rotated to a predetermined angle, the first switch SW1 disposed on the circuit board 40 is pressed by the bent piece 81 of the rotation support member 71, thus activating the drive mechanism 120. The drive mechanism 120 is applied with the driving force of the drive motor 121 to cause the slider 122 to slide in the arrow $f_1$ direction in FIG. 15. Since the loading cam plate 53 is thus also slid in the same direction together with the slider 122, the engaging projection 64 of the loading arm 51 is brought into abutment with the first guide portion 66a of the first cam groove 66. In the loading arm 51, since the engaging projection 64 is pressed in the arrow $f_1$ direction by the first guide portion 66a, the abutting portion 61 rotates in the arrow $a_1$ direction in FIG. 15 about the insertion hole 60, thus drawing in the optical disk 2.

When the slider 122 is slid in the arrow $f_1$ direction and the optical disk 2 is conveyed to the centering position located on the disk mounting portion 23 by the loading arm 51, the engaging projection 64 moves in the first cam groove 66 of the loading cam plate 53 from the first guide portion 66a to the second guide portion 66b. Since the second guide portion 66b is formed in parallel to the slide direction of the slider 122, the loading arm 51 holds the optical disk 2 at the centering position, without the engaging projection 64 being guided in accordance with the movement of the slider 122. It should be noted that at the time of the drawing-in operation of the optical disk 2, by detecting the depression states of the first to fourth switches SW1 to SW4, it is learned that the base unit 22 has been lowered to a chucking release position, thereby allowing safe conveyance of the optical disk 2.

The optical disk 2 is loaded by the loading arm 51 and guided by the left and right guide walls 117 and 118. Further, the optical disk 2 is brought into abutment with the deck arm 200 and the centering guide 220 described later for centering onto the disk mounting portion 23.

When the slider 122 is slid in the arrow $f_2$ direction, the third link arm 100 is guided by the first guide groove 125 of the slider 122 and rotated in the arrow $c_1$ direction in FIG. 15, so the operating arm 58 engaged with the third link arm 100 is moved in the arrow $d_1$ direction in the drawing. Accordingly, the first link arm 54 engaged with the other end 58b of the operating arm 58 is pressed by the operating arm 58 to be moved in the arrow $d_1$ direction.

When the eject arm 52 is rotated to the activation position of the drive mechanism 120, and the first link arm 54 is moved in the arrow $d_1$ direction by the operating arm 58, the second link arm 55 is also moved in the same direction, and the guide projection 113 of the second link arm 55 is also moved from the loading area 57a to the unloading area 57b of the guide cam 57. As the second link arm 55 is moved in the arrow $d_1$ direction, in the second link arm 55, the locking portion 96 formed at the other end 54b is brought closer to the locking portion 98 formed in the main chassis 6, causing the tension coil spring 56 to contract. Accordingly, during the drawing-in operation of the optical disk 2, the urging force in the arrow $b_2$ exerted on the eject arm 52 is gradually lost.

In the eject arm 52, as the first link arm 54 is moved in the arrow $d_1$ direction by the operating arm 58 and the guide projection 113 of the second link arm 55 is moved to the unloading area 57b, the urging force in the arrow $b_2$ direction exerted by the tension coil spring 56 is lost. Further, as the optical disk 2 is drawn in to the rear side of the housing 3 by the loading arm 51, the push-out arm 72 and the rotation support member 71 are rotated in the arrow $b_1$ direction in FIG. 15.

In this way, in the disk conveying mechanism 50, the drawing-in operation of the optical disk 2 by the loading arm 51 can be smoothly performed without being hindered by the urging force in the ejecting direction exerted on the eject arm 52 and without application of a load to the optical disk 2.

When the slider 122 is slid in the arrow $f_1$ direction, a connecting arm 165 engaged with the slider 122 is rotated, so the sub-slider 151 is also slid in the arrow $h_1$ direction. Then, after centering is performed on the optical disk 2, the base unit 22 is raised by the slider 122 and the sub-slider 151 from the chucking release position to the chucking position. The optical disk 2 conveyed to the centering position is thus chucked on the turntable 23a with the periphery of the center hole 2a nipped by the turntable 23a and the abutting projection 8 formed around the opening 7 of the top plate portion 5a.

It should be noted that by detecting the depression states of the first to fourth switches SW1 to SW4 at this time, it is learned that the base unit 22 has been raised to the chucking position, and that the optical disk 2 has been chucked on the turntable 23a.

When the slider 122 moves in the arrow $f_1$ direction and the sub-slider 151 is further slid in the arrow $h_1$ direction, the base unit 22 is lowered from the chucking position to the recording/reproduction position. By detecting the depression states of the first to fourth switches SW1 to SW4 at this time, it is learned that the base unit 22 has been lowered to the recording/reproduction position.

When the optical disk 2 is chucked on the turntable 23a, the third link arm 100 is further rotated in the arrow $c_1$ direction by the slider 122 that is being slid in the arrow $f_1$ direction, causing the operating arm 58 to further move in the arrow $d_1$ direction. The eject arm 52 is thus rotated in the arrow $b_1$ direction via the first link arm 54. Further, an abutting projection 168 at the distal end of the sub-slider 151 is abutted against the bent piece 81 of the rotation support member 71, causing the rotation support member 71 to rotate in the arrow $b_1$ direction. Therefore, in the eject arm 52, the support portion 88 of the push-out arm 72 and the optical disk 2 are separated away from each other. Further, when the eject arm 52 is rotated in the arrow $b_1$ direction, the rotary piece 82 formed in the rotation support member 71 presses the centering guide 220, which is urged to rotate so as to come into sliding contact with the side surface of the optical disk 2 by the tension coil spring 234, thus separating the guide piece 221 of the centering guide 220 from the side surface of the optical disk 2. When the slider 122 is further slid in the arrow $f_1$ direction, the engaging projection 64 is moved from the second guide portion 66b to the third guide portion 66c of the loading cam plate 53, so the loading arm 51 is rotated in the arrow $a_2$ direction in FIG. 16, causing the abutting portion 61 to separate away from the side surface of the optical disk 2. Further, the deck arm 200 that has performed centering on the optical disk 2 is separated away from the side surface of the optical disk 2 by being pressed by the loading cam plate 53.

The optical disk 2 is thus released from various arms or the centering guide 220 so as to be freely rotatable, and waits on standby for recording or reproduction by the user.

It should be noted that in the eject arm 52, the abutting projection 168 of the sub-slider 151 is abutted against the bent piece 81 of the rotation support member 71 to restrict the rotation of the rotation support member 71 in the arrow $b_2$ direction, thereby preventing a situation where the rotation support member 71 is rotated in the arrow $b_2$ direction and the push-out arm 72 or the guide piece 221 of the centering guide 220 is brought into abutment with the optical disk 2 that is being rotated.

In the loading process of the optical disk 2 in the disk drive device 1, so-called double chucking is performed. According to the double chucking process, after the optical disk 2 is chucked on the turntable 23a, the spindle motor 24a is driven to rotate the optical disk 2 a half-turn, and the drive motor 121 is rotated in reverse to raise the base unit 22 to the chucking position again. This makes it possible to prevent recording/reproduction from being performed with the optical disk 2 only half-engaged with the turntable 23a.

When the recording/reproduction operation is finished, and an ejecting operation for the optical disk 2 is performed by the user, first, the drive motor 121 of the drive mechanism 120 is rotated in reverse, and the slider 122 is slid in the arrow $f_2$ direction. Since the engaging projection 64 thus moves from the third guide portion 66c to the second guide portion 66b of the loading cam plate 53, the loading arm 51 is rotated in the arrow $a_1$ direction, bringing the abutting portion 61 into abutment with the side surface of the optical disk 2.

When the sub-slider 151 is slid in the arrow $h_2$ direction, and the pressing of the sub-slider 151 against the rotation support member 71 is released, the centering guide 220 is applied with the urging force of the tension coil spring 234 and rotated so as to return. The rotation support member 71 whose rotary piece 82 is in abutment with the centering guide 220 is thus rotated in the arrow $b_2$ direction. As the slider 122 moves, the third link arm 100 is rotated in the arrow $c_2$ direction, and the operating arm 58 and the first link arm 54 are moved in the arrow $d_2$ direction, so the rotation support member 71 is rotated in the arrow $b_2$ direction. It should be noted that the rotation support member 71 is also rotated in the arrow $b_2$ direction when the first link arm 54 is urged to the rear side of the housing 3 by the urging force of the tension coil spring 56 that is being slightly expanded. Thus, in the eject arm 52, the support portion 88 of the push-out arm 72 is brought into abutment with the side surface of the optical disk 2.

Further, in accordance with the movement of the slider 122 in the arrow $f_2$ direction, the loading cam plate 53 is moved in the same direction, so the deck arm 200 that has been pressed against the loading cam plate 53 is also brought into abutment with the side surface of the optical disk 2.

When the slider 122 is further slid in the arrow $f_2$ direction, and the sub-slider 151 is further slid in the arrow $h_2$ direction, the base unit 22 is lowered from the recording/reproduction position to the chucking release position. The optical disk 2 is thus pushed up by a guide pin 180 provided upright on the bottom case 4, thus releasing chucking of the optical disk 2 on the turntable 23a. The guide pin 180 for releasing the chucking of the optical disk 2 will be described later.

It should be noted that at this time, by detecting the depression states of the first to fourth switches SW1 to SW4, it is learned that the base unit 22 has been lowered to the chucking release position, and that the optical disk 2 can now be safely ejected.

Upon releasing the chucking of the optical disk 2, the process transfers to the ejection process of the optical disk 2. In the ejection process of the optical disk 2, the third link arm 100 engaged with the slider 122 is further rotated in the arrow $c_2$ direction by sliding in the first guide groove 125 of the slider 122, so the operating arm 58 is further moved in the arrow $d_2$ direction. As shown in FIG. 17, when, following the movement of the operating arm 58 in the arrow $d_2$ direction, the first link arm 54 is moved in the same direction, the eject arm 52 is rotated in the arrow $b_2$ direction in FIG. 17 in accordance with the amount of movement of the operating arm 58 to eject the optical disk 2.

Specifically, since the first link arm 54 is moved in the arrow $d_2$ direction by the operating arm 58, in the second link arm 55, the guide projection 113 moves in the unloading area 57b surrounded by the outer wall portion 105 while sliding on the guide edge 104 of the guide cam 57. In the eject arm 52, since the rotation support member 71 is rotated in the arrow $b_2$ direction by the operating arm 58 via the first link arm 54, the push-out arm 72 is rotated in the arrow $b_2$ direction, thus pushing out the optical disk 2 to the front side of the housing 3.

At this time, since both the first and second link arms 54 and 55 are rotatably connected with respect to the operating arm 58, as the operating arm 58 moves in the arrow $d_2$ direction, the first and second link arms 54 and 55 are moved to the rear side of the housing 3 and in the arrow $b_2$ direction while retaining substantially the same angle. Since the locking portion 98 formed in the main chassis 6 is formed near the left-side corner on the rear side of the housing 3 where the guide cam 57 is provided, the second link arm 55 is moved substantially without the locking portion 96 separating away from the locking portion 98 of the main chassis 6. Therefore, the tension coil spring 56 undergoes substantially no expansion during the ejection process of the optical disk 2.

As described above, in the disk conveying mechanism 50, the eject arm 52 is rotated in the arrow $b_2$ direction as the ejecting direction by the driving force of the drive mechanism 120 without being urged by the tension coil spring 56. The eject arm 52 is thus rotated by an amount corresponding to the sliding movement of the slider 122, so the optical disk 2 can be stably ejected to a predetermined stop position without being shot out by the urging force of the tension coil spring 2.

At this time, in the disk conveying mechanism 50, the optical disk 2 is brought into sliding contact with the panel curtain provided in the disk slot 19 of the front panel 18, and an urging force in the arrow $b_1$ direction relatively acts on the eject arm 52 and the first link arm 54. In this case, as described above, since the second engaging projection 116 of the second link arm is brought into abutment with the side wall of the cam groove 108 of the operating arm 58 to restrict the rotation of the first link arm 54 in the $d_2$ direction, the first link arm 54 and the eject arm 52 are rotated following the movement of the operating arm 58 that is moved in the arrow $d_2$ direction by an amount corresponding to the slide amount of the slider 122 in the arrow $f_2$ direction. Therefore, the disk conveying mechanism 50 can rotate the eject arm 52 by an amount corresponding to the slide operation of the slider 122 against the urging force acting in the arrow $b_1$ direction.

At this time, since the engaging projection 64 is engaged with the first cam groove 66 of the loading cam plate 53, the loading arm 51 is allowed to rotate only in accordance with the sliding movement of the loading cam plate 53, and its free rotation is restricted. In the loading arm 51, as the loading cam plate 53 is slid in the arrow $f_2$ direction in FIG. 17 together with the slider 122, the engaging projection 64 is guided from the second guide portion 66b to the first guide portion 66a. Although the rotation of the loading arm 51 in the arrow $a_2$ direction is restricted by the first guide portion 66a, as the optical disk 2 is ejected to the front side of the housing 3 by the eject arm 52, and the first guide portion 66a is moved to the front side of the housing 3 in accordance with the sliding movement of the slider 122, the loading arm 51 is allowed to rotate in the arrow $a_2$ direction. The loading arm 51 thus does not hinder the ejection of the optical disk 2 by the eject arm 52.

As described above, the rotation of the loading arm 51 in the arrow $a_2$ direction as the ejecting direction of the optical disk 2 is restricted by the abutment of the engaging projection 64 with the first guide portion 66a, and the rotation of the loading arm 51 in the arrow $a_2$ direction is permitted in accordance with the sliding movement of the slider 122 and the rotation of the eject arm 52. The loading arm 51 thus conveys the optical disk 2 while nipping the optical disk 2 together with the eject arm 52, thereby preventing the optical disk 2 from suddenly popping out from the disk slot 19 due to the urging force in the ejecting direction exerted by the deck arm 200.

The loading arm 51 is constantly urged in the arrow $a_1$ direction for urging the optical disk 2 into the housing 3 by the leaf spring 62 fixed to the deck portion 4a. Accordingly, when the engaging projection 64 is rotated to a position where it comes into abutment with the first guide portion 66a, the loading arm 51 is urged in the arrow $a_1$ direction by the leaf spring 62. An urging force acting in the insertion direction is thus imparted when the optical disk 2 is moved in the ejecting direction by the eject arm 52 and the deck arm 200, thereby preventing the optical disk 2 from popping out. It should be noted that the urging force exerted by the leaf spring 62 is small relative to the rotation force in the ejecting direction exerted by the eject arm 52, and neither hinders the ejection of the optical disk 2 by the eject arm 52 nor applies an excessive load to the optical disk 2.

The eject arm 52 is rotated by an amount corresponding to the operation of the slider 122 and operating arm 58 while the free rotation of the first and second link arms 54 and 55 is being restricted, that is, while the guide projection 113 is sliding on the guide edge 104 of the cam portion 103. With the guide projection 113 slid on the guide edge 104, the eject arm 52 is rotated to the eject position as the support portion 88, which is formed in the push-out arm 72 abutted against the optical disk 2 and supports the side surface at the trailing edge in the ejecting direction of the optical disk 2, is moved to the most front side of the housing 3 and then further moved in the arrow $b_2$ direction.

That is, when the eject arm 52 is rotated in the arrow $b_2$ direction in the ejection process of the optical disk 2, the support portion 88 of the push-out arm 72 is rotated to the front side of the housing 3, thereby pushing out the optical disk 2 to the outside of the housing 3. As shown in FIG. 18, the eject arm 52 ejects the optical disk 2 to a predetermined stop position as the push-out arm 72 is rotated to the most front side of the housing 3, and thereafter the eject arm 52 is further rotated to the eject position in the arrow $b_2$ direction.

In this way, in the disk conveying mechanism 50, as the guide projection 113 is guided along the guide edge 104, not only can the eject arm 52 be rotated to the most front side of the housing 3 where the optical disk 2 is ejected to a predetermined stop position, but the eject arm 52 is designed in advance so as to rotate beyond the front side of the housing 3 further in the arrow $b_2$ direction to the eject position. Therefore, by allowing for such factors as an error in assembly accuracy or age deterioration of the eject arm 52, the guide cam 57, the first and second link arms 54 and 55, and the like, the disk conveying mechanism 50 can reliably eject the optical disk 2 to a predetermined stop position without using, for example, a member for urging the eject arm so as to rotate in the arrow $b_2$ direction, or the like.

Further, since the disk conveying mechanism 50 does not adopt a mechanism that rotates the eject arm 52 by the urging force of the tension coil spring 56 at the time of ejecting the optical disk 2, there is no abutment sound that is typically generated when an eject lever applied with an urging force comes into abutment with an optical disk. Therefore, in the disk drive device 1, no noise is generated at the time of ejection of the optical disk 2, thus achieving an improvement in usability.

When the bent piece 81 of the rotation support member 71 is pressed by the position regulating member 235 provided in the centering guide 220, the eject arm 52 that has been rotated to the eject position is rotated and returned to the home position where the eject arm 52 waits on standby for the insertion of the optical disk 2 as shown in FIG. 11.

Then, as shown in FIG. 11, when the slider 122 is moved to the initial position, the detection switch is depressed, so the slide operation is stopped. By detecting the depression states of the first to fourth switches SW1 to SW4 are detected at this time, it is learned that the eject arm 52 has been rotated to a predetermined eject position and the optical disk 2 has been conveyed to a predetermined stop position, so the drive of the drive motor 21 is stopped. The user can easily draw out the optical disk 2 by pinching the center hole 2a and side surface of the optical disk 2 that has been ejected to the stop position where the center hole 2a is exposed from the disk slot 19.

When, in a state where the optical disk 2 has been inserted by a predetermined amount and the drive of the drive motor 121 has been started, the user realizes that the optical disk 2 being inserted is wrong, for example, and quickly grips the optical disk 2, the disk conveying mechanism 50 stops the drive motor 121 once, and drives the drive motor 121 in reverse so as to eject the optical disk 2.

Specifically, when the optical disk 2 is inserted from the disk slot 19 by a predetermined amount and the drive motor 121 is driven, following the movements of the slider 122 and loading cam plate 53 in the arrow $f_1$ direction, the loading arm 51 is rotated in the arrow $a_1$ direction. At this time, when the optical disk 2 is gripped by the user, the rotation of the loading arm 51 is restricted, whereas the loading cam plate 53 is slid in the arrow $f_1$ direction together with the slider 122. Thus, the engaging projection 64 provided so as to project from the loading arm 51 is locked to the first guide portion 66a of the loading cam plate 53. This restricts the sliding movements of the slider 122 and loading cam plate 53 in the arrow $f_1$ direction. After the elapse of a predetermined time in this state, the drive motor 121 is driven to rotate in reverse, and the optical disk 2 is ejected according to a process reverse to the insertion process of the optical disk 2 described above.

At this time, since the engaging projection 116 of the second link arm 55 is also slid in the cam groove 108 of the operating arm 58 and moved to the front side of the housing 3 as the optical disk 2 is inserted by a predetermined amount, the locking portion 96 of the second link arm 55 and the locking portion 98 of the main chassis 6 are moved so as to be separated away from each other, so the tension coil spring 56 suspended therebetween is expanded. Therefore, when the drive motor 121 is driven to rotate in reverse, and the slider 122 is slid in the arrow $f_2$ direction, the first link arm 54 applied with the urging force of the tension coil spring 56 is rotated, so the eject arm 52 is rotated in the arrow $b_2$ direction. Therefore, in the disk drive device 1, the eject arm 52 is urged by the tension coil spring 56 so as to rotate in the arrow $b_2$ direction in which the optical disk 2 is ejected to the outside of the disk slot 19, thus ejecting the optical disk 2 by the urging force of the tension coil spring 56.

Accordingly, in the disk conveying mechanism 50, the guide projection 113 of the second link arm 55 moves backward in the loading area 57a without passing through the unloading area 57b. Thus, although the eject arm 52 cannot be rotated to the eject position by the sliding movement of the slider 122 in the arrow $f_2$ direction, the eject arm 52 can be rotated to the eject position by the urging force of the tension coil spring 56 accumulated during insertion of the optical disk 2. Therefore, in the disk conveying mechanism 50, it is possible to prevent a situation where the drive of the drive motor 121 is stopped due to the optical disk 2 being gripped during loading of the optical disk 2 and the optical disk 2 is left halfway exposed from the disk slot 19.

It should be noted that such abnormal conveyance of the optical disk 2 can be detected by monitoring the depression states of the first to fourth switches SW1 to SW4 mounted on the circuit board 40 by a microcomputer. That is, if the time it took for the slider 122 to move from a state in which the first switch SW1 is depressed by the eject arm 52 until it is detected that the base unit 22 has been lowered to the chucking release position is equal to or more than a predetermined time, for example, 3 seconds, or if the time it took for the base unit 22 to move from the chucking release position to the recording/reproduction position via the chucking position is equal to or more than a predetermined time, it is detected that an abnormal conveyance has occurred, and the drive motor 121 is stopped or rotated in reverse to eject the optical disk 2.

When the optical disk 2 that has been conveyed to the stop position is drawn out, the eject arm 52 is rotated to the home position where it waits on standby for the insertion of the optical disk 2 again.

As described above, the guide cam 57 has the inclined surface 104a formed in the guide edge 104 of the cam portion 103. When, during ejection of the optical disk 2, an obstacle is present in the ejection direction of the optical disk 2, and the rotation of the eject arm 52 in the arrow $b_2$ direction is hindered due to collision between the optical disk 2 and this obstacle, the inclined surface 104a causes the guide projection 113 that slides on the guide edge 104 to jump over the cam portion 103 so as to move from the unloading area 57b to the loading area 57a.

Specifically, as shown in FIG. 26A, in the guide edge 104 of the cam portion 103, the inclined surface 104a extending toward the loading area 57a side from the base end to the distal end of the cam portion 103.

As shown in FIGS. 23A and 23B, the guide cam 57 has the slit 106 formed in the periphery of the cam portion 103, except for the side facing the guide edge 104 of the cam portion 103. The guide cam 57 is cantilevered with the unloading area 57b side as a support. That is, in the guide cam 57, there is formed the slit 106 whose opposite ends are on the opposite sides of the guide edge 104 of the cam portion 103 and which is extended in the loading area 57a. Thus, in the guide cam 57, the area where the cam portion 103 is provided serves as the flexible portion 103a having flexibility with the unloading area 57b side as a support.

In the guide cam 57, as the second link arm 55 is moved in the arrow $d_2$ direction by the operating arm 58 during the ejection process of the optical disk 2, the guide projection 113 slides on the inclined surface 104a. Then, in the guide cam 57, when the optical disk 2 collides against an obstacle, and the rotation of the eject arm 52 in the arrow $b_2$ direction is restricted, the guide projection 113 applied with the driving force of the drive motor 121 via the operating arm 58 is pressed against the guide edge 104. At this time, the guide projection 113 slides on the inclined surface 104a provided in the guide edge 104, and moves upwardly of the cam portion 103. Further, in the cam portion 103 applied with a pressing force from the guide projection 113, the flexible portion 103a flexes in the arrow u direction in FIGS. 23A and 23B toward the base end side of the cam portion 103 about the unloading area 57b side as a support.

This allows the guide projection 113 to jump over the cam portion 103 so as to move from the unloading area 57b to the loading area 57a. Therefore, when the first and second link arms 54 and 55 are moved in the arrow $d_2$ direction by the operating arm 58 applied with the driving force of the drive motor 121, the guide projection 113 moves in the loading area 57a formed as a broad area.

It should be noted that since the guide projection 113 is moved to the loading area 57a, as the operating arm 58 is moved in the arrow $d_2$ direction by the slider 122, the second link arm 55 is also rotated in the arrow $d_2$ direction. The locking portion 96 of the second link arm 55 and the locking portion 98 of the main chassis 6 are thus separated away from each other, causing the tension coil spring 56 to expand. Accordingly, since an urging force in the arrow $b_2$ direction is exerted on the eject arm 52, when an obstacle is removed, the optical disk 2 is ejected from the disk slot 19. When the optical disk 2 is drawn out, the second link arm 55 and the eject arm 52 are both returned to the home position where they wait on standby for the insertion of the optical disk 2 again. The drive mechanism 120 conveys the slider 122 to the front side of the housing 3, and stops the drive of the drive motor 121.

As described above, since the guide projection 113 is not pressed against the cam portion 103 during the ejection process of the optical disk 2, the movements of the slider 122 and operating arm 58 driven by the driving force of the drive motor 121 are not hindered. Therefore, according to the disk conveying mechanism 50 as described above, even when the optical disk 2 collides against an obstacle and the rotation of the eject arm is restricted during the ejection process of the optical disk 2, it is possible to prevent a situation where an excessive load is applied to the cam portion 103 and the guide projection 113 of the second link arm 55 that rotates the eject arm 52 or to the drive motor of the drive mechanism 120, or a situation where the eject arm 52 or the optical disk 2 is nipped between the drive mechanism 120 and this obstacle, exerting an excessive load. In particular, in the disk conveying mechanism 50, larger electric power is used at the time of ejection than at the time of drawing in the optical disk 2 in order to counteract a load such as a panel curtain, the load applied to the drive mechanism 120 or the optical disk 2 when an obstacle is present on the conveyance area of the optical disk 2 also becomes large. Accordingly, releasing the guide projection 113 that slides on the guide edge 104 to the loading area 57a proves effective in preventing a load from being applied to the drive mechanism 120 or the optical disk 2.

Figure 26B:
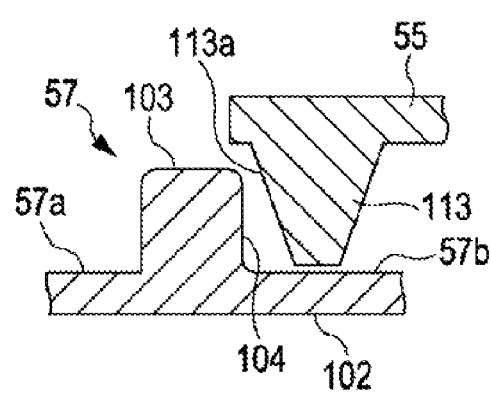

It should be noted that in the disk conveying mechanism 50 according to an embodiment of the present invention, as shown in FIG. 26B, an inclined surface 113a may be formed in the guide projection 113 of the second link arm 55. Specifically, in the guide projection 113, the inclined surface 113a inclined toward the loading area 57a is formed in the side surface facing the guide edge 104 of the cam portion 103 so as to extend from the distal end side to the base end side. While the guide projection 113 is sliding on the guide edge 104 of the cam portion 103, when the optical disk 2 collides against an obstacle, and the rotation of the eject arm 52 is restricted and the guide projection 113 is pressed against the guide edge 104, the guide projection 113 slides on the guide edge 104 upwardly of the cam portion 103 along the inclined surface 113a. The guide projection 113 can thus jump over the cam portion 103 so as to move from the unloading area 57b to the loading area 57a.

Figure 26C:
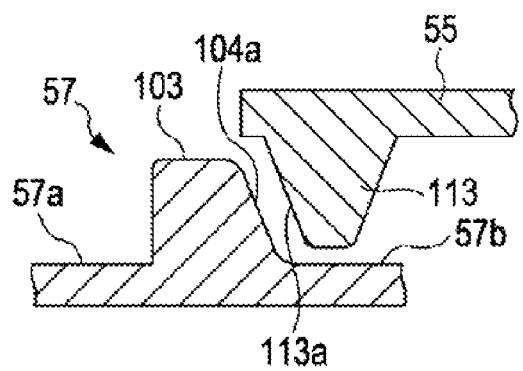

Further, as shown in FIG. 26C, in the disk conveying mechanism 50, the inclined surface 104a may be formed in the guide edge 104 of the cam portion 103, and the inclined surface 113a may be formed in the guide projection 113. By forming an inclined surface in each of the guide edge 104 and the guide projection 113, the guide projection 113 can jump over the cam portion 103 more smoothly.

Figure 26D:
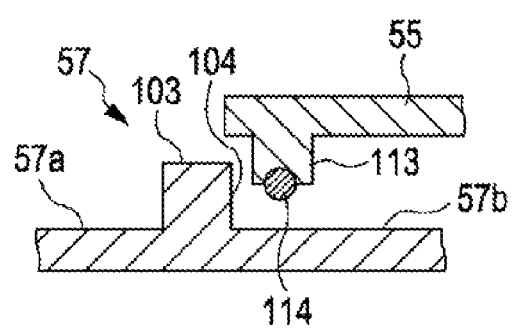

Further, as shown in FIG. 26D, in the disk conveying mechanism 50, a ball 114 may be rotatably held at the distal end of the guide portion 113, with a part of the ball 114 exposed outward from the distal end. When the ball 114 is provided in an upper part of the guide projection 113, the ball 114 rolls on the guide portion 103, thus allowing the guide projection 113 to smoothly jump over the cam portion 103. In this case as well, an inclined surface may be formed in the guide projection 113 or the cam portion 103.

Figure 26E:
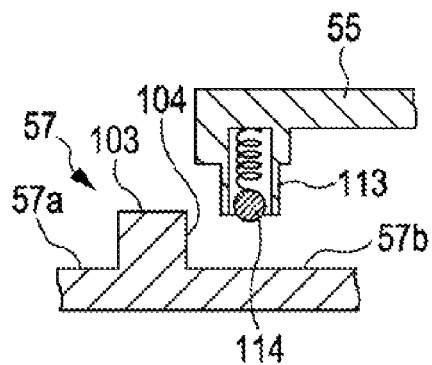

Further, as shown in FIG. 26E, in the disk conveying mechanism 50, the ball 114 may be rotatably held at the distal end of the guide portion 113 with a part of the ball 114 exposed outward from the distal end, and the ball 114 may be supported by a spring received within the guide projection 113 so that the ball 114 can be raised and lowered at the distal end of the guide projection 113. Since the ball 114 disposed at the distal end can be freely raised and lowered by being supported by the spring, as the ball 114 rolls on the cam portion 103 and retracts into the guide projection 113, allowing the guide projection 113 to jump over the cam portion 103 smoothly. It should be noted that in this case as well, an inclined surface may be formed in the guide projection 113 or the cam portion 103.

Figure 26F:
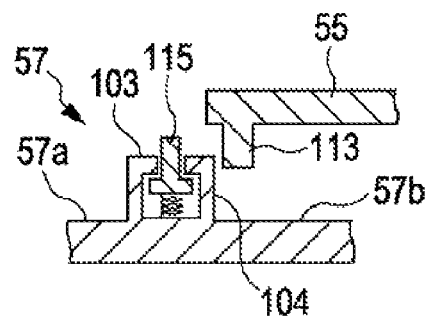

Further, as shown in FIG. 26F, in the disk conveying mechanism 50, the cam portion 103 may be formed hollow, with a stopper piece 115 received within the cam portion 103. The stopper piece 115 is formed in a convex shape in cross section. The bottom portion of the stopper piece 115 is supported by a spring disposed within the cam portion 103, so the stopper piece 115 is urged such that its distal end projects outward. When the guide projection 113 is pressed against the guide edge 104 and brought into abutment with the stopper piece 115, the stopper piece 115 is retracted into the cam portion 103. The guide projection 113 can thus jump over the cam portion 103. It should be noted that in this case as well, an inclined surface may be formed in the guide projection 113 or the cam portion 103.

The disk conveying mechanism 50 can adopt any other arbitrary configuration according to which when the rotation of the eject arm 52 is restricted and the guide projection 113 is pressed against the guide edge 104 during the ejection process of the optical disk 2, the guide projection 113 or the cam portion 103 is retracted so that the guide projection 113 can jump over the cam portion 103.

As described above, the cam portion 103 is provided so as to project from the surface of the main chassis 6 on the bottom case 4 side, and the flexible portion 103 is formed by forming the slit 106 in the upper surface 6a of the main chassis 6. That is, the flexible portion 103a flexes in the arrow u direction in FIG. 23A toward the base end side of the cam portion 103, so a part of the upper surface 6a of the main chassis 6 juts out onto the conveyance area of the optical disk 2. Further, the flexible portion 103a is provided on the rear side of the housing 3, that is, on the leading edge side in the insertion direction of the optical disk 2 into the housing 3. Therefore, in the guide cam 57, the optical disk 2 is ejected from above the flexible portion 103a in the early stage of the ejection process of the optical disk 2.

Accordingly, in the disk conveying mechanism 50, even when an ejecting operation is hindered due to the presence of an obstacle during ejection of the optical disk 2, and the flexible portion 103a flexes onto the conveyance area of the optical disk 2, collision against the optical disk 2 can be prevented since the optical disk 2 is retracted from above the flexible portion 103a.

Further, in the disk conveying mechanism 50, in order to deal with a situation where the ejecting operation of the optical disk 2 is hindered due to the presence of an obstacle, the push-out arm 72 of the eject arm 52 is formed so as to be rotatable in the insertion direction. That is, as shown in FIG. 19, in the disk drive device 1, the rotation support member 71 of the eject arm 52 and the push-out arm 72 are engaged with each other by the caulking shaft 89 so as to be rotatable in the arrow $b_1$ direction and the arrow $b_2$ direction about the opening 77 and the engaging projection 85, and are urged by the coil spring 73 in the arrow $b_2$ direction with a predetermined force. Therefore, even when, at the time of ejection of the optical disk 2, an obstacle that hinders ejection of the optical disk 2 is placed, and a force acting in a direction opposite to the ejecting direction (arrow $b_2$ direction) of the optical disk 2 is exerted on the eject arm 52, the push-out arm 72 applied with this force acting in the opposite direction rotates in the arrow $b_1$ direction, thereby preventing an excessive load from being applied to the drive motor 121 or the optical disk 2.

The draw-in timing at which the optical disk 2 inserted by the user is drawn in by the loading arm 51, and the ejection restriction timing for the loading arm 51 at the time of ejection of the optical disk 2 are determined by the position of the first guide portion 66a in the slide direction of the loading cam plate 53 and the length of the second guide portion 66b.

That is, as described above, the rotation of the loading arm 51 is regulated by the engaging projection 64 being guided in the first guide groove 66 of the loading cam plate 53, and when the eject arm 52 is rotated in the arrow $b_2$ direction and ejection of the optical disk 2 is started, the engaging projection 64 is brought into abutment with the second guide portion 66b and the first guide portion 66a, thus restricting the rotation of the loading arm 51 in the arrow $a_2$ direction that is the ejecting direction of the optical disk 2. The amount of rotation in the arrow $a_2$ direction is thus determined by the amount of movement in the arrow $f_2$ direction of the first guide portion 66a. Accordingly, by making the length of the second guide portion 66b short to move the position of the first guide portion 66a to the front side (arrow $f_2$ direction) in the slide direction of the loading cam plate 53, the timing at which the engaging projection 64 moves from the second guide portion 66b to the first guide portion 66a to be regulated thereby becomes early, thus permitting the rotation of the loading arm 51 in the arrow $a_2$ direction at an early timing relative to the rotation of the eject arm 52 in the arrow $b_2$ direction. This makes it possible to prevent ejection of the optical disk 2 from being hindered by the loading arm 51 due to a delay in the rotation timing of the loading arm 51 by the loading cam plate 53 relative to the ejecting operation of the optical disk 2 by the eject arm 52.

On the other hand, the draw-in timing of the optical disk 2 is determined by the position of the first guide portion 66a of the loading cam plate 53 and the length of the second guide portion 66b. That is, when the optical disk 2 is inserted by the user and the drive mechanism 120 is activated, the slider 122 and the loading cam plate 53 are moved in the arrow $f_1$ direction. As this brings the engaging projection 64 into abutment with the first guide portion 66a that moves in the arrow $f_1$ direction, the loading arm 51 is rotated in the arrow $a_1$ direction, thus drawing in the optical disk 2 inserted by the user to the rear side of the housing 3. Accordingly, when the length of the second guide portion 66b is set large, and the position of the first guide portion 66a in the slide direction of the loading cam plate 53 is set on the rear side (arrow $f_1$ direction) in the slide direction, the drawing-in of the optical disk 2 by the loading arm 51 can be started at a stage where the insertion depth of the optical disk 2 from the disk slot 19 is still small, that is, without the optical disk 2 being deeply inserted by the user.

Accordingly, in the disk conveying mechanism 50, the formation position of the first guide portion 66a in the loading cam plate 53, and the length of the second guide portion 66b are determined such that it is possible to prevent the ejecting operation of the optical disk 2 by the loading arm 51 form being hindered and to allow the optical disk 2 to be drawn in at an early stage. Further, as shown in FIG. 15, the disk drive device 1 may be designed such that when an optical disk with a diameter of, for example, 12 cm is used, the optical disk can be drawn in by the loading arm 51 once the optical disk is inserted up to a position where the distance from the disk slot 19 to the side surface on the rear side in the insertion direction of the optical disk is about 23 mm to 30 mm. In this way, in the disk drive device 1, by setting the draw-in position of the optical disk 2 to be a position spaced apart from the disk slot 19, the distance the optical disk 2 must be inserted by the user can be shortened, and it is possible to draw in the optical disk 2 without inserting the optical disk 2 deep into the housing 3, thereby achieving an improvement in usability.

The draw-in timing of the optical disk 2 in the insertion direction (arrow $a_1$ direction) by the loading arm 51 at the time of drawing in the optical disk 2, and the rotation timing of the loading arm 51 in the ejecting direction (arrow $a_2$ direction) at the time of ejecting the optical disk 2 by the eject arm 52 can be regulated by the first cam groove 66 formed in the loading cam plate 53. The loading cam plate 53 is operated also by the reciprocating drive of the slider 122 in the insertion and withdrawal direction (arrow $f_1$ and $f_2$ directions) at the time of draw-in and ejection of the optical disk 2. Further, both during draw-in and ejection of the optical disk 2, the slider 122 is slid through the same route by the same amount and at the same speed. Therefore, at the time of draw-in and ejection of the optical disk 2, the amounts of rotation of the loading arm 51 in the arrow $a_1$ direction and in the arrow $a_2$ direction with respect to the amounts of slide of the slider 122 and loading cam plate 53 are set to be the same, and the rotation of the loading arm 51 in the arrow $a_1$ direction and the rotation thereof in the arrow $a_2$ direction are uniquely determined by the slide positions of the slider 122 and loading cam plate 53.

On the other hand, in the case of the eject arm 52 that rotates the optical disk 2 in the ejecting direction (arrow $b_2$ direction), the amount of rotation in the insertion direction (arrow $b_1$ direction) with respect to the amount of slide of the slider 122 at the time of drawing in the optical disk 2, and the amount of rotation in the ejecting direction (arrow $b_2$ direction) with respect to the amount of slide of the slider 122 at the time of ejection differ from each other. This is due to the fact that at the time of drawing in the optical disk 2, the eject arm 52 has been rotated to some extent in the insertion direction (arrow $b_2$ direction) by an inserting operation of the user prior to the drive of the slider 122, whereas at the time of ejecting the optical disk 2, the optical disk 2 is to be ejected by an amount including the amount of insertion by the user. That is, although the amount of slide of the slider 122 is the same during both draw-in and ejection of the optical disk 2, the amount of rotation of the eject arm 52 rotated in accordance with the sliding movement of the slider 122 is different.

The reason why the rotation timing of the eject arm 52 with respect to the movement of the slider 122 differs between during insertion and ejection of the optical disk 2 is due to the fact that the second link arm 55 connected to the rotation support member 71 of the eject arm 52 via the first link arm 54 has its movement trajectory regulated by the operating arm 58 and the guide cam 57 throughout the period from the insertion to ejection of the optical disk 2. That is, when, in a state where the slider 122 is not being driven, the optical disk 2 is inserted from the disk slot 19 and the eject arm 52 is rotated in the arrow $b_1$ direction, in the second link arm 55, the engaging projection 116 is slid and guided along the guide edge 108a of the cam groove 108 of the operating arm 58, and the guide projection 113 moves in the loading area 57a that is an area on the right side of the cam potion 103 surrounded by the outer wall portion 105 and on the front side of the housing 3. When the eject arm 52 is further rotated in the arrow $b_1$ direction and the optical disk 2 is drawn in to the disk mounting portion 23 as the slider 122 is driven from the front to the rear of the housing 3, the guide projection 113 of the second link arm 55 is moved from the loading area 57a to the unloading area 57b. When the eject arm 52 is rotated in the arrow $b_2$ direction and the optical disk 2 is ejected from the disk mounting portion 23 to the disk slot 19 as the slider 122 is driven from the rear to the front of the housing 3, the guide projection 113 of the second link arm 55 is guided along the guide edge 104 of the cam portion 102 to be moved to the rear side of the housing 3, thus allowing the guide projection 113 to move to the loading area 57a again. In this way, a difference is set between the amount of movement by which the second link arm 55 is guided by the cam groove 108 of the operating arm 58 with respect to the amount of movement of the slider 122 at the time of insertion and draw-in of the optical disk 2, and the amount of movement by which the second link arm 55 is guided by the guide edge 104 of the guide cam 57 with respect to the amount of movement of the slider 122 at the time of ejection of the optical disk 2.

As described above, while the loading arm 51 and the eject arm 52 are both rotated in accordance with the slide operation of the slider 122, the loading arm 51 is operated by the loading cam plate 53 that is linearly reciprocated together with the slider 122, whereas the eject arm 52 has its movement trajectory controlled by the second link arm 55 that takes a revolving path with respect to the reciprocating path of the slider 122. In the above-described disk conveying mechanism 50 as well, it is possible to uniquely determine, with respect to the reciprocating path of the slider 122, the path in the loading area 57a and the unloading area 57b of the guide projection 113 of the second link arm 55 that slides along the cam groove 108 of the operating arm 58 and the cam portion 103 of the guide cam 57. It is thus possible to synchronize the rotation timing of the loading arm 51 and the rotation timing of the eject arm 52 with each other with respect to the reciprocating drive of the slider 122.

In this regard, a case is considered in which the loading area 57a and the unloading area 57b that are defined by the cam portion 103, around which the guide projection 113 of the second link arm 55 is moved, and the outer wall portion 105 are formed narrow, without any margin taken with respect to the trajectory of the guide projection 113 as it moves in accordance with the movements of the eject arm 52 and slider 122 throughout the period from the insertion to ejection of the optical disk 2. In this case, there is a fear that due to such factors as an accuracy error, a mounting error, and age deterioration of the guide cam 57 and various arms, smooth movement of the guide projection 113 may become difficult, which may make it difficult for the guide projection 113 to move around the cam portion 103. The same is true when the cam groove 108 is formed narrow. Accordingly, in the guide cam 57, the loading area 57a and the unloading area 57b in which the guide projection 113 moves around the guide cam 57 must be formed so as to leave a margin of width, and also the cam groove 108 must be formed so as to leave a margin of width with respect to the diameter of the engaging projection 116.

On the other hand, by forming the loading area 57a and the unloading area 57b or the cam groove 108 so as to leave a margin of width, there is a fear that the second link arm 55 and the eject arm 52 may not accurately follow the movement of the slider 122. For example, at the time of ejecting the optical disk 2, a lag occurs between the timing at which the second link arm 55, which is moved via the operating arm 58 and the first link arm 54 as the slider 122 is moved in the arrow $f_2$ direction, is slid onto an eject guide wall 112c, and the timing at which the loading cam plate 53 is slid following the sliding movement of the slider 122. This can cause a lag between the rotation timing of the eject arm 52 in the arrow $b_2$ direction and the rotation timing of the loading arm 51 rotated in the arrow $a_2$ direction in accordance with the sliding movement of the slider 122. Accordingly, there is a fear of the loading arm 51 not being released when the eject arm 52 is trying to eject the optical disk 2, hindering the ejection of the optical disk 2.

In order to absorb such a lag between the ejection timing of the eject arm 52 and the release timing of the loading arm 51 to ensure smooth ejection of the optical disk 2 by the eject arm 52, the insertion hole 60 which is bored in the loading arm 51 and through which the rotation support member 63 is inserted is formed in the shape of an elongated hole. Since the insertion hole 60 is formed as an elongated hole, the rotation axis of the loading arm 51 moves along the longitudinal direction of the insertion hole 60. Accordingly, when the loading arm 51 is urged in the arrow $a_2$ direction by the optical disk 2 pressed by the eject arm 52, its rotation support moves, allowing the loading arm 51 to rotate in the same direction. Therefore, ejection of the optical disk 2 is not hindered even when a timing lag occurs between the rotation of the eject arm 52 and the rotation of the loading arm 51 in accordance with the stroke of the slider 122.

Further, by forming the insertion hole 60 of the loading arm 51 as an elongated hole, even when the first guide portion 66a of the first cam groove 66 formed in the loading cam plate 53 is provided on the rear side of the housing 3 to elongate the second guide portion 66b to thereby advance the draw-in timing of the optical disk 2, it is possible to prevent a delay in the releasing timing of the loading arm 51 in the arrow $a_2$ direction at the time of ejecting the optical disk 2.

That is, the loading arm 51 is rotated in the arrow $a_1$ direction for drawing the optical disk 2 into the housing 3 when the engaging projection 64 is pressed against the first guide portion 66a of the first cam groove 66. Accordingly, if contact with the first guide portion 66a is achieved as early as possible after the start of the sliding movement of the slider 122, the distance the optical disk 2 needs to be inserted with the hand of the user can be shortened. On the other hand, the loading arm 51 can be rotated in the arrow $a_2$ direction for ejecting the optical disk 2 to the outside of the housing 3 as the engaging projection 64 is moved along the first guide portion 66a after being guided in the second guide portion 66b of the first cam groove 66. Therefore, by forming the second guide portion 66b long, when the engaging projection 64 is not moved to the first guide portion 66a side in a state with the eject arm 52 rotated in the arrow $b_2$ direction for ejecting the optical disk 2, the loading arm 51 cannot be rotated in the arrow $a_2$ direction, hindering the ejection of the optical disk 2.

At this time, since the rotation axis of the loading arm 51 is shifted by forming the insertion hole 60 as an elongated hole, the loading arm 51 can be rotated in the arrow $a_2$ direction, thereby making it possible to prevent the release timing of the loading arm 51 in the arrow $a_2$ direction from being delayed at the time of ejection of the optical disk 2.

It should be noted that instead of providing the elongated insertion hole 60 in the loading arm 51 and providing the rotation support member 63 on the deck portion 4a, the loading arm 51 may be rotatably supported in place by providing the rotation support member 63 of a cylindrical shape so as to project from the loading arm 51, and boring the elongated insertion hole 60 in the deck portion 4a.

As described above, in accordance with the disk conveying mechanism 50 of the disk drive device 1 according to an embodiment of the present invention, at the time of insertion of the optical disk 2, during the process in which the optical disk 2 is inserted to the draw-in position by the user, the engaging projection 116 of the second link arm 55 is slid in the cam groove 108 of the operating arm 58, thus guiding the second link arm 55 in a direction for separating the locking portion 96 and the locking portion 98 of the main chassis 6 away from each other. Therefore, an urging force acting in the ejecting direction can be exerted on the eject arm 52 by the tension coil spring 56 suspended between the second link arm 55 and the main chassis, thereby making it possible to prevent the optical disk 2 from being left halfway inserted in the housing 3 when insertion of the optical disk 2 by the user is discontinued.

Further, in the disk conveying mechanism 50, at the time of drawing in the optical disk, the second link arm 55 is moved by the operating arm 58, and the locking portion 96 and the locking portion 98 of the main chassis 6 are brought closer to each other, thereby suppressing the urging force in the ejecting direction exerted by the tension coil spring 56. Then, in accordance with the operations of the slider 122 and operating arm 58 applied with the driving force of the drive mechanism 120, the disk conveying mechanism 50 causes the eject arm 52 to rotate in the arrow $b_1$ direction.

At the time of ejection of the optical disk 2, the guide projection 113 is slid on the guide edge 104 of the cam portion 103 of the guide cam 57, thereby regulating the free rotation of the second link arm 55 with respect to the first link arm 54 and the free rotation of the first link arm 54 with respect to the rotation support member 71. Thus, in accordance with the movement of the operating arm 58 in the arrow $d_2$ direction, the rotation support member 71, that is, the eject arm 52 is rotated in the arrow $b_2$ direction.

Therefore, combined with the fact that the urging force of the tension coil spring 56 suspended between the second link arm 55 and the main chassis 6 is being suppressed, the disk conveying mechanism 50 can rotate the eject arm 52 in the ejecting direction by an amount corresponding to the operations of the slider 122 and operating arm 58. The optical disk 2 can be thus stably ejected to a predetermined stop position where the center hole 2a of the optical disk 2 is ejected to the outside from the disk slot 19, by the driving force of the drive mechanism 120 without relying on the elastic force.

Next, description will be given of the deck arm 200 that prevents erroneous insertion of a small-diameter optical disk 101 and performs centering on the large-diameter optical disk 2. Since the disk drive device 1 is designed exclusively for the optical disk 2 having a large diameter (e.g., a diameter of 12 cm), the deck arm 200 is provided to deal with a situation where the user inserts the optical disk 101 having a small diameter (e.g., a diameter of 8 cm) by mistake.

That is, when the small-diameter disk 101 is brought into abutment with the push-out arm 72 of the eject arm 52, the small-diameter disk 101 is pushed back to the outside of the disk slot 19 by the urging force in the arrow $b_2$ direction exerted by the tension coil spring 56 locked to the first link arm 54 or by the coil spring 73 engaged with the push-out arm 72, and the eject arm 52 is not rotated to a position where the drive mechanism 120 is driven. On the other hand, when the small-diameter disk 101 is inserted while being deflected to the loading arm 51 side, the small-diameter disk 101 is inserted deep into the housing 3 without being brought into abutment with the push-out arm 72 of the eject arm 52, so the small-diameter disk 101 may remain at a position deviated from the rotation area of the eject arm 52.

Accordingly, the deck arm 200 is provided in the deck portion 4a on the side opposite to the eject arm 52, thus preventing the small-diameter disk 101 from being inserted deep into the housing 3 when the small-diameter disk 100 is inserted while being deflected to the loading arm 51 side.

Figure 27:
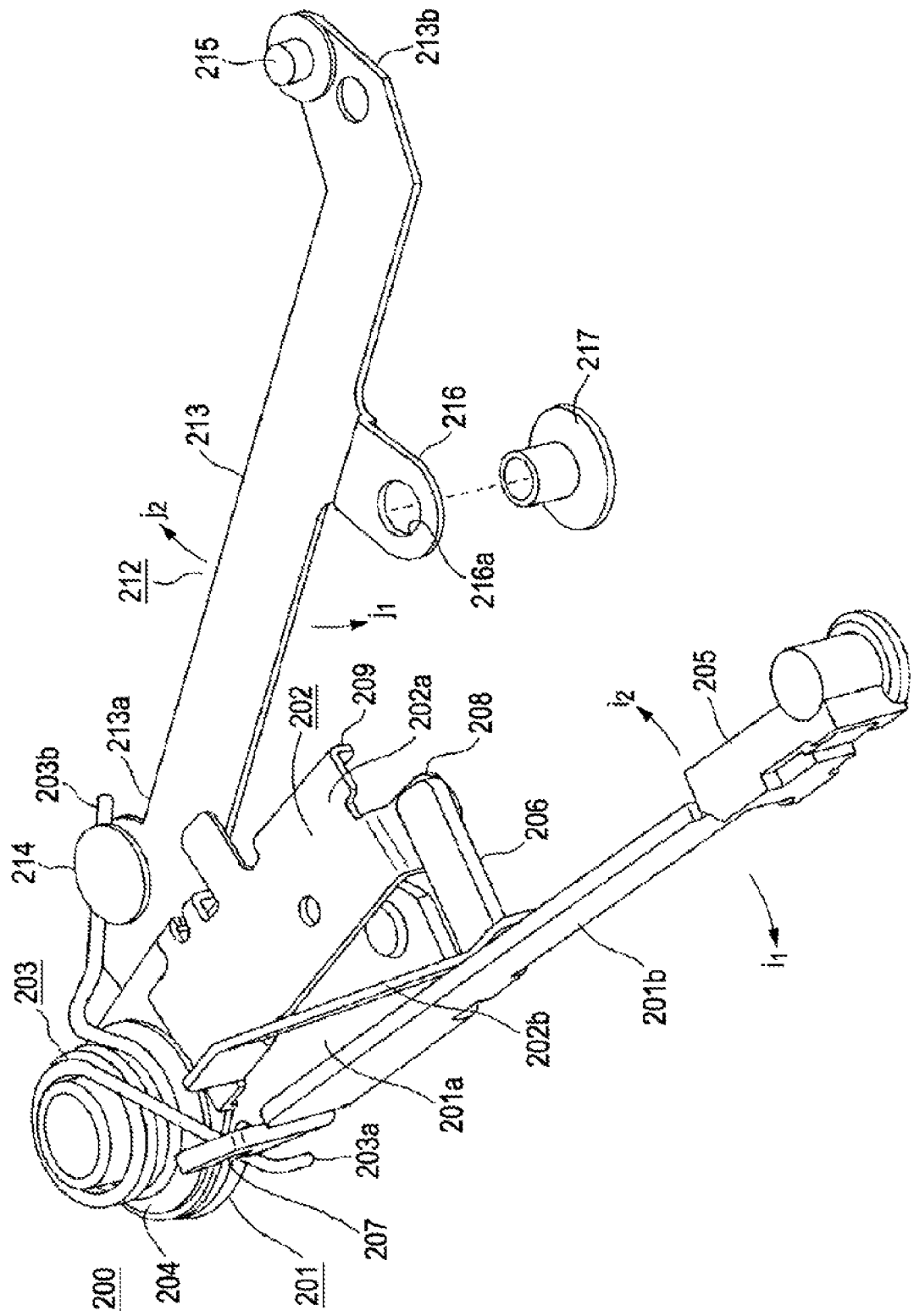
FIG. 27 is a perspective view showing a deck arm and a regulating arm.

As shown in FIG. 11, the deck arm 200 is rotatably provided on the deck portion 4a of the bottom case 4 and on the rear side of the housing 3. When waiting on standby for the insertion of the optical disk 2, the deck arm 200 is urged so as to rotate to the disk slot 19 side, and when the small-diameter disk 101 is inserted, the small-diameter disk 101 can be ejected to the outside of the disk slot 19 by the urging force of the deck arm 200. Specifically, as shown in FIG. 27, the deck arm 200 has an arm member 201 that is rotatably supported on the deck portion 4a to be brought into abutment with the optical disk 2 and the small-diameter disk 101, a pressing plate 202 that is supported coaxially with the arm member 201 and presses the arm member 201, and the coil spring 203 that rotationally urges the arm member 201. The arm member 201 and the pressing plate 202 are rotatably attached to the deck portion 4a by a caulking shaft 204.

The arm member 201 includes a substantially rectangular rotary plate 201a, and an arm portion 201b provided upright on one longitudinal side edge of the rotary plate 201a and extended in the longitudinal direction. An abutting member 205 brought into abutment with the optical disk 2 or the small-diameter disk 101 is provided at the distal end of the arm portion 201b. In the rotary plate 201a, a rotation support portion supported on the deck portion 4a is provided at one longitudinal end, and a guide piece 206 that guides the rotation of the pressing plate 202 is provided on the other end side. In the arm portion 201b, a slit 207 into which one end 203a of the coil spring 203 is locked is formed at a longitudinal end on the rotation support portion side.

The pressing plate 202 supported coaxially with the arm member 201 serves to reliably separate the arm member 201 from the outer periphery of the disk when the optical disk 2 is mounted onto the turntable 23a. The pressing plate 202 includes a principal surface portion 202a disposed so as to be overlapped on the rotary plate 201a of the arm member 201, and a pressing arm 202b that is formed so as to rise from one side edge on the arm portion 201b side of the principal surface portion 202a and presses the arm portion 201b. The principal surface portion 202a is formed in a substantially rectangular shape. In the principal surface portion 202a, a rotation support portion supported on the deck portion 4a together with the arm member 201 is provided at one longitudinal end, and a guide projection 208, which is guided by the guide piece 206 formed in the rotary plate 201a of the arm member 201, is provided so as to project on other end side. The guiding of the guide projection 208 by the guide piece 206 prevents lifting of the pressing plate 202 from the rotary plate 201a. Further, the pressing plate 202 has an abutting piece 209 formed in a side edge portion opposite to the side edge where the pressing arm 202b is provided. The abutting piece 209 is brought into abutment with the distal end of the loading cam plate 53 slid in the arrow $f_1$ direction. The deck arm 200 is rotated in the arrow $i_1$ direction as the abutting piece 209 is pressed by the loading cam plate 53, so the abutting member 205 provided at the distal end of the arm portion 201b is separated away from the outer peripheral surface of the optical disk 2.

The pressing arm 202b provided upright on the principal surface portion 202a is extended to the arm member 201 side, and its distal end is brought into abutment with the arm portion 201b of the arm member 201. The pressing arm 202b presses the arm portion 201b in the arrow $i_1$ direction when the principal surface portion 202a of the pressing plate 202 is pressed by the loading cam plate 53.

The arm member 201 and the pressing plate 202 are rotatably supported on the deck portion 4a by the caulking shaft 204, and constantly urged so as to rotate in the arrow $i_2$ direction as the ejecting direction of the optical disk 2 by the coil spring 203 that is wound around the caulking shaft 204. The one end 203a of the coil spring 203 is locked in the slit 207 of the arm portion 201b, and the other end 203b is locked to a regulating arm 212 that regulates the urging force of the coil spring 203.

As the deck arm 200 is rotated in the arrow $i_1$ direction toward the rear side of the housing 3, the regulating arm 212 prevents the urging force in the arrow $i_2$ direction from increasing by moving the other end 203b of the coil spring 203. The regulating arm 212 includes an arm body 213 rotatably attached onto the deck portion 4a in the same manner as the deck arm 200, the spring locking portion 214 which is provided on one end 213a side of the arm body 213 and to which the other end 203b of the coil spring 203 is locked, and a rotation guide portion 215 which is provided on the other end 213b side of the arm body 213 and engaged with the fourth guide portion 66d of the first cam groove 66 formed in the loading cam plate 53.

The arm body 213 is formed in an elongated shape, and has an insertion piece 216 provided at the substantially intermediate location in the longitudinal direction thereof. A rotation support pin 217 for rotatably locking the arm body 213 to the deck portion 4a is passed through the insertion piece 216. An insertion hole 216 through which the rotation support pin 217 is inserted is bored in the insertion piece 216. With the rotation support pin 217 inserted through the insertion piece 216, the arm body 213 is locked to the deck portion 4a so as to be rotatable about the insertion piece 216. Since the rotation support pin 217 is projected on the deck portion 4a via the insertion hole 216, the rotation support pin 217 is inserted through the third cam groove 69 formed in the loading cam plate 53 in parallel to the slide direction, thereby guiding the sliding movement of the loading cam plate 53.

The other end 203b of the coil spring 203 is locked to the spring locking portion 214 formed at the one end 213a of the arm body 213. The coil spring 203 thus holds the arm member 201, in the slit 207 of the arm portion 201b of which the one end 203a is locked, and the regulating arm 212 at a predetermined spacing from each other. Since the arm member 201 is rotated in the arrow $i_1$ direction upon inserting the optical disk 2, when the rotation of the regulating arm 212 is restricted, the one end 203a of the coil spring 203 which is locked in the slit 207 of the arm portion 201b is moved in a direction away from the other end 203b about a winding portion 203c passed through the caulking shaft 204. Since the one end 203a of the coil spring 203 is urged to the other end 203b side, the arm portion 201b of the arm member 201 applied with this urging force is also urged in the arrow $i_2$ direction toward the front side of the housing 3 as the optical disk 2 is inserted into the housing 3. Accordingly, since an urging force acting in the ejecting direction is applied to the deck arm 200 applied with the urging force of the coil spring 203, the deck arm 200 can eject the erroneously inserted small-diameter disk 101 from inside the housing 3.

As shown in FIG. 13, the rotation guide portion 215 provided at the other end 203b of the arm body 213 is inserted through the fourth guide portion 66b of the loading cam plate 53. The rotation guide portion 215 thus rotates the regulating arm 212 in accordance with the sliding movement of the loading cam plate 53 in the arrow $f_1$ direction and arrow $f_2$ direction, thereby controlling the urging force of the coil spring 203. That is, in the rotation guide portion 215, when the loading cam plate 53 is slid in the arrow $f_1$ direction together with the slider 122 upon inserting the optical disk 2, as shown in FIG. 15, the rotation guide portion 215 is guided by the fourth guide portion 66d to cause the arm body 213 to rotate about the insertion piece 216, and the spring locking portion 214 is rotated in the arrow $j_i$ direction so as to follow the deck arm 200 rotated in the arrow $i_1$ direction. Since the spring locking portion 214 follows the deck arm 200, in the coil spring 203, the one end 203a locked to the arm portion 201b and the other end 203b locked to the spring locking portion 214 do not move away from each other, so the urging force does not increase as the deck arm 200 is rotated in the arrow $i_1$ direction. Therefore, with the regulating arm 212 following the rotation of the deck arm 200, the urging force of the coil spring 203 urging the arm member 201 in the ejecting direction can be kept constant, without seriously hindering the drawing-in operation of the optical disk 2 by the loading arm 51.

When the loading cam plate 53 is slid in the arrow $f_2$ direction, as shown in FIG. 17, the rotation guide portion 215 is rotated as it is guided by the fourth guide portion 66d, so the spring locking portion 214 is rotated in the arrow $j_2$ direction. At this time, since the deck arm 200 is also urged in the direction for bringing the one end 203a closer to the other end 203b by the urging force of the coil spring 203, the arm member 201 is rotated in the arrow $i_2$ direction. Then, when the optical disk 2 is ejected, and the rotation of the spring locking portion 214 in the arrow $j_2$ direction stops, the deck arm 200 is also rotated to the initial position to wait on standby for the insertion of the optical disk 2.

It should be noted that the abutting member 205 provided at the distal end of the arm portion 201b is made of resin softer than the optical disk 2. The abutting member 205 is formed such that its central position to be brought into abutment with the outer peripheral portion of the optical disk 2 inserted form the disk slot 19 is curved inward, and a flange portion with an enlarged diameter is formed at the lower end thereof, thereby making it possible to regulate the movement of the optical disk 2 in the height direction.

Next, the operations of the deck arm 200 and regulating arm 212 described above during the insertion, draw-in, and ejection processes of the optical disk 2 will be described. When waiting on standby for the insertion of the optical disk 2 as shown in FIG. 11, in the regulating arm 212, the locking portion 214 is rotated in the arrow $j_2$ direction as the rotation guide portion 215 is guided by the fourth guide portion 66d of the loading cam plate 53. Further, in the deck arm 200, since the spring locking portion 214 is rotated in the arrow $j_2$ direction, the arm member 201 is rotated in the arrow $i_2$ direction by being urged by the one end 203a of the coil spring 203. At this time, since the distal end of the guide piece 206 is brought into abutment with the distal end of the loading cam plate 53, the rotation of the deck arm 200 in the arrow $i_2$ direction is restricted.

While waiting on standby for the insertion of the optical disk 2, in the eject arm 52 and the deck arm 200, at least one of the push-out arm 72 and abutment member 205 can be brought into abutment with the small-diameter disk 101 inserted from the disk slot 19. When the small-diameter disk 101 is inserted into the housing 3 while being deflected to the deck portion 4a side, the abutting member 205 of the deck arm 200 is pressed against the small-diameter disk 101, so the arm portion 201b is rotated in the arrow $i_1$ direction. Since the one end 203a of the coil spring 203 locked to the arm portion 201b is thus separated away from the other end 203b locked to the spring locking portion 214, so the urging force of the coil spring 203 acting in the arrow $i_2$ direction as the ejecting direction is exerted on the deck arm 200. Since the drive mechanism 120 is not driven even when the entirety of the small-diameter disk 101 has been inserted from the disk slot 19, the small-diameter disk 101 is ejected to the outside of the housing 3 by the deck arm 200. Thus, even when the small-diameter disk 100 is erroneously inserted, the small-diameter disk 101 can be reliably ejected without remaining within the housing 3.

Upon inserting the large-diameter optical disk 2, the arm member 201 of the deck arm 200 is pressed by the optical disk 2 to rotate in the arrow $i_1$ direction. Since the drive mechanism 120 is not driven and the slider 122 and the loading cam plate 53 do not slide during the insertion process of the optical disk 2, the spring locking portion 214 of the regulating arm 212 is not rotated. Accordingly, when the arm member 201 is rotated in the arrow $i_1$ direction, in the coil spring 203, the one end 203a locked to the arm member 201 and the other end 203b locked to the spring locking portion 214 are separated away from each other, thereby applying an urging force in the arrow $i_2$ direction to the deck arm 200.

When the process transfers to the draw-in process of the optical disk 2, following the sliding movement of the slider 122 in the arrow $f_1$ direction, the loading cam plate 53 is also slid in the same direction. As the loading cam plate 53 is slid, as shown in FIG. 15, the deck arm 200 is further rotated in the arrow $i_1$ direction due to the drawing-in of the optical disk 2 by the loading arm 51, and the regulating arm 212 is rotated about the insertion piece 212 while being guided by the fourth guide portion 66d of the first cam groove 66, causing the spring locking portion 214 to rotate in the arrow $j_1$ direction to follow the deck arm 200. Therefore, in the coil spring 203 mounted to the deck arm 200, the one end 203a locked to the arm member 201 and the other end 203b locked to the spring locking portion 214 are not separated away from each other, and hence the urging force acting on the deck arm 200 does not increase. This makes it possible to prevent the urging force exerted by the coil spring 203 to urge the deck arm 200 in the arrow $i_1$ direction from increasing as the optical disk 2 is drawn in, hindering the drawing-in operation by the loading arm 51. It should be noted that during the draw-in process of the optical disk 2 as well, the urging force in the arrow $i_2$ direction is exerted on the deck arm 200 by the coil spring 203, so the abutting member 205 urges the outer peripheral portion of the optical disk 2 in the same direction with a predetermined force.

Once the optical disk 2 has been substantially drawn onto the disk mounting portion 23, as shown in FIG. 16, the abutting piece 209 of the pressing plate 202 is abutted against the distal end of the loading cam plate 53, so the deck arm 200 is further rotated in the arrow $i_1$ direction. When the pressing plate 202 is pressed against the loading cam plate 53, the pressing arm 202b extended from the principal surface portion 202a urges the arm portion 201b of the arm member 201 in the arrow $i_1$ direction. The deck arm 200 can thus reliably separate the abutting member 205 attached to the arm portion 201b away from the outer peripheral surface of the optical disk 2 mounted on the turntable 23a.

During the ejection process of the optical disk 2, the loading cam plate 53 is moved in the arrow $f_2$ direction by the slider 122. As the loading cam plate 53 is slid, the loading arm 51 is rotated in the arrow $a_2$ direction toward the front side of the housing 3, and the eject arm 52 is rotated in the arrow $b_2$ direction, thus ejecting the optical disk 2. Further, as shown in FIG. 17, as the loading cam plate 53 is slid, the regulating arm 212 is rotated about the insertion piece 216 as the rotation guide portion 215 is guided by the fourth guide portion 66d, so the spring locking portion 214 is rotated in the arrow $j_2$ direction. The other end 203b of the coil spring 203 is thus rotated in the arrow $j_2$ direction together with the spring locking portion 214, so the one end 203a of the coil spring 203 and the arm member 201 locked to the one end 203a are rotated in the same direction by the urging force of the coil spring 203. It should be noted that in the deck arm 200, since the coil spring 203 is rotated in accordance with the rotation of the regulating arm 212, the urging force of the coil spring 203 does not increase, thus preventing the optical disk 2 from being shot out by the urging force of the coil spring 203.

When sliding of the loading cam plate 53 is stopped, the rotation of the regulating arm 212 is also stopped. The rotation of the deck arm 200 by the urging force of the coil spring 203 is thus also stopped, so the deck arm 200 returns to the initial position where it waits on standby for the insertion of the optical disk 2.

It should be noted that when the abutting member 205 is brought into abutment with the outer peripheral portion of the optical disk 2, and the deck arm 200 is rotated to the rear side of the housing 3 so that the optical disk 2 is substantially drawn into the vicinity of the disk mounting portion 23, the deck arm 200 urges the optical disk 2 with a constant force in the arrow $i_2$ direction by means of the coil spring 203. At this time, the centering guide 220 locked to the main chassis 6 is provided in the urging direction of the abutting member 205, and the optical disk 2 is centered directly above the turntable 23a of the disk mounting portion 23 by the deck arm 200 and the centering guide 220.

In this way, since the deck arm 200 is rotatably supported at a position that is on the deck portion 4a and located on the rear side of the housing 3 with respect to the disk mounting portion 23, the deck arm 200 can both prevent erroneous insertion of the small-diameter optical disk 101 and function as a centering guide for the optical disk 2. Since the area of the deck portion 4a on the rear side of the housing 3 is secured as an empty space even when the optical disk 2 is mounted on the disk mounting portion 23, by setting the rotation axis in this area, it is possible to make effective use of the narrow limited space within the housing 3, thus preventing an increase in the size of the housing 3.

Figure 28:
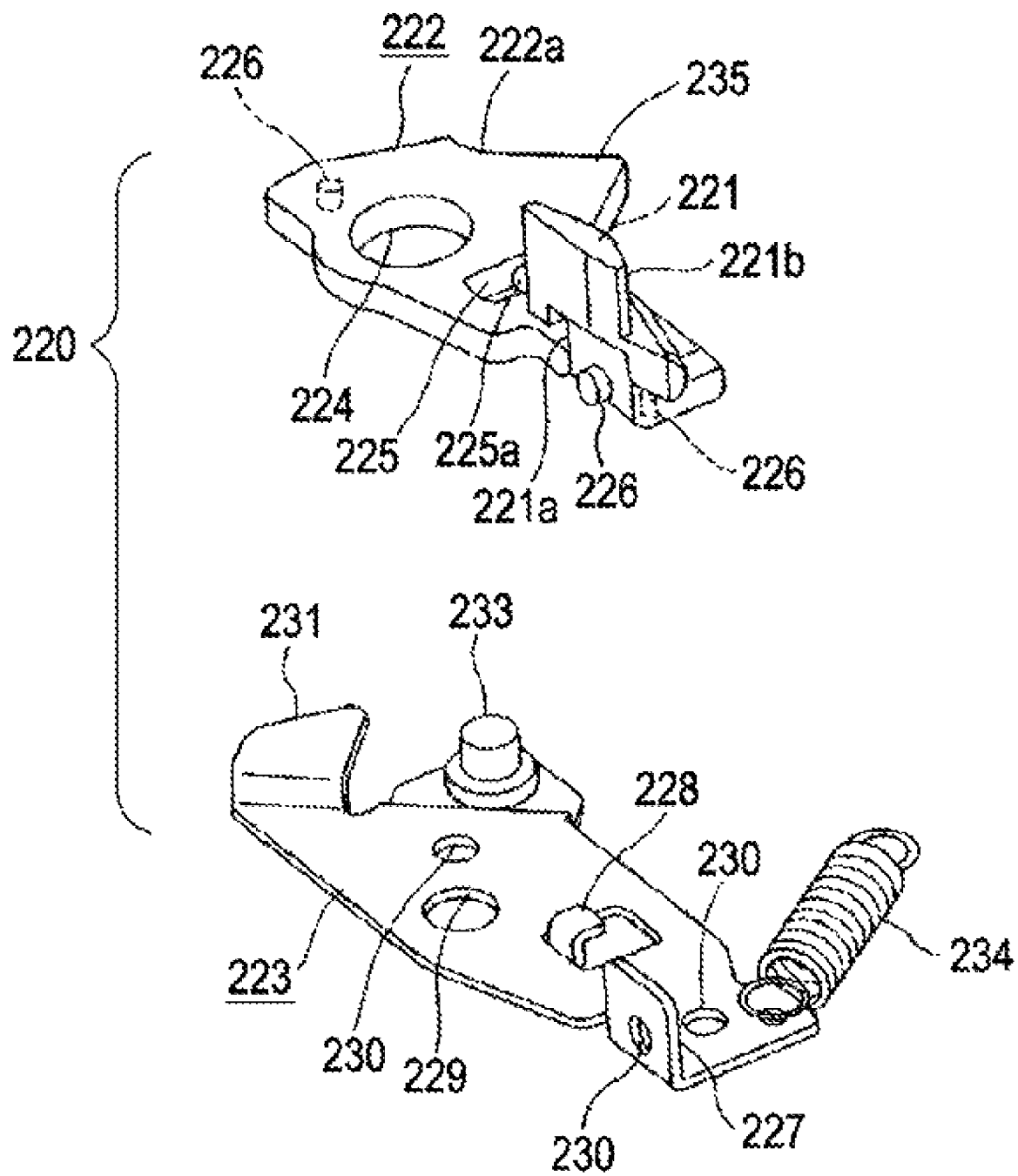
FIG. 28 is an exploded perspective view showing a centering guide.
Figure 29:
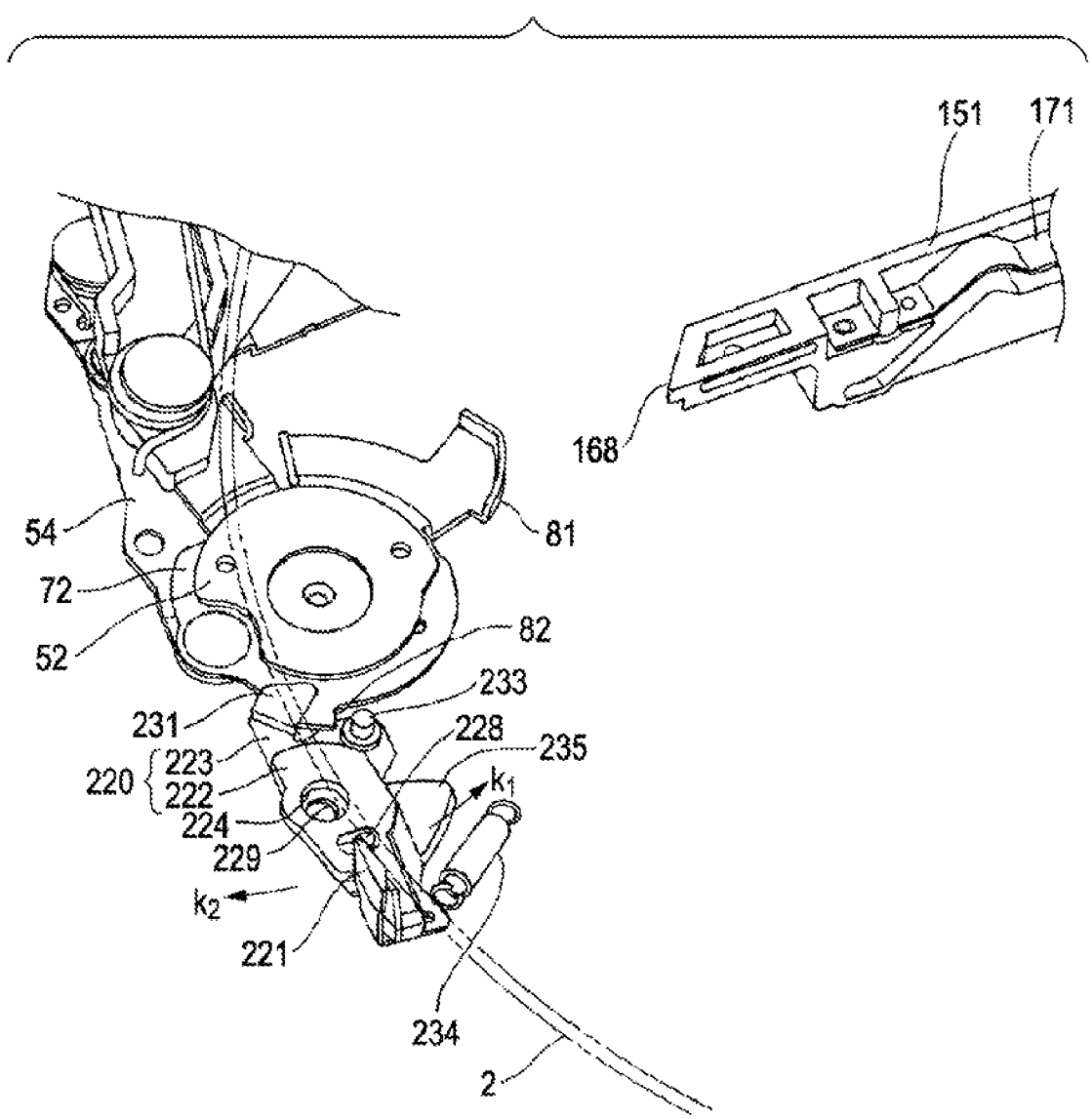
FIG. 29 is a perspective view showing a centering guide.

Next, description will be given of the centering guide 220 that performs centering on the optical disk 2 together with the deck arm 200. As shown in FIG. 3, the centering guide 220 is projected onto the upper surface 6a side from the centering-guide opening 6h of the main chassis 6 and supports the side surface of the optical disk 2 to guide centering of the optical disk 2. As shown in FIGS. 28 and 29, the centering guide 220 includes the guide plate 222 having the guide piece 221 that supports the side surface of the optical disk 2, and a rotary plate 223 that rotates the guide plate 222. The guide plate 222 and the rotary plate 223 are attached integrally, and are rotatably attached to the upper surface 6a of the main chassis 6 from the back side.

The guide plate 222 is made of a resin molded part, and the guide piece 221 that guides the outer peripheral surface of the optical disk 2 is provided upright at one end of a principal surface portion 222a. In the principal surface portion 222a, there is formed an insertion hole 224 which is continuous to an opening 229 formed in the rotary plate 223 and through which a caulking pin is inserted. Further, a locking hole 225 is formed in the principal surface portion 222a. A locking portion 225a, which is locked to a locking piece 228 provided upright on the rotary plate 223, is formed in the locking hole 225. Further, connecting projections 226, which are inserted into connecting holes 230 of the rotary plate 223, are provided so as to project from the back and side surfaces of the principal surface portion 222a. The guide plate 222 is integrated with the rotary plate 223 by locking the locking portion 225a to the locking piece 228 and inserting the connecting projections 226 into the connecting holes 230, and is rotated together with the rotary plate 223.

The guide piece 221 includes an abutting wall 221a that is provided upright on the principal surface of the guide plate 222 and brought into abutment with the side edge of the centering-guide opening 6h, and a guide portion 221b that is projected onto the main chassis 6 and brought into abutment with the outer peripheral portion of the optical disk 2 to guide centering of the optical disk 2. When the guide plate 222 is urged together with the rotary plate 223 so as to rotate toward the outer periphery of the optical disk 2 drawn into the housing 3, the abutting wall 221a of the guide piece 221 is brought into abutment with the side edge of the centering-guide opening 6h to thereby perform positioning on the guide portion 221b, and the outer peripheral surface of the optical disk 2 is supported by the guide portion 221b.

The rotary plate 223 is made of a sheet metal member. In a principal surface portion 223a of the rotary plate 223, there are formed a support wall 227 that supports the guide piece 221 provided upright on the guide plate 222, the locking piece 228 that is inserted through the locking hole 225, the opening 229 formed so as to be coaxially continuous to the insertion hole 224, and the connecting holes 230 inserted onto the connecting projections 226.

The support wall 227 has the connecting hole 230 into which the connecting projection 226 provided so as to project laterally from the abutting wall 221a of the guide piece 221 is inserted. The support piece 227 supports the abutting wall 221a, and urges the guide piece 221 toward the outer peripheral surface of the optical disk 2 as the rotary plate 223 is rotationally urged by the tension coil spring 234 described later. The locking piece 228 is provided upright on the principal surface portion 223a of the rotary plate 223, and is bent in a substantially orthogonal direction at its distal end so as to be locked to the locking portion 225a of the locking hole 225 of the guide plate 222. The locking piece 228 thus urges the guide plate 222 toward the outer peripheral surface of the optical disk 2 together with the support wall 227.

The opening 229 is formed continuous to the insertion hole 224 of the guide plate 222, and a caulking pin (not shown) is inserted through the opening 229. The centering guide 220 is thus rotatably supported on the upper surface 6a of the main chassis 6, and can be rotated in the arrow $k_1$ direction in FIG. 29 in which the guide piece 221 rotates toward the outer peripheral surface of the optical disk 2 and in the arrow $k_2$ direction in which the guide piece 221 separates away from the outer peripheral surface of the optical disk 2.

The rotary plate 223 has the cam shaft 233 formed in the principal surface portion 223a. The cam shaft 233 is rotated by the rotary piece 82 formed in the rotation support member 71 of the eject arm 52. The cam shaft 233 is formed by attaching a caulking pin onto the principal surface portion 223a of the rotary plate 223. When the eject arm 52 is rotated in the arrow $b_1$ direction for drawing in the optical disk 2, the rotary piece 82 of the rotation support member 71 is brought into abutment with and pressed against the cam shaft 233, so the centering guide 220 is rotated about the caulking pin, which is inserted through the insertion hole 224 and the opening 229, in the arrow $k_2$ direction in which the guide piece 221 separates away from the outer peripheral surface of the optical disk 2.

Further, the rotation plate 223 has an engaging piece 231 formed in the principal surface portion 223a. The engaging piece 231 is engaged with the rotation support member 71 of the eject arm 52. As shown in FIG. 29, the engaging piece 231 is first bent upward from the principal surface portion 223a and then bent to the rotation support member 71 side. The engaging piece 231 is thus formed at a position higher than the principal surface portion 223a and extended onto the rotation support member 71. The rotary plate 223 is thus engaged with the principal surface of the rotation support member 71, and the cam shaft 233 and the rotary piece 82 can be brought into abutment with each other.

In the rotary plate 223, the tension coil spring 234 is locked to the principal surface portion 223a. The tension coil spring 234 urges the centering guide 220 so as to rotate in the arrow $k_1$ direction in which the guide piece 221 is brought into abutment with the outer peripheral surface of the optical disk 2. One end of the tension coil spring 234 is locked to the rotary plate 223, and the other end is locked to the main chassis 6, so the tension coil spring 234 constantly urges the guide piece 221 of the centering guide 220 so as to rotate in the arrow $k_1$ direction. Since the guide piece 221 is urged so as to rotate in the arrow $k_1$ direction, the abutting wall 221a is pressed against the side edge of the centering-guide opening 6h provided in the main chassis 6, thus performing centering on the guide portion 221b. Since the abutting wall 221a is urged by the urging force of the tension coil spring 234 toward the centering-guide opening 6h to effect positioning, the centering guide 220 can be prevented from rocking in the arrow $k_2$ direction in which the guide portion 221b separates away from the outer peripheral surface of the optical disk 2.

It should be noted that, as described above, the centering guide 220 has, in the guide plate 222, the position regulating member 235 that rotates and returns the eject arm 52 that has been rotated to the eject position to the home position. As the guide plate 222 is urged in the arrow $k_1$ direction by the tension coil spring 234, the position regulating member 235 is held at a position where it can be brought into abutment with the bent piece 81 formed in the rotation support member 71 of the eject arm 52 that has been rotated to the eject position.

Then, in the ejection process of the optical disk 2, the position regulating member 235 is brought into collision against the bent piece 81 from the arrow $k_2$ direction. At this time, the rotation support member 71 is pushed back by the urging force of the tension coil spring 234, thus rotating and returning the eject arm 52 from the eject position to the home position where the eject arm 52 waits on standby for the insertion of the optical disk 2.

Next, the centering process of the optical disk 2 using the centering guide 220 will be described. As described above, during the insertion and draw-in processes of the optical disk 2, until the cam shaft 233 of the rotary plate 223 is pressed by the rotary piece 82 formed in the rotation support member 71 of the eject arm 52, the guide piece 221 is urged by the urging force of the tension coil spring 234 so as to rotate in the arrow $k_1$ direction toward the outer peripheral surface of the optical disk 2. The outer peripheral surface of the optical disk 2 can be thus guided by the guide portion 221b.

As the engaging projection 64 is guided by the first cam groove 66 of the loading cam plate 53, the loading arm 51 draws the optical disk 2 into the centering position where the center hole 2a is positioned directly above the turntable 23a. Specifically, as the engaging projection 64 is guided by the first guide portion 66a of the first cam groove 66, the loading arm 51 is rotated in the arrow $a_1$ direction for drawing in the optical disk 2, and conveys the optical disk 2 substantially up to the centering position. The rotation of the loading arm 51 in the arrow $a_1$ direction and arrow $a_2$ direction is restricted as the engaging projection 64 is guided by the second guide portion 66b.

When the optical disk 2 is conveyed substantially up to the centering position, the deck arm 200 is also pressed against the outer peripheral surface of the optical disk 2 to be rotated in the arrow $i_1$ direction. At this time, in the deck arm 200, an urging force in the arrow $i_2$ direction is applied by the coil spring 203 to the arm member 201 with respect to the optical disk 2. This urging force is exerted from the abutting member 205 attached to the arm member 201 with respect to the optical disk 2 in a direction toward the turntable 23a. As described above, this urging force is kept constant without increasing due to the movement of the spring locking portion 214 following the rotation of the regulating arm 212.

That is, in the disk drive device 1, when the optical disk 2 is drawn into the housing 3, the rocking of the loading arm 51 and centering guide 220 is restricted, and a constant urging force is exerted on the optical disk 2 by the deck arm 200. Further, in the disk drive device 1, with the turntable 23a as the center, the outer peripheral surface of the optical disk 2 is supported at three points centered about the disk mounting portion 23, namely the abutting portion 61 of the loading arm 51, the guide piece 221 of the centering guide 220, and the abutting member 205 of the deck arm 200. Further, the optical disk 2 is supported in a rigid state such that its rocking motion is restricted at two of the three points, that is, at the abutting portion 61 and the guide piece 221, with an urging force applied toward the turntable 23a from the abutting member 205 at the remaining one point.

In this way, in the disk drive device 1 as described above, the loading arm 51 that draws the optical disk 2 onto the disk mounting portion 23 is subjected to rigid positioning in accordance with the centering position of the optical disk 2, thereby making it possible to perform centering on the optical disk 2 with reliability.

In the disk drive device 1 as described above, in addition to the loading arm 51, the centering guide 220 is also subjected to rigid positioning in accordance with the centering position of the optical disk 2, thereby making it possible to perform centering on the optical disk 2 with greater reliability.

Further, in the disk drive device 1 as described above, of the abutting portion 61, the abutting member 205, and the guide piece 221 that are arranged at substantially equal intervals with the turntable 23a as the center, two of these components are set rigid in accordance with the centering position of the optical disk 2, and the remaining one of these components urges the optical disk 2 toward the turntable 23a, thereby making it possible to perform centering with greater reliability. Accordingly, when the base unit 22 is raised to the chucking position by the slider 122 and the sub-slider 151 described later, the optical disk 2 and the turntable 23a can be smoothly chucked with each other. Therefore, it is possible to eliminate generation of noise or application of a load to the optical disk 2 or the turntable 23a which occurs when chucking is performed in a state where the center hole 2a of the optical disk 2 and the turntable 23a are misaligned.

In this regard, if all of the three points, the abutting portion 61, the guide piece 221, and the abutting member 205 which support the outer peripheral surface of the optical disk 2 are subjected to rigid regulation, there is a fear that a shift in the centering position of the optical disk 2 may occur due to such factors as an error in the dimensions of the optical disk 2 or an error in the accuracy of individual parts, which makes it difficult to perform smooth chucking with respect to all kinds of optical disk 2. On the other hand, since the abutting member 205 is rotatably urged without being set rigid, such an error in the accuracy of the optical disk 2 or components can be absorbed, thereby making it possible to perform centering on the optical disk 2 with reliability.

It should be noted that at the time of centering, in the eject arm 52, during the loading process of the optical disk 2, the locking portion 96 of the second link arm 55 and the locking portion 98 formed in the main chassis 6 are brought closer to each other as the second eject arm 55 is moved in the arrow $d_1$ direction by the operating arm 58. This causes the tension coil spring 56 to be gradually returned from its expanded state, so hardly any urging force is exerted in the arrow $b_2$ direction that is the ejecting direction of the optical disk 2. Since the rotation of the rotation support member 71 is restricted by the operating arm 58, the urging force of the tension coil spring 56 is not transmitted to the optical disk 2 from the eject arm 52.

At this time, since the loading cam plate 53 that guides the engaging projection 64 is integrated with the slider 122, and the slider 122 is supported along the slide direction by the bottom case 4 as will be described later, positioning is performed on the loading arm 51, which is rotatably supported on the deck portion 4a, with respect to the main chassis 6 similarly disposed on the bottom case 4 via the loading cam plate 53 and the slider 122. The base unit 22 on which the turntable 23a is provided is also supported so as to be freely raised and lowered with respect to the main chassis 6 as will be described later. That is, with respect to the main chassis 6, positioning is performed on the loading arm 51 and the centering guide 220 on the one hand, and positioning is performed on the turntable 23a on the other hand.

Therefore, by means of the loading arm 51 and the centering guide 220 each subjected to positioning with respect to the main chassis 6, the optical disk 2 is centered on the turntable 23a that is similarly subjected to positioning with respect to the main chassis 6, thus achieving reliable centering of the optical disk 2.

As shown in FIG. 16, when chucking of the optical disk 2 is performed, in the centering guide 220, the cam shaft 233 formed on the rotary plate 223 is pressed by the rotary piece 82 provided in the rotation support member 71 of the eject arm 52. The rotary plate 223 and the guide plate 222 are thus rotated about the insertion hole 224 against the urging force of the tension coil spring 234, so the guide piece 221 is moved in the arrow $k_2$ direction. This causes the guide portion 221b of the guide piece 221 to separate away from the outer peripheral surface of the optical disk 2.

Further, as described above, as the engaging projection 64 is guided by the third guide portion 66c of the first cam groove 66 of the loading cam plate 53, the loading arm 51 is rotated in the arrow $a_2$ direction, so the abutting portion 61 is separated away from the outer peripheral surface of the optical disk 2. Likewise, in the deck arm 200, as the abutting piece 209 of the pressing plate 202 is pressed in the arrow $f_1$ direction against the distal end of the loading cam plate 53, the arm member 201 urged by the pressing arm 202b is rotated in the arrow $i_1$ direction, so the abutting member 205 attached to the arm member 201 is separated away from the outer peripheral portion of the optical disk 2. It should be noted that the eject arm 52 is also rotated in the arrow $b_1$ direction as the bent piece 81 of the rotation support member 71 is pressed by the sub-slider 151, so the support portion 88 and the pickup portion 90 are separated away from the outer peripheral portion of the optical disk 2.

Accordingly, the optical disk 2 chucked on the turntable 23a is released from the various arms and the centering guide 220 that support its outer peripheral portion. The optical disk 2 thus becomes rotatable by the disk rotating drive mechanism 24.

It should be noted that as described above, in the ejection process of the optical disk 2, the rotation support member 71 is rotated in the arrow $b_2$ direction due to the slide operation of the sub-slider 151, so the centering guide 220 is rotated in the arrow $k_1$ direction. Further, when the loading cam plate 53 is conveyed in the arrow $f_2$ direction due to the slide operation of the slider 122, the deck arm 200 and the loading arm 51 are rotated in the arrow $i_2$ direction and the arrow $a_2$ direction, respectively.

As shown in FIG. 11, the drive mechanism 120 that supplies a driving force to the disk conveying mechanism 50 includes the drive motor 121, the slider 122 that is applied with the driving force of the drive motor 121 to slide within the bottom case 4, and a gear train 123 that transmits the driving force of the drive motor 121 to the slider 122. These components are disposed on the bottom case 4 side of the main chassis 6. The drive mechanism 120 drives the disk conveying mechanism 50 and the base elevating mechanism 150 by sliding the slider 122 by the drive motor 121.

When the optical disk 2 is inserted to a predetermined draw-in position, and the first switch SW1 is depressed by the rotation support member 71 of the eject arm 52, the drive motor 121 is driven in a forward direction for moving the slider 122 in the arrow $f_1$ direction. When an eject operation is performed, the drive motor 121 is driven in a reverse direction for moving the slider 122 in the arrow $f_2$ direction. The slider 122 is moved in the arrow $f_1$ direction or the arrow $f_2$ direction in FIG. 11 in accordance with loading and ejection of the optical disk 2 to thereby drive the various arms of the disk conveying mechanism 50 and the base elevating mechanism 150. The gear train 123 transmits the driving force of the drive motor 121 to the slider 122 via a rack portion 131.

Figure 30:
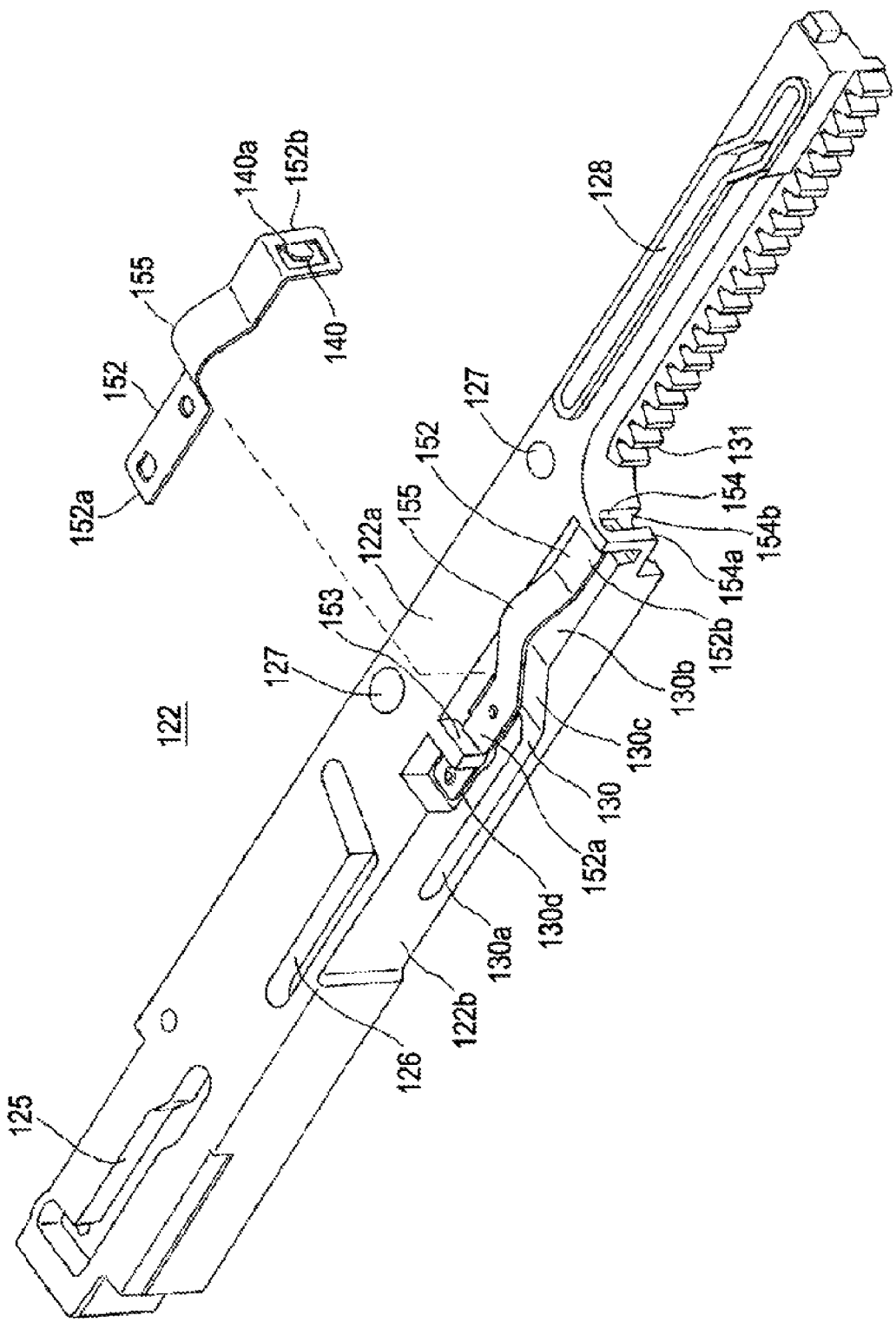
FIG. 30 is a perspective view showing a first guide plate and a slider.

As shown in FIG. 30, the slider 122 is made of a resin member formed in a substantially rectangular parallelepiped shape as a whole. On an upper surface 122a of the slider 122, there are formed the first guide groove 125 with which the engaging projection 109 formed in the third link arm 100 is engaged, a second guide groove 126 with which the connecting arm 165 that drives the sub-slider 151 of the base elevating mechanism 150 described later is engaged, the pair of engaging recesses 127 that engage with the pair of engaging protrusions 68 formed in the loading cam plate 53, and a third guide groove 128 with which one end of an opening/closing arm 191 that restricts double insertion of the optical disk 2, which is not described here in detail, is engaged.

The slider 122 has, in a side surface 122b on the base unit 22 side, the first cam slit 130 through which the first support shaft 47 provided so as to project from the sub-chassis 29 of the base unit 22 is inserted, and the rack portion 131 that engages with the gear train 123. A first guide plate 152 is assembled onto the first cam slit 130. The first guide plate 152 prevents backlash of the first support shaft 47 of the sub-chassis 29 and stably operates the disk rotating drive mechanism 24. In the slider 122, a slide guide groove 129 is formed on a lower surface 122c along the longitudinal direction. The pair of guide protrusions 124 provided so as to project from the bottom case 4 are engaged with the slide guide groove 129, thereby guiding the slide operation along the longitudinal direction (see FIG. 9).

The slider 122 described above is arranged, at the bottom portion of the bottom case 4, between one side portion of the bottom case 4 where the deck portion 4a is provided and the base unit 22. The slider 122 is located below the optical disk 2 that is inserted into the housing 3 from the disk slot 19. The top portion of the slider 122 has a height slightly lower than that of the deck portion 4a. The slider 122 is covered with the main chassis 6, and is driven so as to slide in the arrow $f_1$ direction and arrow $f_2$ direction as the forward and backward directions via the drive motor 121 and the gear train 123 provided at the bottom portion of the bottom case 4.

In the drive mechanism 120, the third link arm 100 and the operating arm 58 engaged with the third link arm 100 are moved in conjunction with the slide operation of the slider 122 to thereby regulate the rotation of the eject arm 52. At the same time, the loading cam plate 53 is moved back and forth to rotate the loading arm 51. The drive mechanism 120 thus performs a loading operation of drawing the optical disk 2 into the housing 3 and an eject operation of ejecting the optical disk 2 to the outside of the disk slot 19 from the disk mounting portion 23 in accordance with the sliding movement of the slider 122.

Next, description will be given of the base elevating mechanism 150 that raises and lowers the base unit 22 in conjunction with the slide operation of the slider 122. The base elevating mechanism 150 raises and lowers the base unit 22 between the chucking position where the base unit 22 is raised to mount the optical disk 2 that has been conveyed to the centering position onto the turntable 23a of the disk mounting portion 23, the chucking release position where the base unit 22 is lowered to dismount the optical disk 2 from the turntable 23a, and the recording/reproduction position where the base unit 22 is positioned between the chucking position and the chucking release position to perform recording or reproduction of signals with respect to the optical disk 2.

Specifically, the base elevating mechanism 150 raises and lowers the base unit 22 by raising and lowering the first support shaft 47 and the second support shaft 48 formed in the base unit 22 by the slider 122 and the sub-slider 151 that is slid in accordance with the slide operation of the slider 122. As shown in FIG. 30, the first cam slit 130 for raising and lowering the base unit 22 between the chucking release position and the recording/reproduction position is formed so as to extend longitudinally in the side surface of the slider 122 opposed to the base unit 22. The first cam slit 130 has a lower horizontal surface portion 130a corresponding to the chucking release position, an upper horizontal surface portion 130b corresponding to the recording/reproduction position, an inclined surface portion 130c connecting between the lower horizontal surface portion 130a and the upper horizontal surface portion 130b, and an attaching portion 130d where the first guide plate 152 described later is attached. The first support shaft 47 provided so as to project from the sub-chassis 29 of the base unit 22 is slidably inserted through the first cam slit 130.

The first guide plate 152 is disposed in the first cam slit 130. The first guide plate 152 guides the movement of the first support shaft 47, and prevents backlash of the first support shaft 47 in the recording/reproduction position to allow stable operation of the disk rotating drive mechanism 24. The first guide plate 152 is made of a leaf spring member, and has an engaging hole provided at one end 152a. This engaging hole is engaged with an engaging projection provided so as to project from the attaching portion 130d of the first cam slit 130, and the one end 152a is locked to a projecting piece 153 formed so as to extend from the upper surface 122a of the slider 122 toward the attaching portion 130d side. The first guide plate 152 has a locking piece 140 formed at the other end 152b. The locking piece 140 is locked to a locking portion 154 provided in the first cam slit 130. In the first guide plate 152, there is formed, above the contact between the upper horizontal surface portion 130b and the inclined surface portion 130c, a projecting portion 150 to which the first support shaft 47 moves when the base unit 22 is raised to the chucking position and which projects to the upper surface 122a side of the slider 122 when the first support shaft 47 is moved to the upper horizontal surface portion 130b.

The lower horizontal surface portion 130a of the first cam slit 130 is formed slidably, and has a height that is slightly larger than the diameter of the first support shaft 47. On the other hand, the height of the upper horizontal surface portion 130b up to the first guide plate 152 is set to be the same as or slightly smaller than the diameter of the first support shaft 47. Therefore, when the first support shaft 47 is moved to the upper horizontal surface portion 130b, the first support shaft 47 is pressed into and nipped between the first guide plate 152 and the upper horizontal surface portion 130b. Therefore, the first guide plate 152 can suppress vibration caused by the spindle motor 24a of the disk rotating drive mechanism 24 provided in the base unit 22 and stably rotate the optical disk 2.

As the first support shaft 47 is nipped between the first guide plate 152 and the upper horizontal surface portion 130b, the projecting portion 155 projects onto the upper surface 122a of the slider 122 to be pressed against the upper surface 6a of the main chassis 6. Therefore, during recording/reproduction with respect to the optical disk 2, the slider 122 is pressed to the bottom case 4 side by the first guide plate 152. It is thus possible to suppress the influence of vibration or disturbance due to the drive of the base unit 22.

Figure 31:
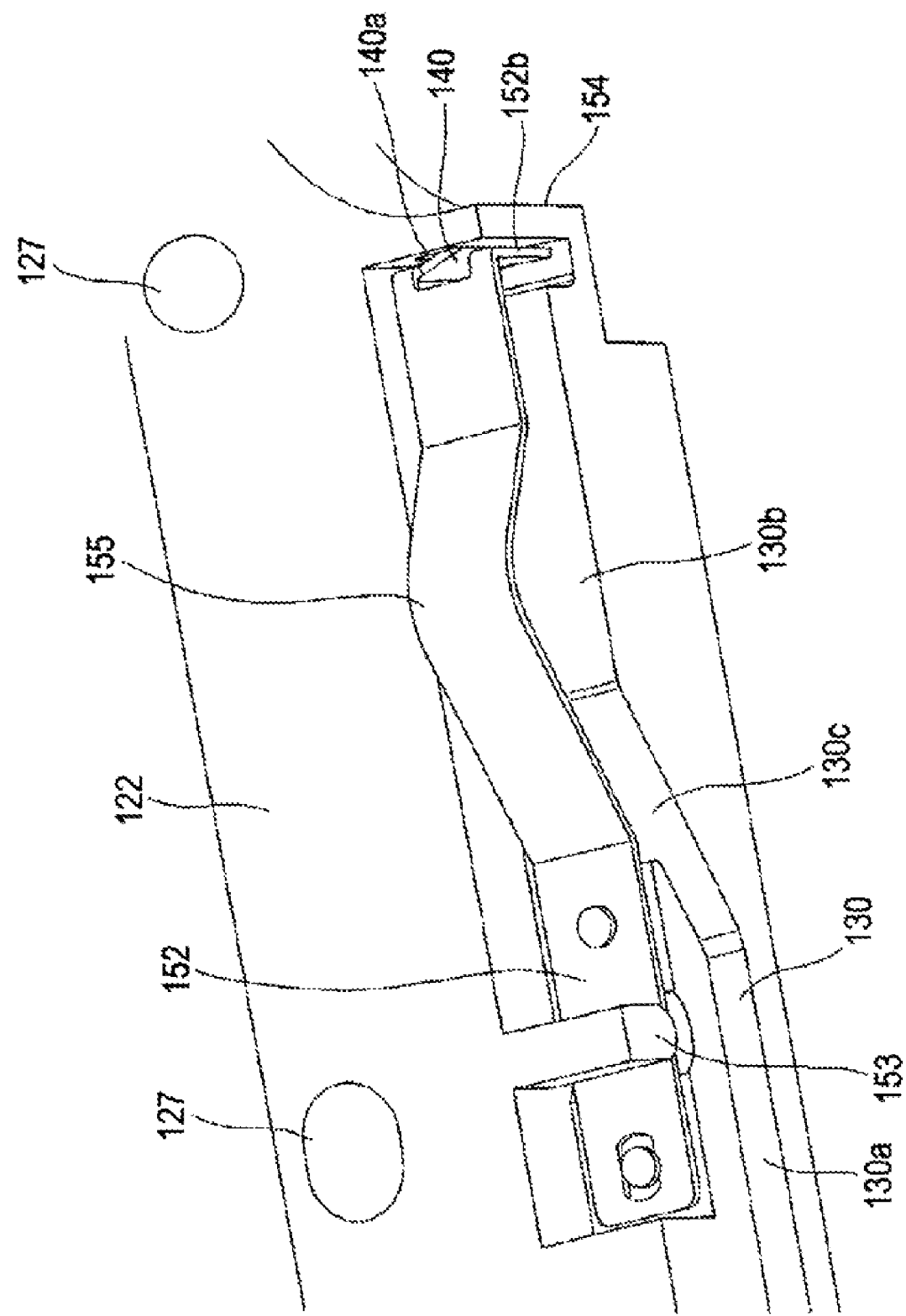
FIG. 31 is a perspective view showing a slider to which a first guide plate has been locked.

The locking piece 140 formed at the other end 152b of the first guide plate 152 is formed by bending the other end 152b in a direction orthogonal to the longitudinal direction of the slider 122, and projecting a part of the principal surface portion of the other end 152b in a substantially rectangular shape along the bending direction of the other end 152b. The locking portion 154 to which the locking piece 140 is locked is provided at the front of the upper horizontal surface portion 130b, and a slit 154b that extends along the thickness direction is provided in a side wall 154a that extends in the thickness direction from the upper surface 122a of the slider 122. When the first guide plate 152 is locked in the first cam slit 130, as shown in FIG. 31, the other end 152b of the first guide plate 152 faces the side wall 154a, and the locking piece 140 is inserted through the slit 154b, so an upper surface 140a of the locking piece 140 can be brought into abutment with the upper portion of the slit 154b.

Since the locking piece 140 is inserted through the slit 154b, in the first guide plate 152, when an impact in a plane direction is exerted, the upper surface 140a of the locking piece 140 and the upper portion of the slit 154b are brought into abutment with each other, allowing such an impact to be received by the slider 122 via the upper surface 140a of the locking piece 140. This prevents the first guide plate 152 from undergoing plastic deformation when an impact in a plane direction is exerted in the event of accidental droppage of the disk drive device 1 or the like.

In particular, the first guide plate 152 is made of an elongated elastic member and thus liable to undergo plastic deformation with respect to an impact in a plane direction. When the disk drive device 1 is shipped from the manufacturer or when electronic equipment mounted with the disk drive device 1 is conveyed, an impact may be applied in the event of accidental droppage or the like due to simplified packing, so it is necessary to deal with this problem. In this regard, by forming the locking piece 140 such that it can be locked to the slider 122, it is possible to prevent deformation of the first guide plate 152.

The sub-slider 151 supports the second support shaft 48 provided so as to project from the sub-chassis 29 of the base unit 22, and is engaged with the slider 122. The sub-slider 151 is disposed so as to be slidable in the arrow $h_1$ direction or the arrow $h_2$ direction in FIG. 11 orthogonal to the loading direction of the optical disk 2 in accordance with the slide operation of the slider 122.

Figure 32:
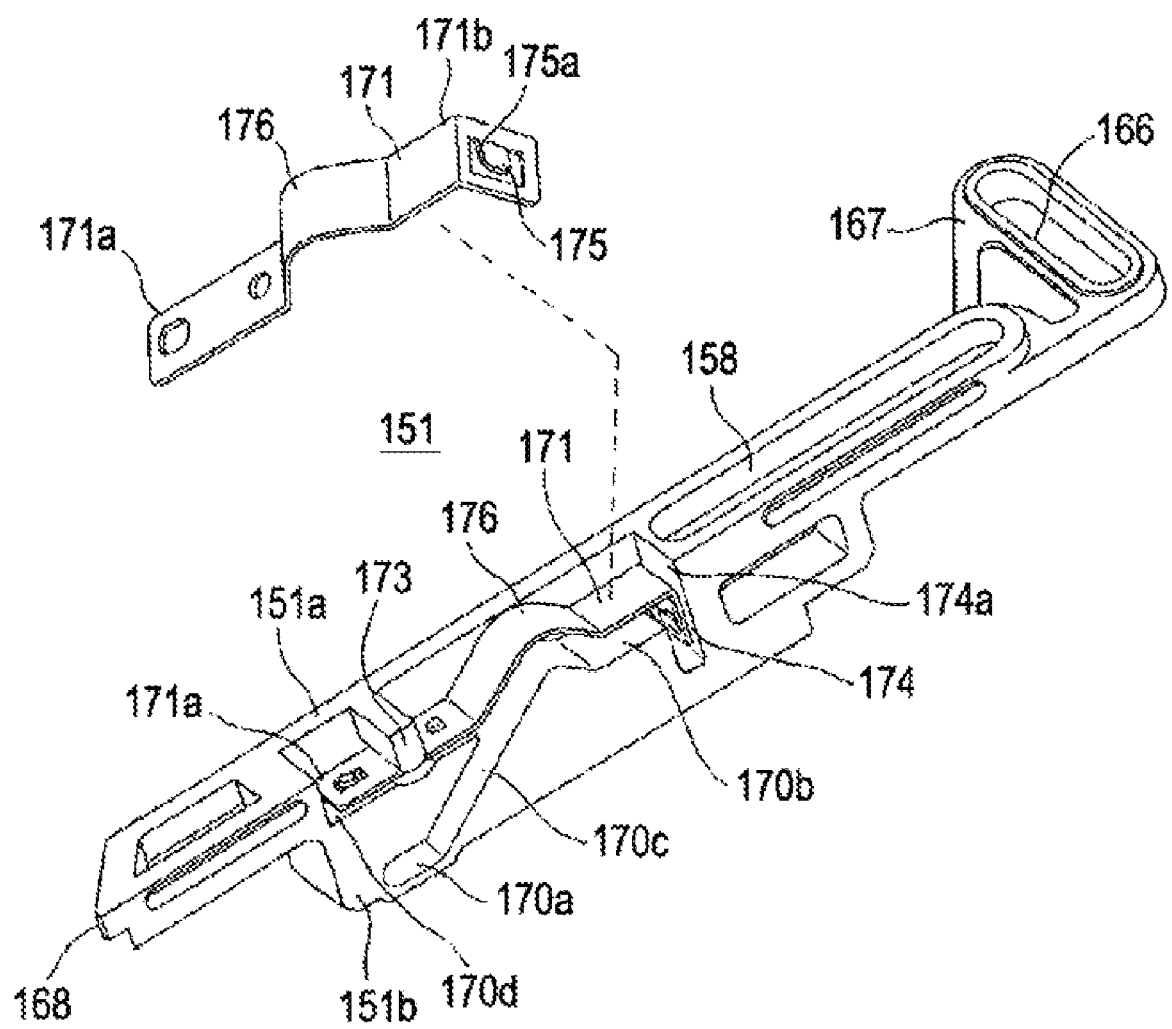
FIG. 32 is a perspective view showing a second guide plate and a sub-slider.

As shown in FIGS. 11 and 32, the sub-slider 151 is made of an elongated flat member formed of synthetic resin, and has an upper guide groove 158 formed in an upper surface 151a so as to extend longitudinally. A guide projection 157 projected to the bottom case 4 side from the upper surface 6a of the main chassis 6 is engaged with the upper guide groove 158. In the sub-slider 151, a lower guide groove 160 with which a guide projection 159 projected from the bottom case 4 is engaged is formed so as to extend longitudinally in a lower surface 151c at a position partially shifted from the upper guide groove 158 (see FIG. 9). In the sub-slider 151, when the guide projection 157 projected from the main chassis 6 is engaged with the upper guide groove 158, the guide projection 157 slides in the upper guide groove 158, and when the guide projection 159 projected from the bottom chassis 4 is engaged with the lower guide groove 160, the guide projection 159 slides in the lower guide groove 160. The sub-slider 151 is thus slid in the arrow $h_1$ direction or the arrow $h_2$ direction in conjunction with the slide operation of the slider 122.

The sub-slider 151 has an engaging groove 166 formed at one longitudinal end located on the slider 122 side. The engaging arm 165 connected to the slider 122 is engaged with the engaging groove 166. The engaging groove 166 is provided in an engaging piece 167 extended in a direction orthogonal to the longitudinal direction of the sub-slider 151. The other end of the sub-slider 151 opposite to the one end at which the engaging piece 167 is formed serves as an abutting projection 168 that is brought into abutment with the rotation support member 71 of the eject arm 52 at the time of loading of the optical disk 2. As shown in FIG. 16, at the time of loading the optical disk 2, the abutting projection 168 is brought into abutment with the bent piece 81 of the rotation support member 71. The abutting projection 168 thus rotates the rotation support member 71 in the arrow $b_1$ direction for releasing the push-out arm 72 from the side surface of the optical disk 2, and restricts the rotation of the rotation support member 71 in the arrow $b_2$ direction so that the push-out arm 72 rotated to a position separated away from the side surface of the optical disk 2 does not rotate toward the side surface of the optical disk 2. Therefore, the sub-slider 151 keeps the state in which the push-out arm 72 of the eject arm 52 is released from the side surface of the optical disk 2.

The sub-slider 151 has a second cam slit 170 formed so as to extend longitudinally in a side surface 151b on the disk slot 19 side. The second cam slit 170 serves to raise and lower the base unit 22 between the chucking position, the chucking release position, and the recording/reproduction position together with the first cam slit 130. The second cam slit 170 includes a lower horizontal surface portion 170a corresponding to the chucking release position, an upper horizontal surface portion 170b corresponding to the recording/reproduction position, an inclined surface portion 170c connecting between the lower horizontal surface portion 170a and the upper horizontal surface portion 170b and corresponding to the chucking position, and an attaching portion 170d where a second guide plate 171 described later is attached. The second support shaft 48 provided so as to project from the sub-chassis 29 of the base unit 22 is slidably inserted through the second cam slit 170.

The inclined surface portion 170c of the second cam slit 170 is provided so as to extend to a position higher than the position of the upper horizontal surface portion 170b, and extends slightly downward from that position to guide the base unit 22 to the upper horizontal surface portion 170b. Accordingly, as the sub-slider 151 slides in the arrow $h_1$ direction, the second support shaft 48 moves upward along the inclined surface portion 170c from the lower horizontal surface portion 170a, so the base unit 22 guided by the second cam slit 170 is moved from the chucking release position to the chucking position. At this time, in the base unit 22, the periphery of the center hole 2a of the optical disk 2 centered on the disk mounting portion 23 is nipped by the turntable 23a and the abutting projection 8 provided in the top plate portion 5a of the top cover 5 to thereby perform chucking of the optical disk 2. When the sub-slider 151 is further slid in the arrow $h_1$ direction, the second support shaft 48 moved downward from the inclined surface portion 170c to the upper horizontal surface portion 170b, causing the base unit 22 to move from the chucking position to the recording/reproduction position.

As in the first cam slit 130 mentioned above, the second guide plate 171 is disposed in the second cam slit 170. The second guide plate 171 guides the movement of the second support shaft 48 and prevents backlash of the second support shaft 48 in the recording/reproduction position to allow stable operation of the disk rotating drive mechanism 24. The second guide plate 171 is made of a leaf spring member, and has an engaging hole provided at one end 171a. This engaging hole is engaged with an engaging projection provided so as to project from the attaching portion 170d of the second cam slit 170, and the one end 171a is locked to a projecting piece 173 formed so as to extend from the upper surface 151a of the sub-slider 151 toward the attaching portion 170d side. The second guide plate 171 has a locking piece 175 formed at the other end 171b. The locking piece 175 is locked to a locking portion 174 provided in the second cam slit 170. In the second guide plate 171, there is formed, above the contact between the upper horizontal surface portion 170b and the inclined surface portion 170c, a projecting portion 176 to which the second support shaft 48 moves when the base unit 22 is raised to the chucking position and which projects to the upper surface 151a side of the sub-slider 151 when the second support shaft 48 is moved to the upper horizontal surface portion 170b.

The lower horizontal surface portion 170a of the first cam slit 170 is formed slidably, and has a height that is slightly larger than the diameter of the second support shaft 48. On the other hand, the height of the upper horizontal surface portion 170b up to the second guide plate 171 is set to be the same as or slightly smaller than the diameter of the second support shaft 48. Therefore, when the second support shaft 48 is moved to the upper horizontal surface portion 170b, the second support shaft 48 is pressed into and nipped between the second guide plate 171 and the upper horizontal surface portion 170b. Therefore, together with the first guide plate 152 mentioned above, the second guide plate 171 can suppress vibration caused by the spindle motor 24a of the disk rotating drive mechanism 24 provided in the base unit 22 and stably rotate the optical disk 2.

As the second support shaft 48 is nipped between the second guide plate 171 and the upper horizontal surface portion 170b, the projecting portion 176 projects onto the upper surface 151a of the sub-slider 151 to be pressed against the upper surface 6a of the main chassis 6. Therefore, during recording/reproduction with respect to the optical disk 2, the sub-slider 151 is pressed to the bottom case 4 side by the second guide plate 171. It is thus possible to suppress the influence of vibration or disturbance due to the drive of the base unit 22.

Figure 33:
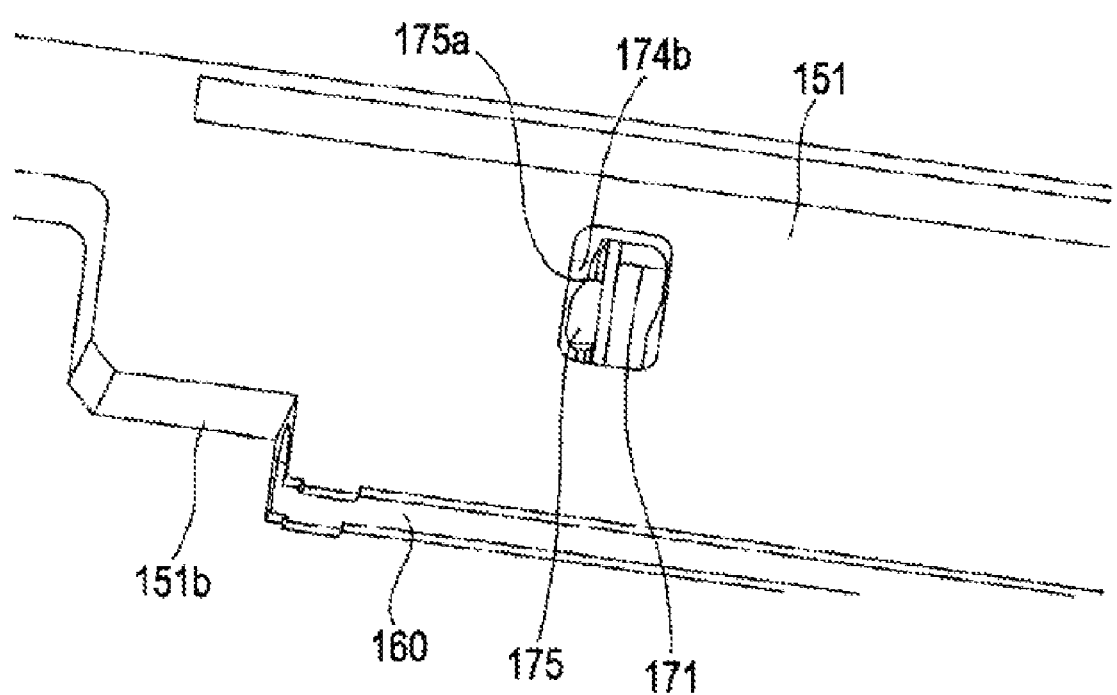
FIG. 33 is a perspective view showing a sub-slider to which a second guide plate has been locked.

The locking piece 175 formed at the other end 171b of the second guide plate 171 is formed by bending the other end 171b in a direction orthogonal to the longitudinal direction of the sub-slider 151, and projecting a part of the principal surface portion of the other end 171b in a substantially rectangular shape along the bending direction of the other end 171b. As shown in FIGS. 32 and 33, the locking portion 174 to which the locking piece 175 is locked is provided at the front of the upper horizontal surface portion 170b, and a slit 174b that extends along the thickness direction is provided in a side wall 174a that extends in the thickness direction from the upper surface 151a of the sub-slider 151. When the second guide plate 171 is locked in the second cam slit 170, the other end 171b of the second guide plate 171 faces the side wall 174a, and the locking piece 175 is inserted through the slit 174b, so an upper surface 175a of the locking piece 175 can be brought into abutment with the upper portion of the slit 174b.

Since the locking piece 175 is inserted through the slit 174b, in the second guide plate 171, when an impact in a plane direction is exerted, the upper surface 175a of the locking piece 175 and the upper portion of the slit 174b are brought into abutment with each other, allowing such an impact to be received by the sub-slider 151 via the upper surface 175a of the locking piece 175. This prevents the second guide plate 171 from undergoing plastic deformation when an impact in a plane direction is exerted in the event of accidental droppage of the disk drive device 1 or the like.

In the connecting arm 165 that is engaged with the engaging groove 166 of the sub-slider 151 described above and connects the slider 122 and the sub-slider 151 to each other, a support portion 165a provided at substantially the intermediate portion of the connecting arm 165 is rotatably attached to the main chassis 6. An engaging projection 177 formed at one end 165b of the support portion 165a is movably engaged with the second guide groove 126 of the slider 122. An engaging projection 178 formed at the other end 165c is movably engaged with the engaging groove 166 of the sub-slider 151.

When the slider 122 is moved in the arrow $f_1$ direction, as shown in FIG. 16, the engaging projection 177 moves the second guide groove 126 of the slider 122, so the engaging arm 165 is rotated in the arrow $l_1$ direction about the bent portion 165a, and the engaging projection 178 slides the sub-slider 151 in the arrow $h_1$ direction while moving in the engaging groove 166. When the slider 122 is moved in the arrow $f_2$ direction, as shown in FIG. 17, the engaging projection 177 moves in the second guide groove 126, so the engaging arm 165 is rotated in the $l_2$ direction about the bent portion 165a. The engaging projection 178 thus slides the sub-slider 151 in the arrow $h_2$ direction while moving in the engaging groove 166.

Figure 34:
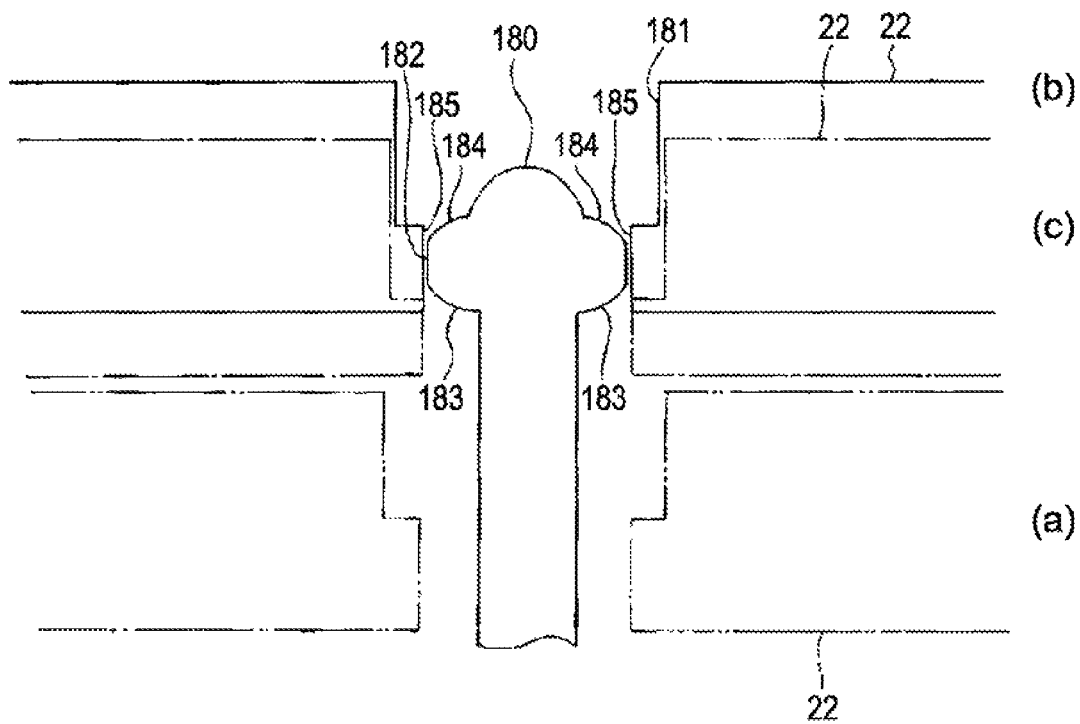

As shown in FIGS. 3 and 34, a guide pin 180 is provided in the disk drive device 1. When the base unit 22 is to be raised to the chucking position, the guide pin 180 guides the base unit 22 so as to ensure that the center hole 2a of the optical disk 2 conveyed to the centering position by the disk conveying mechanism 50 and the turntable 23a of the disk mounting portion 23 provided in the base chassis 27 are aligned with each other.

The guide pin 180 is provided so as to extend upright from the bottom portion of the bottom case 4. As shown in FIGS. 34A to 34C, in an upper part of the guide pin 180, there is formed a flange portion 182 through which a guide hole 181 formed in the base chassis 27 is inserted. The flange portion 182 has a diameter slightly larger than the diameter of the guide hole 181 of the base chassis 27. The flange portion 182 includes a first guide portion 183 formed as an inclined surface whose diameter increases toward the upper end, and a second guide portion 184 formed as an inclined surface whose diameter decreases toward the upper end. When the base chassis 27 is to be raised and lowered, the first and second guide portions 183 and 184 are inserted through a guide wall 185 formed in the guide hole 181 while being brought into sliding contact with the guide wall 185, so the flange portion 182 guides the base unit 22 to the chucking position or the chucking release position.

The guide hole 181 of the base chassis 27 through which the guide pin 180 is inserted is bored near the turntable 23a spaced apart from the third support shaft 49 serving as the rotation axis of the base unit 22. As shown in FIGS. 34A to 34C, the guide hole 181 includes the guide wall 185 formed so as to bulge below base chassis 27. The guide wall 185 forms a clearance slightly larger than the diameter of the flange portion 182 of the guide pin 180. When the flange portion 182 is inserted through the clearance, the base unit 22 is guided such that the center hole 2a of the optical disk 2 and the turntable 23a of the disk mounting portion 23 are aligned with each other.

Figure 35:
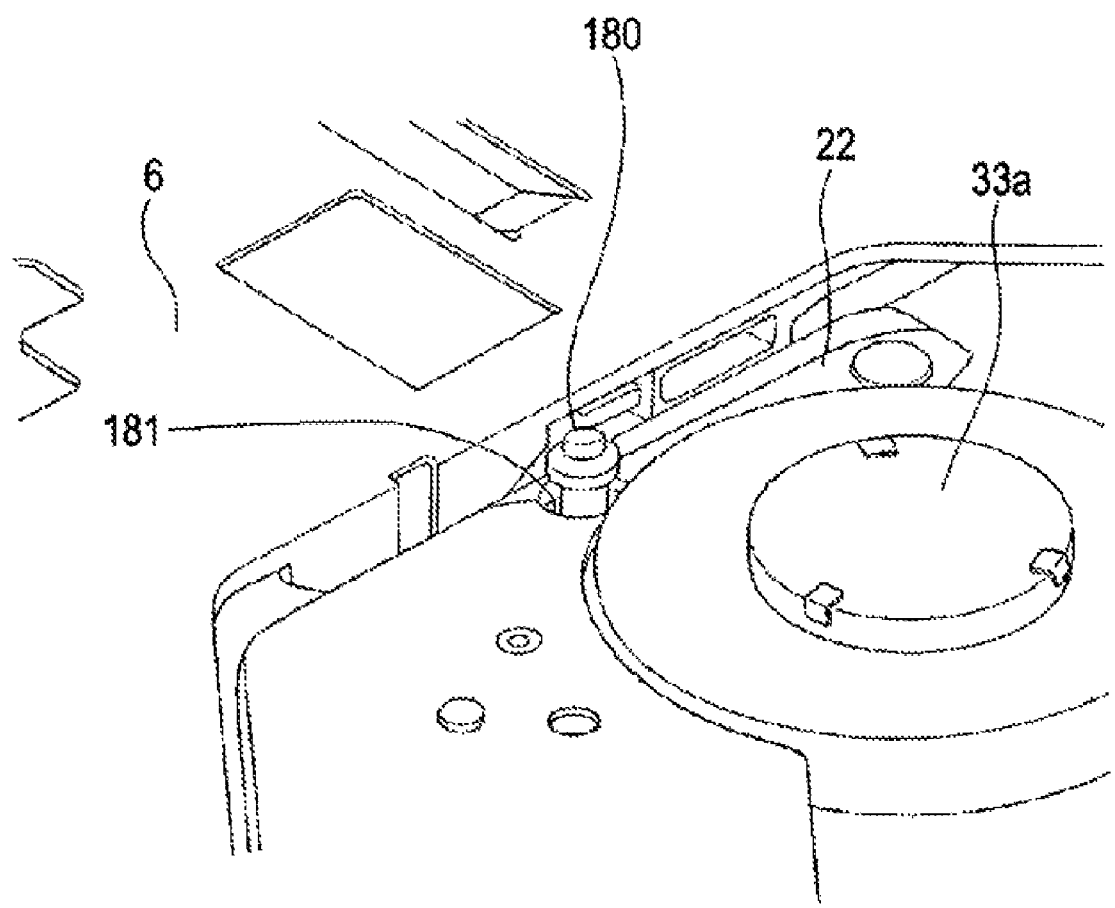
FIG. 35 is a perspective view showing a guide pin and a guide hole in a state in which a base unit has been lowered to the chucking release position.
Figure 36:
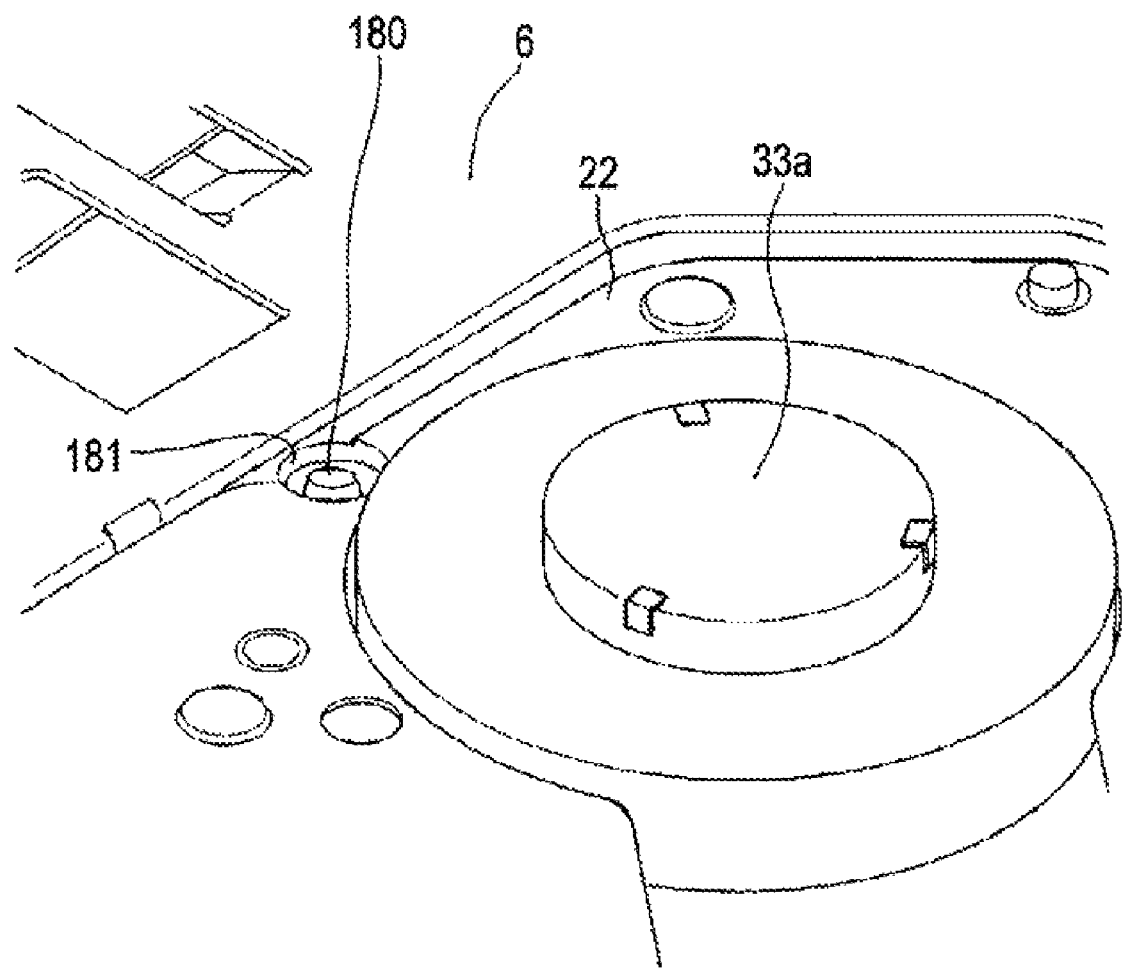
FIG. 36 is a perspective view showing a guide pin and a guide hole in a state in which a base unit has been raised to a chucking position.

Specifically, as indicated by alternate long and two short dashed lines in FIGS. 35 and 34A, when the base unit 22 is lowered to the chucking release position, the flange portion 182 of the guide pin 180 is located above the guide hole 181. When the optical disk 2 is conveyed to the centering position, the base chassis 27 is raised, and the flange portion 182 is inserted through the guide hole 181. When the base chassis 27 is raised to the chucking position for the optical disk 2, as indicated by solid lines in FIGS. 36 and 34B, the guide wall 185 formed so as to bulge within the guide hole 181 slides on the first guide portion 183 of the guide pin 180, and the flange portion 182 is inserted through the clearance of the guide wall 185. In this way, since the base chassis 27 is raised while being guided by the guide pin 180, the turntable 23a of the disk mounting portion 23 is aligned with the center hole 2a of the optical disk 2 conveyed to the centering position, thereby making it possible to smoothly perform chucking without application of an excessive load to the optical disk 2 and the turntable 23a.

The guide pin 180 and the guide hole 181 are formed so as to be located on the other end side opposite to one end in the longitudinal direction where the third support shaft 49 that supports the rotation of the base unit 22 is provided, and in the vicinity of the disk mounting portion 23. Misalignment between the optical disk 2 conveyed to the centering position and the turntable 23a can be thus corrected most efficiently, thereby making it possible to ensure reliable alignment between the center hole 2a of the optical disk 2 and the engaging projection 33a of the turntable 23a.

Figure 37:
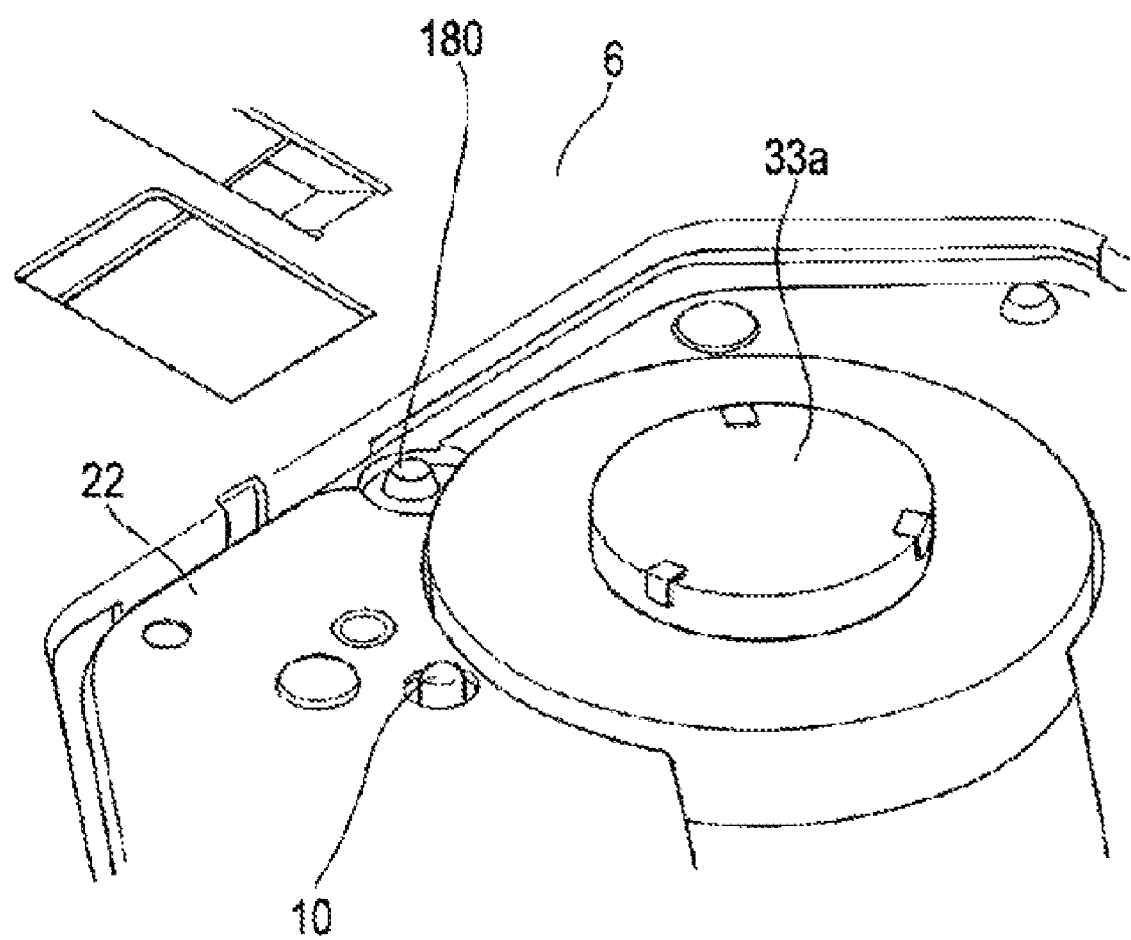
FIG. 37 is a perspective view showing a guide pin and a guide hole in a state in which a base unit has been raised to the recording/reproducing position.

As indicated by alternate long and short dashed lines in FIGS. 37 and 34C, when the base unit 22 is lowered to the recording/reproduction position, the guide wall 185 of the guide hole 181 of the base chassis 27 slides on the second guide portion 184 of the flange portion 182, and the flange portion 182 is guided so that the flange portion 182 can be inserted through the guide hole 181. Thereafter, the guide wall 185 is lowered to a position where the guide wall 185 separates away from the flange portion 182. In this way, in the state with the base unit 22 lowered to the recording/reproduction position, the guide pin 180 and the guide hole 181 are not in contact with each other, thus preventing disturbance such as vibration from being transmitted from the bottom case 4 to the base chassis 27 via the guide pin 180. Therefore, it is possible to prevent disturbance from being transmitted to the disk rotating drive mechanism 24 or the optical pickup 25 through the guide pin 180 to adversely affect recording/reproduction characteristics.

It should be noted that the guide pin 180 is formed at height where the guide pin 180 does not come into abutment with the lower surface of the optical disk 2 rotationally driven by the disk rotating drive mechanism 24. Thus, there is no fear of the guide pin 180 scratching the information recording surface of the optical disk 2.

When a recording/reproduction operation is finished, and the process transfers to the ejection process of the optical disk 2, the base unit 22 is lowered to the chucking release position, and the optical disk 2 is pushed up from the turntable 23a by the guide pin 180 to release chucking. At this time, in the base chassis 27, the guide hole 181 is located below the guide pin 180.

In the disk drive device 1 according to an embodiment of the present invention, the guide pin 180 also serves as a chucking release pin for releasing the chucking of the optical disk 2. That is, the upper end of the guide pin 180 is formed in a semi-spherical shape, and the guide pin 180 and the guide hole 181 of the base chassis 27 are formed in correspondence to a non-recording area formed in the vicinity of the center hole 2a of the optical disk 2 mounted on the turntable 23a. Accordingly, when the base unit 22 is lowered to the chucking release position for the optical disk 2, the optical disk 2 is pushed up by the upper end of the guide pin 180, thus releasing chucking of the optical disk 2 with the turntable 23a. According to this structure, since there is no need to use a chucking release pin for releasing the chucking of the optical disk 2 in addition to the guide pin 180, it is possible to achieve reduced number of parts and reduced weight of the disk drive device 1.

It should be understood by those skilled in the art that various modifications, combinations, sub-combinations and alterations may occur depending on design requirements and other factors insofar as they are within the scope of the appended claims or the equivalents thereof.

What is claimed is:

1. A disk drive device comprising:
a rotary arm rotatable in accordance with loading of a disk between a draw-in position and an eject position where the disk is ejected out of a housing;
a drive mechanism that provides a driving force for the rotary arm;
a link arm mechanism that connects the rotary arm and the drive mechanism to each other, and rotates the rotary arm from an insertion position to the eject position at the time of ejecting the disk;
a deck arm disposed substantially across from the rotary arm relative to a disk insertion direction that, together with the rotary arm, prevents an erroneous insertion of a small-diameter disk and performs centering with respect to the disk at respective positions around a circumference of the disk; and
a guide cam having a guide edge on which a guide projection provided in the link arm mechanism slides at the time of ejecting the disk to cause the rotary arm to rotate in an ejecting direction via the link arm mechanism, the guide projection moving around the guide cam from insertion to ejection of the disk,
wherein when a force directed opposite to a rotation direction is applied to the rotary arm at the time of ejecting the disk, engagement between the guide projection and the guide edge is released.

2. The disk drive device according to claim 1, wherein:
the guide cam has an insertion guide area where the guide projection moves around at the time of insertion of the disk, and an ejection guide area where the guide projection moves around at the time of ejection of the disk, the insertion guide area and the ejection guide area being located on one side and on the other side with respect to the guide edge; and
the guide projection moves from the ejection guide area to the insertion guide area when a force acting in a direction opposite to a rotation direction is applied to the rotary arm at the time of ejection of the disk.

3. The disk drive device according to claim 2, wherein the guide projection jumps over the guide edge to move from the ejection guide area to the insertion guide area.

4. The disk drive device according to claim 2, wherein a surface of the guide edge facing the ejection guide area is tapered toward the insertion guide area from a base end to a distal end.

5. The disk drive device according to claim 2, wherein a surface of the guide projection that is brought into sliding contact with the guide edge is tapered toward a side opposite to the insertion guide area from a base end to a distal end.

6. The disk drive device according to claim 2, wherein the guide projection has a spherical member rotatably supported at a distal end portion, and a part of the spherical member is exposed outward from the guide projection.

7. The disk drive device according to claim 1, wherein the small-diameter disk has a diameter of 8 cm.

8. The disk drive device according to claim 1, wherein the disk has a diameter of 12 cm.

9. The disk drive device according to claim 1, wherein the deck arm is rotatable.

10. The disk drive device according to claim 1, wherein the disk abuts the deck arm upon insertion into the device.

11. The disk drive device according to claim 1, wherein the deck arm is disposed on an opposite side of the device with respect to the rotary arm.

12. A disk drive device comprising:
- a rotary arm rotatable in accordance with loading of a disk between a draw-in position and an eject position where the disk is ejected out of a housing;
- a drive mechanism that provides a driving force for the rotary arm;
- a link arm mechanism that connects the rotary arm and the drive mechanism to each other, and rotates the rotary arm from an insertion position to the eject position at the time of ejecting the disk; and
- a guide cam having a guide edge on which a guide projection provided in the link arm mechanism slides at the time of ejecting the disk to cause the rotary arm to rotate in an ejecting direction via the link arm mechanism, the guide projection moving around the guide cam from insertion to ejection of the disk,
- wherein when a force directed opposite to a rotation direction is applied to the rotary arm at the time of ejecting the disk, engagement between the guide projection and the guide edge is released,
- the guide cam has an insertion guide area where the guide projection moves around at the time of insertion of the disk, and an ejection guide area where the guide projection moves around at the time of ejection of the disk, the insertion guide area and the ejection guide area being located on one side and on the other side with respect to the guide edge; and
- the guide projection moves from the ejection guide area to the insertion guide area when a force acting in a direction opposite to a rotation direction is applied to the rotary arm at the time of ejection of the disk, and
- as the guide edge is retracted in a distal end direction of the guide projection, the guide cam causes the guide projection to move from the ejection guide area to the insertion guide area.

13. The disk drive device according to claim 12, wherein the guide cam is cantilevered with the side of the ejection guide area as a proximal end.

14. The disk drive device according to claim 12, wherein the guide cam projects to a conveyance area side of the disk to retract the guide edge in a distal end direction of the guide projection.

15. The disk drive device according to claim 14, wherein the guide cam is provided on a conveyance area of the disk and on a leading edge side in a conveyance direction of the disk into the housing.

\* \* \* \* \*